US007223199B2

(12) United States Patent
Willmot et al.

(10) Patent No.: US 7,223,199 B2
(45) Date of Patent: May 29, 2007

(54) TRANSMISSION SYSTEM

(75) Inventors: Eric P. Willmot, Mount Eliza (AU);
Lance Pidgeon, Queanbeyan (AU)

(73) Assignee: Aimbridge Pty Ltd (AU)

( * ) Notice: Subject to any disclaimer, the term of this patent is extended or adjusted under 35 U.S.C. 154(b) by 194 days.

(21) Appl. No.: 10/498,303

(22) PCT Filed: Dec. 10, 2001

(86) PCT No.: PCT/AU01/01589

§ 371 (c)(1),
(2), (4) Date: Jun. 9, 2004

(87) PCT Pub. No.: WO02/48576

PCT Pub. Date: Jun. 20, 2002

(65) Prior Publication Data

US 2005/0049107 A1 Mar. 3, 2005

(30) Foreign Application Priority Data

Dec. 12, 2000 (AU) .................... PR 2035

(51) Int. Cl.
*F16H 57/08* (2006.01)
*F16H 3/72* (2006.01)
*F16H 3/44* (2006.01)
(52) U.S. Cl. .............. 475/339; 475/5; 475/269
(58) Field of Classification Search .......... 475/5, 475/269, 271, 311, 313, 317, 319, 284, 338, 475/339
See application file for complete search history.

(56) References Cited

U.S. PATENT DOCUMENTS

| 4,279,177 | A | * | 7/1981 | Yamashita | 475/5 |
| 5,425,682 | A | * | 6/1995 | Hayashi | 475/5 |
| 5,454,765 | A | | 10/1995 | Sommer | |
| 5,624,339 | A | | 4/1997 | Coutant et al. | |
| 6,080,077 | A | * | 6/2000 | Kamlukin | 475/339 |
| 6,641,499 | B1 | * | 11/2003 | Willmot | 475/172 |
| 6,808,468 | B1 | * | 10/2004 | Miyazaki et al. | 475/339 |
| 6,994,646 | B2 | * | 2/2006 | Ai | 475/5 |

FOREIGN PATENT DOCUMENTS

EP 447801 7/1997

* cited by examiner

*Primary Examiner*—Roger Pang
(74) *Attorney, Agent, or Firm*—Michael Best & Friedrich LLP

(57) ABSTRACT

Transmission systems are disclosed which include a dual sunwheel system having an output sunwheel (70) and a control sunwheel (80). A planet cage (18) is arranged around the dual sunwheel system and includes a planet gear (62) in mesh with the sunwheel (70) and a planet gear (64) in mesh with the sunwheel (80). The planet gears (62, 64) are coupled to one another. The drive ratio of the transmission is controlled by controlling the cage (18) or the control sunwheel (70). The speed of rotation of the input (22), output (20) and control sunwheel (70) are sensed by sensors (90) and control signals are generated to control a control device to thereby control the rotation of planet cage (18) or the control sunwheel (80) to thereby set the drive ratio of the transmission. The control devices can include a motor, one or more magnetic powder clutches, a variable centroid system and a mechanical pitch transfer gear system.

12 Claims, 24 Drawing Sheets

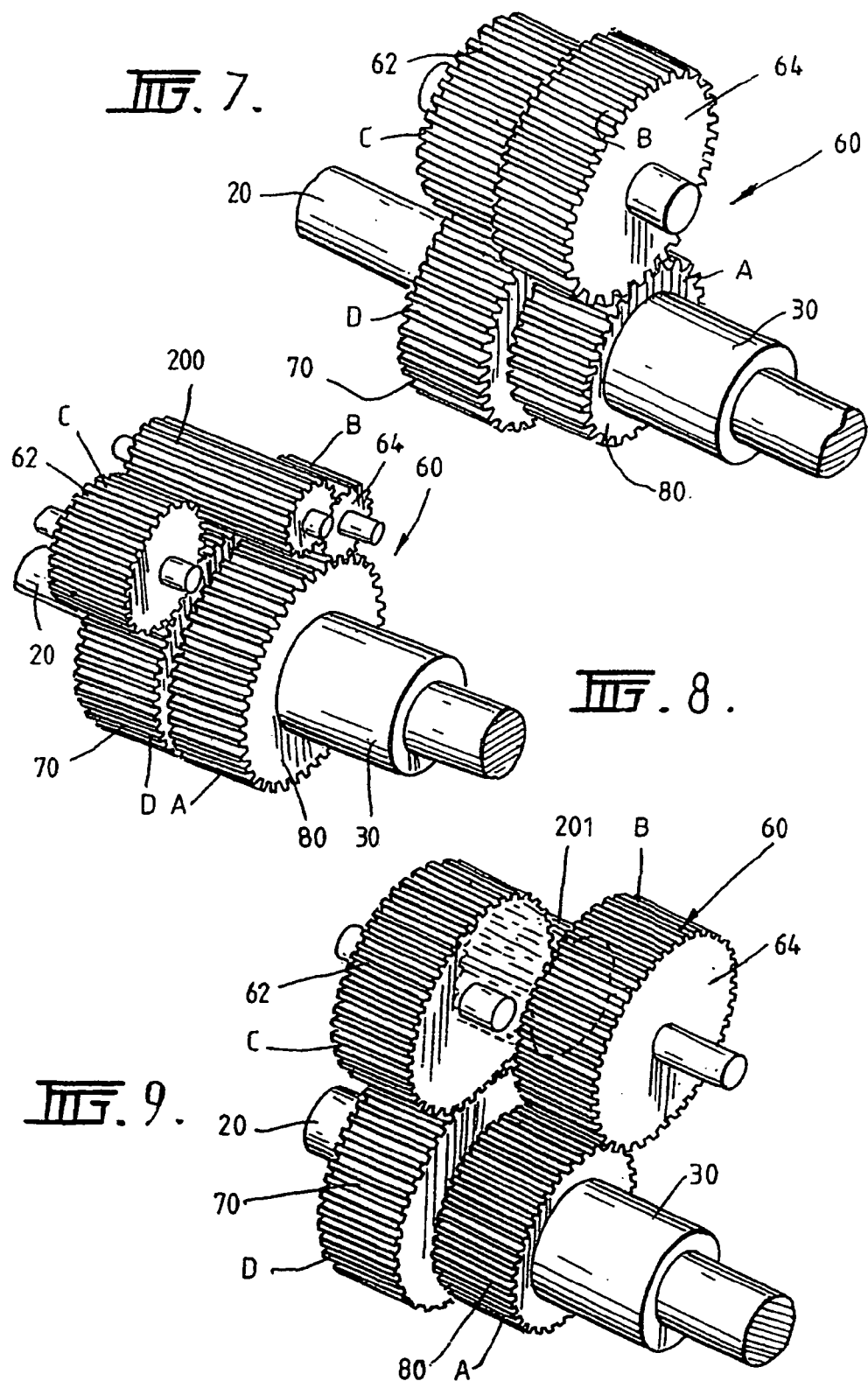

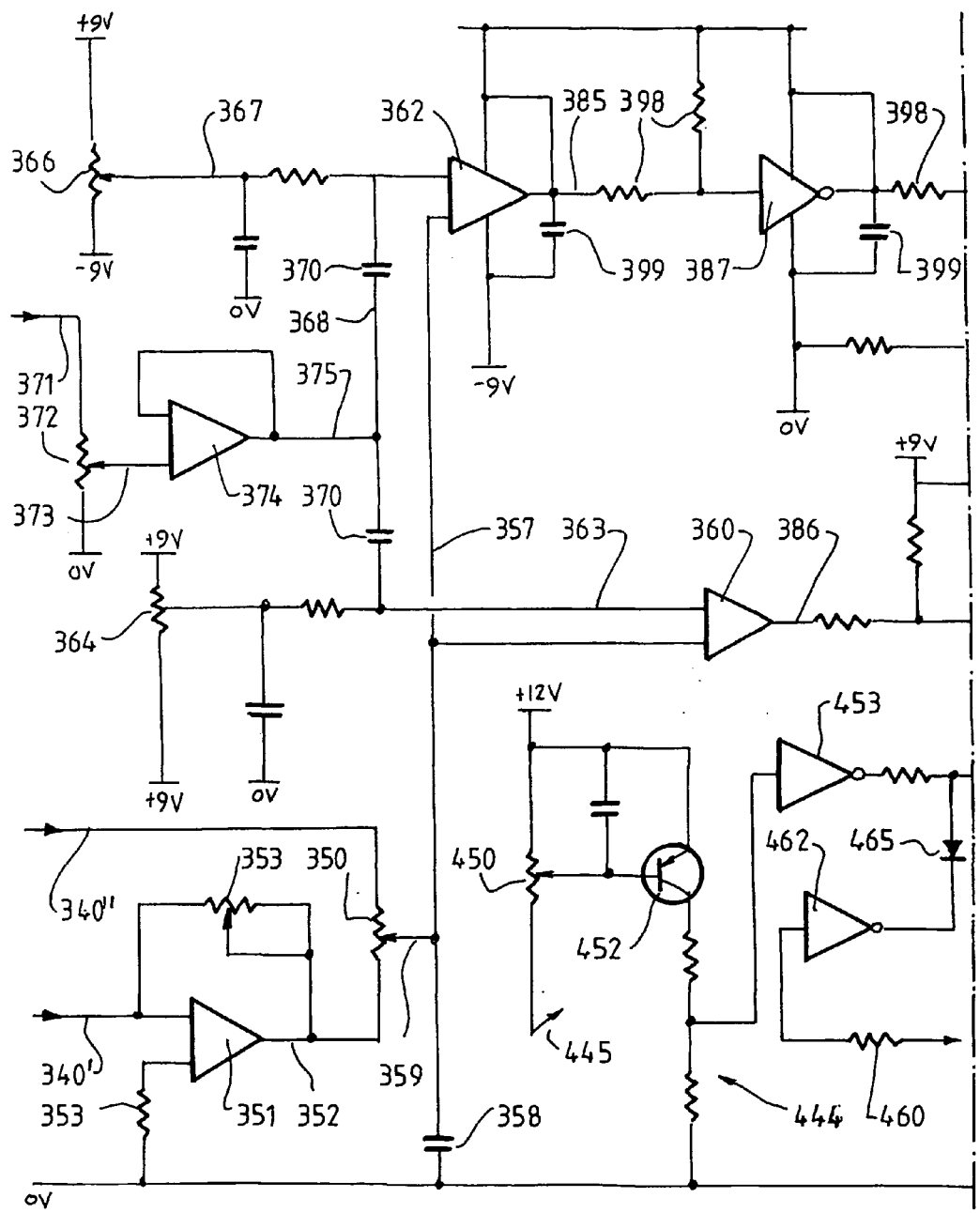
FIG. 20.a

TRANSMISSION SYSTEM

This invention relates to a transmission system and in particular to a continuously variable transmission for continuously varying a drive ratio of the transmission between a minimum value and a maximum value. The invention has particular application to systems including more than one drive motor and, in particular, to both series and parallel hybrid vehicles including an internal combustion engine and an electric propulsion motor for powering the vehicle.

The invention provides a transmission system including:

a dual sunwheel system having a first sunwheel and a second sunwheel, the first sunwheel providing output rotary power when the transmission system is operating;

a planet system including a first planet gear and a second planet gear coupled to the first planet gear, the first planet gear meshing with the first sun gear and the second planet gear meshing with the second sun gear;

a cage for carrying the planet system;

input means for receiving input power from an input power source and supplying the input power to the dual sunwheel system to cause the dual sunwheel system to supply rotary power at the first sunwheel; and control means for controlling the dual sunwheel system so as to set the drive ratio of the transmission by causing the first sunwheel to advance or regress relative to the input means by displacing momentum back and forth between the first sunwheel which provides the output rotary power and the control means.

In one embodiment of the invention the input means comprises a shaft coupled to the second sunwheel so that rotation of the second sunwheel causes rotation of the planet system to in turn rotate the first sunwheel.

In this embodiment of the invention the control means comprises the cage of the sunwheel and cage speed control means for rotating the cage to cause the first sunwheel to advance or regress relative to the second sunwheel and change the drive ratio of the transmission.

In other embodiments of the invention the input means comprises the planet cage of the dual sunwheel system and the control means includes a control shaft coupled to the second sunwheel for rotating the second sunwheel to cause the first sunwheel to advance or regress relative to the cage to change the drive ratio of the output relative to the cage.

In this embodiment of the invention the input to the cage may be from a single power supply coupled directly to the cage.

However, in other embodiments a dual power supply system may be utilised. In this embodiment the cage of the sunwheel system is coupled to an epicyclic planet system, the epicyclic planet system having a first input for input of power and a second input for input of power, the epicyclic planet system being connected to the cage of the dual sunwheel system to thereby rotate the cage to provide the input rotatory power into the dual sunwheel system.

The epicyclic planet system includes an epicyclic sunwheel, an orbit gear and at least one said epicyclic planet gear, the said epicyclic planet gear being carried by the cage of the dual sunwheel system, a first input shaft connected to the epicyclic sunwheel and a second input shaft connected to the orbit gear so that when either or both of the first or second input shafts is rotated the epicyclic planet gear orbits about the epicyclic sunwheel to thereby rotate the cage of the dual sunwheel system and provide input rotary power into the dual sunwheel system.

The provision of the epicyclic planet system in this embodiment of the invention provides a decoupling of the two input power supplies so that each can remain connected into the system and each can operate independently of the other or jointly with the other without interfering with the operation of the other power supply.

In general, transmission systems for hybrid vehicles or other environments in which more than one input supply is used, require an uncoupling of one of the power supplies at some stage when the other of the power supplies is driving the system. This uncoupling is usually performed by a clutch, mechanical dog or other device. The need to provide this uncoupling can result in waste of energy and also additional mechanical components which are required in the system.

It would therefore be desirable to provide a transmission system in which the inputs can be decoupled, that is they remain in driving contact with the transmission but each is able to drive independently of the other without effecting the operation of the other.

This aspect of the invention relates to a transmission system which has a plurality of input power supplies.

This aspect of the invention provides a transmission system including:

an epicyclic planet system having an orbit gear, a sunwheel and at least one planet gear between the sunwheel and the orbit gear, the orbit gear receiving input rotary power from a first power source and the sunwheel receiving input rotary power from a second power source;

a dual sunwheel system having a first sunwheel and a second sunwheel, the first sunwheel being coupled to an output shaft;

the dual sunwheel system further having a planet system including a first planet gear in mesh with the first sunwheel and the second planet gear in mesh with the second sunwheel, the first and second planet gears being coupled together, the planet system being supported in a cage, the cage also carrying the at least one planet gear of the epicyclic planet system so that when input rotary power is input from the first or second source to the orbit gear or the sunwheel of the epicyclic planet system the planet gear of the epicyclic system orbits about the sunwheel of the epicyclic planet system to rotate the cage and thereby supply rotary power to the planet system and to the first sunwheel to drive the output; and a control means coupled to the second sunwheel for controlling the rotary speed of the second sunwheel which in turn rotates the planet system via the second planet gear to cause the first sunwheel to advance or regress relative to the cage to thereby change the drive ratio of the transmission.

Preferably the control means includes:

a control circuit having at least a first sensor and a second sensor for providing respective signals indicative of the rotary speed of any two of the cage, the second sunwheel and the output, and processing circuitry for receiving the signals and for producing a control signal; and a control mechanism for driving or impeding rotary motion of the second sunwheel dependant on the control signal.

In one embodiment of the invention, the first and second sensors sense the speed of the cage and the output respectively. However, in another embodiment, the sensors detect the speed of the cage and the second sunwheel, and the speed of the second sunwheel is used as an indicative speed of the output.

In one embodiment of the invention the control mechanism comprises an electric motor. However, in another embodiment of the invention the control mechanism comprises a magnetic powder brake or clutch.

In yet in further embodiments the control mechanism may comprise a mechanical or hydraulic variable drive.

In embodiments where the electric motor is utilised, the motor uses energy to control the control shaft. That energy is returned to the system as momentum or drive. When the control motor is impeding rotation of the control shaft so as to control the drive ratio of the transmission energy is extracted from the system in the form of electrical power which, can be used to power other electric components or to recharge batteries.

If mechanical or hydraulic control systems are utilised those systems may not be as efficient as embodiments in which an electric motor is used. In these embodiments some energy may be put back into the system and some energy will be lost.

Preferably the processing circuitry includes:

means for setting a predetermined ratio between the first and second signals and for producing an initial control signal indicative of a variation from the set ratio;

means for producing the control signal in the form of a variable pulse signal having a duty cycle indicative of the magnitude of the initial control signal; and switch means for receiving the variable pulse signal, the switch means being coupled in a power supply to the control mechanism so that the control mechanism is powered by switching the switching means on by the variable pulse signal so that the control means is powered on in pulse fashion with a duty cycle dependant on the duty cycle of the control signal so the control shaft is driven to increase rotary speed when the control mechanism is powered and impedes rotation on the control shaft when the control mechanism is not powered is set in accordance with the duty cycle of the control signal.

In embodiments where the control mechanism is a motor the motor speed is dependant on whether the motor is being driven, that is powered, or is not being driven. The faster the control shaft is moving, the higher gear the transmission is in (that is the lower the gear ratio). If the motor is switched on and powered it can supply drive to the control shaft to increase its speed thereby reducing the gear ratio. If the motor is not powered then the control shaft can slow down thereby increasing the gear ratio. Thus by continually comparing the initial control signal with a predetermined value such as 0 volts, the motor can be switched on or off to either increase the speed of the control shaft or allow the control shaft to slow so as to produce an initial control signal which is indicative of 0 volts or 0 error voltage from the preset level. When 0 volts is produced the controls shaft is rotating at the required speed to provide the required drive ratio and therefore the motor need not be operated. Thus, the motor is continually switched on or off to attempt to achieve an initial control voltage of that 0 voltage. In embodiments where a magnetic clutch or brake is utilised the amount of progressive braking supplied by the clutch is also proportional to the pulse width of the control signal so that the speed of the second sunwheel can be increased or decreased by the magnetic brake or clutch.

Preferably the switching means comprises at least one transistor which is provided in series with the control mechanism so that when the transistor is switched on power is able to flow through the control mechanism to activate the control mechanism to increase the rotational speed of the second sunwheel.

In one embodiment the control mechanism is a motor, and a second transistor is arranged in parallel with the motor so that when the first transistor is switched off, the second transistor is switched on and current is able to flow through the second transistor and to a load so that in environments in which the motor is running at a speed higher than the input power to the motor the motor can generate electricity and supply that electricity to the load and impede the rotation of the control shaft.

In some embodiments of the invention the load may comprise a battery for supplying power to an electric propulsion motor in a hybrid power supply system so that the motor can recharge the batteries depending upon the operating conditions of the motor.

Preferably the control circuity includes current sensing means for sensing current supply to the motor and, in the event of over supply of current, switching off the switching means so that current cannot flow through the motor and the motor is de-energised.

Preferably the control circuitry also includes a reverse gear signal indicating means for providing a reverse signal when the transmission system is placed in reverse for preventing the switching means from switching on so as to maintain the motor in a switched off condition when the vehicle is in reverse gear.

The invention may also be said to reside in a transmission system including:

a dual sunwheel system including a first sunwheel provided on an output shaft for supplying output rotary power;

a second sunwheel;

a control shaft coupled to the second sunwheel;

a planet system having at least a first planet gear in mesh with the first sunwheel and a second planet gear in mesh with the second sunwheel;

a cage for carrying the planet system;

input rotary power supply means for supplying input rotary power to the cage; and control means for controlling the speed of rotation of the control shaft to control the speed of rotation of the second sunwheel to set the drive ratio of the transmission.

Preferably the control means comprises a control motor for controlling rotation of the control shaft.

In another embodiment of the invention the control means comprises a first magnetic powder clutch having a first component including a coil and a second component including a brake element, the first component being coupled to either the cage or the control shaft, and the second component being coupled to the other of the cage or the control shaft so the component which is coupled to the cage rotates with the cage upon supply of input rotary power to the transmission system, and control power supply means for supplying a control signal to enable energisation of the coil to cause the magnetic clutch to activate so as to progressively lock the component having the coil to the component having the brake element so that rotation is transmitted from the component coupled to the cage to the component coupled to the control shaft to thereby make the control shaft rotate in accordance with the control signal supplied to the coil.

In this embodiment of the invention a second magnetic powder clutch of the same structure as the first magnetic clutch is also provided, the second magnetic clutch having its first component fixed stationary and its second component coupled to the control shaft so that when a control signal is supplied to energise the second magnetic clutch the second magnetic clutch can completely lock-up to prevent rotation of the control shaft to thereby cause the control shaft to remain stationary and thereby place the transmission system into reverse gear.

In accordance with this embodiment of the invention in order to provide precise ratio control of the transmission both the first and second magnetic clutches can be controlled with control signals from a controller to precisely adjust the speed of rotation of the control shaft to precisely set the drive ratio of the transmission.

Preferably the first magnetic clutch has the first component including the coil coupled to the cage for rotation with the cage, the first component including a slip ring for engaging a ring fixed stationary in the transmission system so control signals can be supplied via the fixed ring to the slip ring and to the coil in the first component.

In one embodiment of the invention the planet system comprises the first planet gear and the second planet gear fixed integral with the first planet gear, the integral first and second planet gears being mounted on a shaft fixed to the cage.

In other embodiments the planet system comprises the first planet gear in mesh with the first sunwheel, the second planet gear being separate from the first planet gear and in mesh with the second sunwheel, and the first and second planet gears being coupled by an idler gear in mesh with both the first and second planet gears.

In a still further embodiment the planet system comprises the first planet gear in mesh with the first sunwheel, and the second planet gear being in mesh with the second sunwheel and being coupled in the first planet gear by being in mesh with the first planet gear.

In a still further embodiment of the invention the planet system comprises the first planet gear in mesh with the first sunwheel, the second planet gear in mesh with the second sunwheel, and an idler planet gear fixed onto the second planet gear for rotation with the second planet gear and the idler gear being in mesh with the first planet gear to thereby couple the first planet gear to the second planet gear.

A still further aspect of the invention may be said to reside in a transmission system including:

a dual sunwheel system including a first sunwheel provided on an output shaft for supplying output rotary power, a second sunwheel, a planet system having at least a first planet gear in mesh with the first sunwheel and a second planet gear in mesh with the second sunwheel, the first and second planet gears being coupled together, a cage for carrying the planet system;

input rotary power supply means for supplying input rotary power to the dual sunwheel system;

a first magnetic powdered clutch having a first component including a coil and a second component including a brake element, the first component being coupled to the dual sunwheel system for controlling the drive ratio of the transmission system or an input drive control, and the second component being coupled to the other of the dual sunwheel system or the input drive control;

a second magnetic powdered clutch having a first component including a coil and a second component including a brake element, the first component being coupled to either the dual sunwheel system or being held fixed stationary, and the second component being coupled to the other of the dual sunwheel system or fixed stationary; and power supply means for supplying power to the first and second magnetic powder clutches to control the dual sunwheel system to thereby set the drive ratio of the transmission system.

According to this aspect of the invention by controlling the first magnetic clutch preliminary or primary control over the dual sunwheel system is obtained in order to set the drive ratio of the transmission and precise control an more rapid adjustment to a particular ratio can be set by activating the second magnetic clutch which can quickly correct for any over adjustment produced by the first magnetic clutch to thereby set the drive ratio of the transmission system accurately and quickly in response to the environment in which the transmission is operating.

In the preferred embodiment of the invention the input drive control comprises the input rotary power supply means so that the input rotary power into the transmission drives the first or second component of the first magnetic clutch so that when the clutch is activated the degree of slippage between the first and second component is changed to cause the other of the first or second component to move with a particular degree of slippage with respect to the first component so as to control the dual sunwheel system to set the drive ratio of the transmission, and wherein additional control is effected by operating the second magnetic clutch so as to cause the first or second component of the second magnetic clutch to further control the dual sunwheel system to set the drive ratio of the transmission.

Preferably the first component or second component of the first and second magnetic clutches is connected to the second sunwheel of the dual sunwheel system for controlling the drive ratio of the transmission.

Preferably the second sunwheel includes a control shaft and the first or second component of the magnetic clutches is connected to the control shaft.

Preferably the second component of the first and second magnetic clutches is connected to the control shaft.

Preferably the first component of the first magnetic clutch is connected to the cage for carrying the planet system so that when the cage rotates, the first component of the first magnetic clutch rotates with the cage, and when the first magnetic clutch is operated to produce the desired degree of slippage between the first and second components the second component is caused to rotate in accordance with a degree of slippage of the first magnetic clutch.

The invention also provides a controller for controlling a ratio control device for setting a drive ratio of a transmission system, said controller including:

sensor means for providing first and second speed signals indicative of the rotary speed of any two of the input power supply into the transmission system, the rotary speed of a ratio control member which sets the drive ratio of the transmission, and the output shaft;

ratio adjusting means for setting an adjustment ratio and for providing an output signal if the ratio of first and second speed signals differs from the adjustment ratio;

control signal generating means for generating a control signal dependant on the output signal; and switching means for receiving the control signal and for controlling the ratio control device to cause the control device to drive the ratio control member to thereby set the drive ratio of the transmission.

Preferably the sensor means provides first and second speed signals indicative of the input power supply and the output shaft.

However, in other embodiments, the sensor means for providing the first and second speed signals can provide speed signals of the input and the ratio control member, with the speed of the ratio control member being used as an indicative speed of the output shaft.

Preferably the ratio adjusting means comprises a voltage divider pot for receiving the first and second speed signals and outputting the output signal if the ratio of the voltage of the first signal to the voltage of the second signal is different to the ratio set by the voltage divider.

Preferably the control signal generating means includes a pair of operational amplifiers, the amplifiers each receiving a saw tooth wave signal and an offset signal, the offset signals being of different magnitude and the output of the operational amplifiers being a variable pulse width signal, set in accordance with the magnitude of the output signal, which provides said control signal.

Preferably the operational amplifiers are coupled to the switching means for controlling the switching means to enable the switching means to switch power supply to the control device so that the control device is operated in accordance with the duty cycle of the variable pulse width signal supplied to the switching means.

In one embodiment of the invention the switching means comprises a first transistor connected in series with the control device so the each time the transistor is switched on for a period set by the duty cycle of the control signal the motor is powered on for periods set the duty cycle of the control signal.

In the embodiment which includes a control device in the form of a motor, a second switching transistor is also provided for enabling the motor to generate electricity in some operational conditions of the transmission system and supply the generated electricity to a load. In this embodiment the first transistor is switched off when the second transistor is switched on so that motor is connected to the load for supply of the electricity to the load and cause the rotation of the control shaft to be impeded to rotate the motor in a state of constant speed regardless of changing momentum condition in the transmission system.

In some embodiments of the invention the load may be a battery and the supply of electricity can be used to recharge the battery.

Preferably the controller also includes an overcurrent sensing means for sensing the supply of overcurrent to the motor and for causing the motor to be switched off to prevent damage to the motor.

Preferably the motor is caused to be switched off by the supply of a signal which prevents the first transistor from switching on to enable power to be supplied through the motor to operate the motor.

Preferably the controller also includes a reverse signal generator for providing a signal when the transmission system is placed in reverse gear for preventing switching on of the first transistor to also prevent the motor from being energised by the supply of power to the motor.

Preferably the sensors comprise sensing circuitry which provides a first voltage signal which is a voltage signal proportional to the speed of the input and a second voltage signal which is proportional to the speed of the control member.

In one embodiment of the invention the sensor may include chopper wheels connected to the input and the control member, and photo-interrupters for generating pulses when the chopper wheels rotate with the input and the control member, the pulses producing frequency signals which are converted into voltage signals proportional to the frequency and therefore proportional to the rotary speed of the input and the control member.

The invention may also be said to reside in a transmission system including:
  a first sunwheel;
  an output connected to the first sunwheel for providing output rotary power;
  a control sunwheel;
  a planet system including a planet cage having first and second planet gears, the first planet gear meshing with the first sunwheel and the second planet gear meshing with the control sunwheel;
  input supply means for supplying input to the planet cage so that rotary power is transmitted from the cage via the first and second planet gears to the first sunwheel and therefore to the output;
  a controller for:
  (a) receiving signals indicative of the rotary speed of at least any two of the output, the control sunwheel and the input supply means, and for producing control signals based on the said at least any two of the speeds of the output, the control sunwheel and the input supply means, to enable a change in drive ratio in a forward direction of the transmission; and
  (b) producing a locking signal when reverse motion of the transmission is required;
  a first progressive control device for receiving the control signals from the controller to speed up or slow down the control sunwheel between a stationary condition of the sunwheel and a first rotary speed of the sunwheel to change the drive ratio of the transmission; and
  a second control device for receiving the locking signal from the controller for locking the sunwheel to the input to increase the speed of rotation of the control sunwheel to a speed above the first speed to thereby place the transmission into reverse.

Preferably the first control device comprises a magnetic powder clutch.

Preferably the second control device comprises a cone clutch.

Preferably the sunwheel is provided on a control shaft and the control shaft carries a gear which meshes with a gear coupled to an output of the first device and also with a gear coupled to an output of the second control device.

Preferably the controller includes a processor for receiving signals indicative of the speed of the input supply means and the speed of the output, switching means connected to the processor for receiving output signals from the processor to switch the switching means on and off to produce control signals for application to the first progressive control device for actuating the first progressive control device to speed up or slow down the control sunwheel.

Preferably the control signals comprise:
  a DC pulse signal for actuating the first progressive control device to lock the first progressive control device to the control sunwheel;
  a variable AC frequency signal for controlling the first progressive control device to adjust the speed of the control sunwheel to a speed less than the said first speed; and
  a variable pulse width AC signal for actuating the first progressive control device to enable the control device to control the speed of the control sunwheel from the said certain speed to the first speed.

Preferably the controller includes means for producing a transition AC/DC signal for transition of the control signal from the DC pulse signal to the AC variable frequency signal.

The invention may also be said to reside in a transmission system including:
  a first sunwheel;
  an output connected to the first sunwheel for providing output rotary power;
  a control sunwheel;
  a planet system including a planet cage having first and second planet gears, the first gear meshing with the first sunwheel and the second planet gear meshing with the control sunwheel;
  input supply means for supplying input rotary power to the planet cage so the rotary power is transmitted from the cage via the first and second planet gears to the first sunwheel and therefore to the output;

a controller including speed indicating means for providing signals indicative of the rotary speed of at least any two of the output, the control sunwheel and the input supply means, and for generating a control signal for controlling the drive ratio of the transmission system; and a control mechanism for receiving the control signal and for controlling the control sunwheel in accordance with the control signal to thereby adjust the drive ratio of the transmission.

In one embodiment the control device includes a first progressive control device for receiving the control signal from the controller to speed up or slow down the control sunwheel to change the drive ratio of the transmission.

In this embodiment the control device may also include a second control device, the controller also being for generating a locking signal indicative of the requirement for reverse gear, the second control device being for receiving the locking signal and for causing the second control device to lock the control sunwheel to the input to increase the speed of rotation of the control sunwheel to a speed above the first speed to thereby place the transmission into reverse gear.

Preferably the first control device comprises a magnetic powder clutch.

In one embodiment of the invention the control sunwheel is connected to a control shaft which comprises a first control shaft portion and a second separate control shaft portion, the first and second control shaft portions being coupled together by gears, the control mechanism being mounted on the second control shaft portion.

In one embodiment of the invention the control device is mounted for rotation and is coupled to control shaft drive means for rotating the control mechanism.

Preferably the control shaft drive means comprises a gear system which transmits drive from the input to the control device.

Preferably the gear system comprises a ring gear coupled to the cage, a pinion gear meshing with the ring gear, a shaft coupled to the pinion gear, a second pinion gear on the shaft, a second ring gear having internal and external teeth, the second pinion meshing with the internal teeth, and the external teeth meshing with a gear coupled to the control device for rotating the control device.

Preferably the control device comprises a magnetic powder clutch having an outer housing portion coupled to the further gear, and an inner section mounted on the second portion of the control shaft, so that when the input is driven, the outer housing of the powder clutch is rotated by the gear system and when the powder clutch is activated, the inner section and second portion of the control shaft is controlled in rotation, dependent on the control signal supplied to the powder clutch to in turn control the rotation of the first portion of the control shaft and therefore the control sunwheel, to set the drive ratio of the transmission.

In a still further embodiment of the invention the second portion of the control shaft includes a variable centroid system having moveable masses which, upon rotation of the second portion of the control shaft, move rotary outwardly to slow down rotation of the second portion of the control shaft and therefore the first portion of the control shaft.

In a still further embodiment the control device includes a first variator having a toroidal gear track having gear teeth which change in pitch from an inner diameter portion to an outer diameter portion, the first variator being coupled to a variator drive mechanism for rotating the first variator, a second variator having a toroidal track having gear teeth which change in pitch from an inner diameter portion to an outer diameter portion, the second variator being connected to the control shaft, a pitch transfer gear in mesh with the gear teeth of the first variator and the gear teeth of the second variator, means for rotating the pitch transfer gear so that the gear can engage at any portion along the variable pitch of the toroidal track of the first variator and the toroidal track of the second variator to thereby set a drive ratio between the first and second variators, and a driver for setting the orientation of the pitch transfer gear.

Preferably the variator drive system comprises a gear system for transmitting drive from the input cage to the first variator.

Preferably the control shaft comprises a first control shaft portion and a second control shaft portion, a pair of gears for coupling the first control shaft portion to the second control shaft portion, the first variator being rotatable relative to the second control shaft portion and the second variator being mounted on the second control shaft portion for rotating the second control shaft portion so that the second control shaft portion and therefore the first control shaft portion is controlled in rotation, dependent on the gear ratio set by the pitch transfer gear.

Preferably the orientation of the pitch transfer gear is set by a stepper motor and the stepper motor receives the control signal to activate the stepper motor to rotate the stepper motor to in turn change the position of the pitch transfer gear to control the rotation of the control shaft and therefore the control sunwheel.

Preferred embodiments of the invention will be described, by way of example, with reference to the accompanying drawing in which:

FIGS. 7, 8 and 9 are views showing various dual sunwheel systems which are used in the embodiments of the invention;

Figure 1:
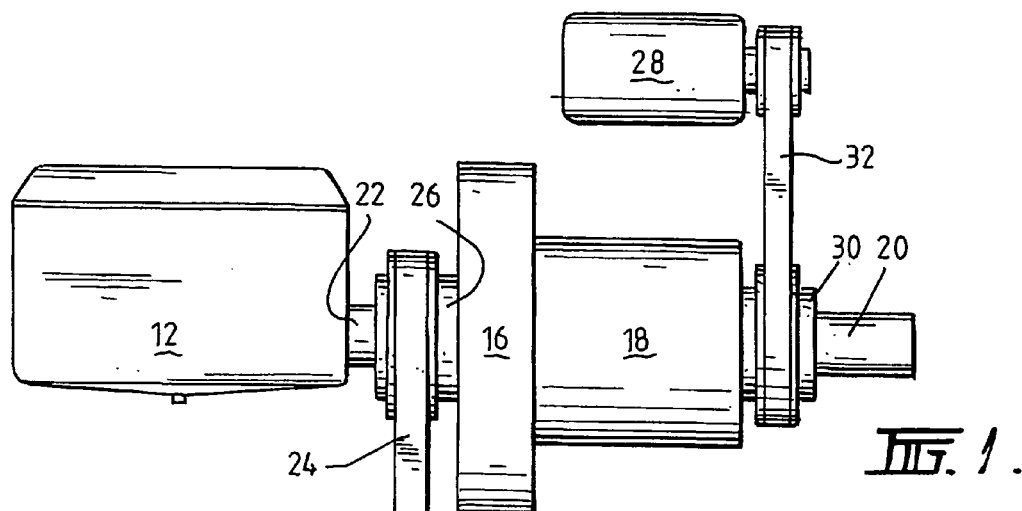
FIG. 1 is a schematic diagram of a transmission system according to a first embodiment of the invention.

With reference to FIG. 1 a transmission system for a hybrid drive for a motor vehicle is disclosed. The hybrid drive of the motor vehicle includes an internal combustion engine 12 and an electric propulsion motor 14. One of the other motors 12 or 14 or both of the motors 12 or 14 can be used to provide power to drive a vehicle.

The transmission system of this embodiment of the invention includes an epicyclic planet system 16 and a dual sunwheel transmission 18. The dual sunwheel transmission 18 drives an output 20.

The internal combustion motor 12 and the electric propulsion motor 14 provide first and second inputs into the epicyclic planet system 16. The input from the motor 12 is via a first input shaft 22 into the epicyclic planet system 16 and the input from the electric propulsion motor 14 is via a belt 24 to a second shaft 26 of the epicyclic planet system 16. The input shafts 22 and 26 will be described in more detail with reference to FIG. 3.

In the embodiment shown in FIG. 1 the drive from the propulsion motor 14 is via the belt 24. However, in production embodiments the electric propulsion motor 14 can be directly mounted on the shaft 26 so that it surrounds the shaft 26 and drives the shaft 26 directly without the need of a belt 24 to transmit the drive.

The transmission system of FIG. 1 also includes a control motor 28 which controls rotation of a control shaft 30 of the dual sunwheel system 18. Drive is transmitted from the control motor 28 to the shaft 30 via a belt 32. However, once again, the control motor 28 can be mounted directly on the shaft 30 so that drive is transmitted directly to the shaft 30 without the need for a belt 32.

In the embodiment of FIG. 1 drive from either the motor 12 or the motor 14, or drive from both the motors 12 and 14 is input into the epicyclic planet system 16 which in turn drives the dual sunwheel system 18. Output power is supplied from the sunwheel system 18 to the shaft 20 to provide output propulsion. The drive ratio of the transmission is controlled by rotating the control shaft 30 relative to the input into the dual sunwheel transmission 18 by appropriate control of the control motor 28 as will be described in more detail hereinafter.

The coupling of the internal combustion motor 12 and electric propulsion motor 14 to the dual sunwheel system 18 via the epicyclic planet system 16 provides a decoupled connection of the two motors into the transmission which means that each can function independently except that they are part of the same planetary system and will alter the ratio at which power is input into the transmission. That is, if one motor shuts down the other is asked to supply sufficient power to drive the whole system and is able to do this because the decoupling causes a higher ratio for the motor left driving. Thus, the decoupling of the system by the epicyclic planet system enables both motors to be always connected to the system and either one or the other or both are able to provide drive without the need to disconnect one motor from the system such as by a clutch, dog or other mechanical device which would therefore uncouple one of the motors from the system when it is not required to drive.

In the embodiment of FIG. 1 the control motor 28 is controlled to control the control shaft 30 to set the drive ratio of the transmission. However, in some operating conditions the control motor 28 can also act as a generator to supply electricity. This supply of electricity can be used to recharge batteries (not shown) which power the electric propulsion motor 14.

Figure 2:
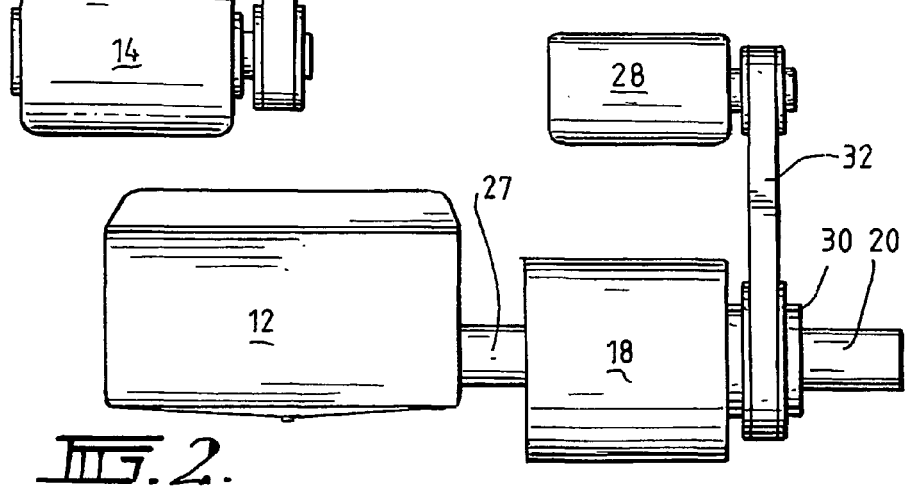
FIG. 2 is a schematic diagram of a transmission system according to a second embodiment of the invention.

FIG. 2 shows a transmission system according to a second embodiment of the invention. In this embodiment only a single drive motor such as an internal combustion motor 12 is utilised. The internal combustion motor 12 is connected to an input shaft 27 coupled to a planet case 42 (see FIG. 5) the sunwheel transmission system 18, and the sunwheel system has a control shaft 30 which is controlled by a control motor 28 via a belt 32 in the same manner as the previous embodiment. Once again, output power is supplied to output shaft 20 for driving a vehicle or other machine.

Figure 3:
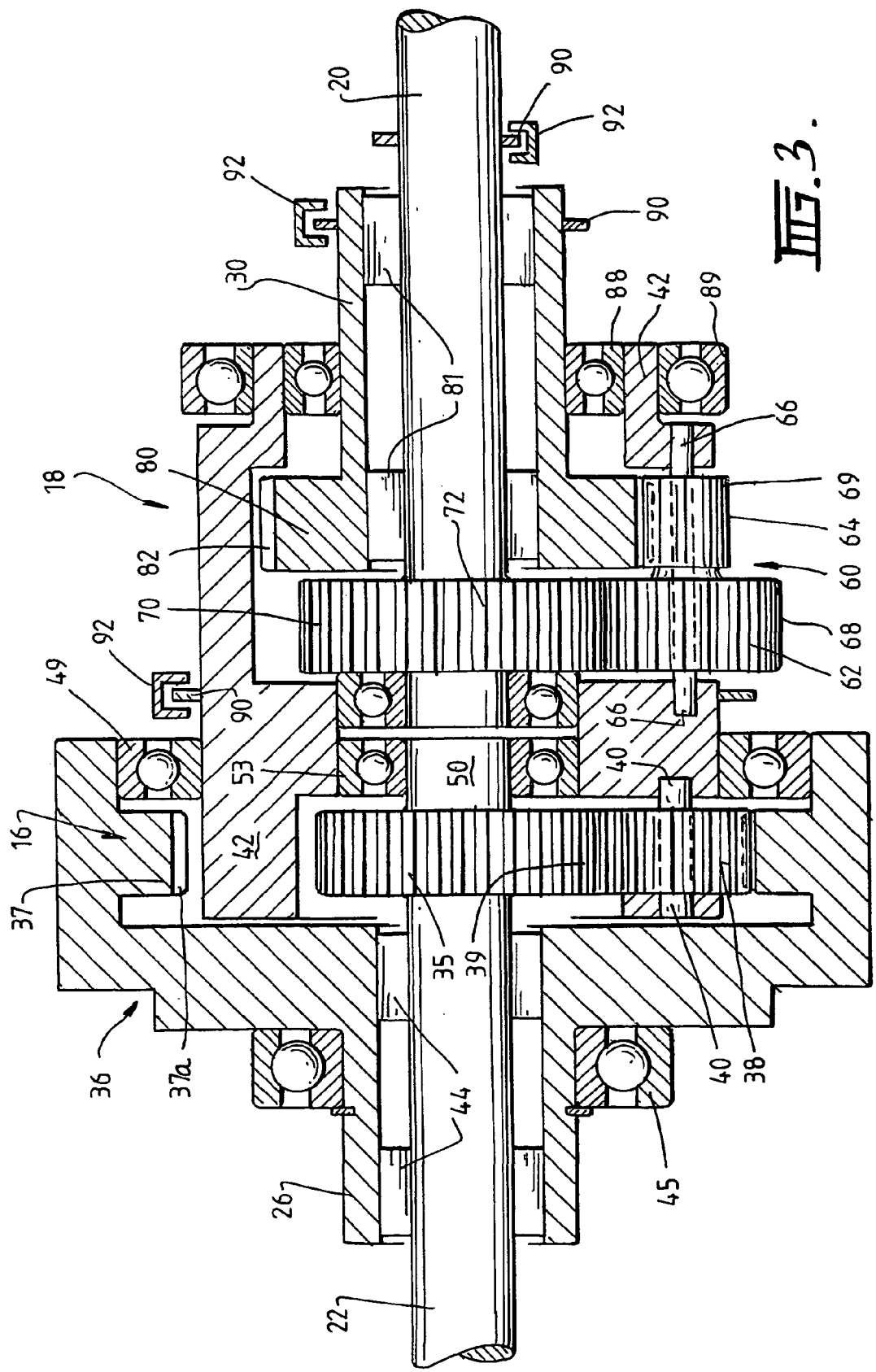
FIG. 3 is a cross-sectional view through part of the transmission system of FIG. 1.

FIG. 3 is cross-sectional view through the transmission system used in the embodiment of FIG. 1. With reference to FIG. 3 input shaft 22 from motor 12 is connected to a sunwheel 35 of the epicyclic planet system 16. The second input shaft 26 is connected to planet cage 36 of the system 16. Planet cage 36 carries an orbit gear 38 which has internal teeth 40. A plurality of planet gears 38 (only one shown) mesh with teeth 39 of the sunwheel 35 and also teeth 40 of the gear 38. The planet gears 38 are journalled on shafts 40 which are fixed to a planet cage 42 of the dual sunwheel system 18.

As shown in FIG. 3 the shaft 26 is concentric with the shaft 22 and in order to provide relative rotation between the shaft 22 bearings or bushes 44 are provided between the shaft 22 and 26. The shaft 26 may also be mounted on an external bearing 45. Planet cage 36 of the epicyclic system 16 is mounted on the planet cage 42 via bearing 49. The cage 42 of the dual sunwheel system 18 is mounted on a stub end 50 of input shaft 22 via a bearing 53.

Thus, when input drive is supplied to either the input shaft 22 or the input shaft 26 or both the input shafts 22 and 26 that drive is transmitted to planet cage 42 of the dual sunwheel system 18 via, in the case of the shaft 26, the planet cage 36, the gear 37, the planet gear 38 and the shaft 40 which connects to the planet cage 42 to therefore drive the planet cage 42, and in the case of the input shaft 22 via the sunwheel 35, the planet gear 38 and therefore the shaft 40 to drive the planet cage 42. That is, in both arrangements the orbiting of the planet gears 38 about the sunwheel 35 will carry with them the cage 42 so that the cage 42 is rotated about the longitudinal axis of the input shaft 22 and 26.

The cage 42 carries a plurality of planet systems 60. In the embodiments shown in FIG. 3 the planet systems 60 are in the form of a planet cluster having a first planet gear 62 and a smaller planet gear 64 formed integral with the planet gear 62. The integral cluster 60 is mounted on a shaft 66 which is fixed in the planet cage 42. In other embodiments, as will be described with reference to FIGS. 7 to 9 the planet system 60 can take forms other than an integral planet cluster of the type shown in FIG. 3.

The dual sunwheel system 18 includes a first sunwheel 70 and a second sunwheel 80. The second sunwheel 80 is formed integral with the control shaft 30. The first sunwheel 70 is formed on the output shaft 20. The first sunwheel 70 has teeth 72 which are in mesh with teeth 68 on the planet gear 62 and the second sunwheel 80 has teeth 82 which are in mesh with teeth 69 on the second planet gear 64.

As is shown in FIG. 3 the cage 42 is mounted onto the control shaft 30 by a bearing 88 and the cage 42 has a bearing 90 which mount onto a casing (not shown) of the transmission. As seen in FIG. 3 the control shaft 30 is mounted onto the output shaft 20 via bearings or bushes 81 so as to allow for relative rotation between the shafts 20 and 30.

When the planet cage 42 is rotated due to input power supply to the shafts 22 and 26 the planet cluster 60 is carried with the cage 42. Because of the meshing of the gear 62 with the sunwheel 70 drive is transmitted to the sunwheel 70 to rotate the sunwheel 70 and therefore rotate the output shaft 20 to provide output rotary power from the transmission. In order to control the drive ratio of the transmission the control shaft 30 is controlled by the control motor 28 described with reference to FIG. 1 so as to rotate the control shaft 30 at a predetermined speed relative to the input cage 42. By changing the speed of rotation of the control shaft 30 relative to the input cage 42 the speed of rotation of the sunwheel 80 is also changed relative to the cage 42. Because of the meshing of the sunwheel 80 with the planet gear 64 and integral coupling of the planet gear 64 with the gear 62 a change in relative speed of the sunwheel 80 will cause the planet cluster 60 to advance or regress relative to the cage 42 thereby causing the speed of the sunwheel 70 to advance or regress to thereby change the speed of the sunwheel relative to the cage 42 and change the speed of the output shaft 20 relative to the input shafts 22 and/or 26.

In order to control the drive ratio of the transmission the speed of rotation of the input cage 42 relative to the control shaft 30 or output 20 needs to be known so that the control shaft 30 can be controlled relative to the speed of the input cage 42 and output shaft 20 to set the drive ratio. In order to provide data for the relative control of the shaft 30 with respect to the input cage 42, the input cage 42, output shaft 20, and the control shaft 30 carry a slotted chopper wheel 90. The wheel 90 rotate with the cage 42, shaft 20 or the shaft 30 as the case may be and each of the wheel 90 has a photo-interrupter 92 associated with it. As each slot (not shown) in the wheels 92 pass through the respective photo-interrupter 92 a light pulse is detected within the photo-interrupter 92 to provide data relating to the speed of rotation of the shafts 20,30 and also the input cage 42.

In other embodiments rather than use a chopper wheel and optocoupler, other devices for providing data relating to the speed of rotation of the shafts 20 or 30 and the cage 42 can be used such as encoders and the like.

The manner in which the speed of the control shaft 30 and input cage 42 is monitored and used to control the drive ratio of the transmission will be described in more detail with reference to FIGS. 10 and 11.

In the embodiment of FIG. 3, if the control shaft 30 is rotating at the same speed as the input cage 42 then drive ratio set by the transmission is 1:1. If the control shaft 30 is rotating at speed slower than the input cage 42 then the drive ratio will drop from 1:1 down towards neutral depending on the speed differential between the control shaft 30 and the input cage 42. If the control shaft is completely stopped the output shaft 20 will be caused to turn in the reverse direction thereby providing a reverse gear. If the speed of the control shaft is greater than the input cage 42 then the drive ratio will go into overdrive.

Thus, by controlling the speed of the control shaft 30 via the control motor 28 the drive ratio of the system can be set.

Figure 4:
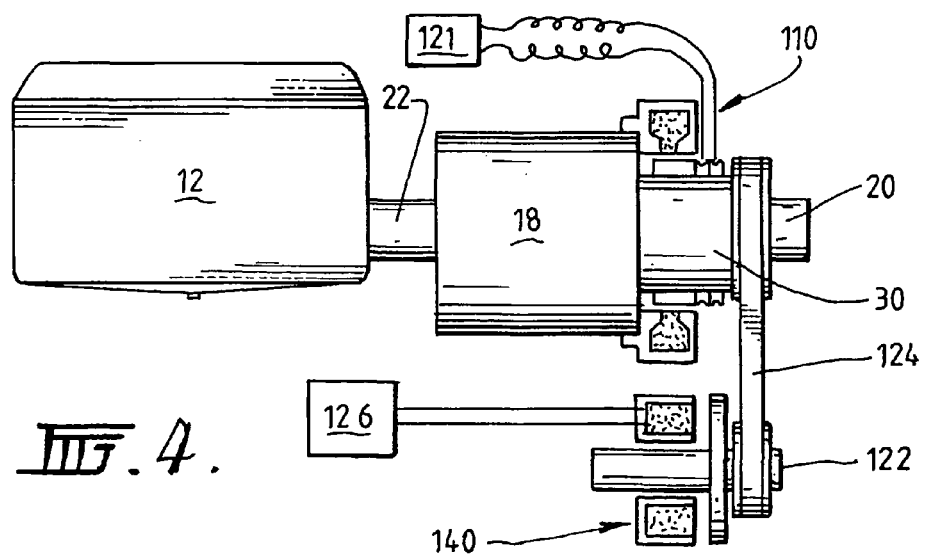
FIG. 4 is a schematic view of a modified form of the system shown in FIG. 2.

FIG. 4 is a view of a modified form of the second embodiment described with reference to FIG. 2. In this embodiment rather than utilise control motor 28 in order to control the drive ratio of the transmission the drive ratio is controlled by a magnetic clutch or brake system 110. The magnetic clutch or brake system 110 provides a progressive braking force to the control shaft 30 to adjust its speed. Such clutches are known and therefore need not be described in detail.

In this embodiment of the invention a second magnetic clutch 120 which can be identical to the first clutch is mounted on a shaft 122 which is coupled to the control shaft 30 by a belt 124. The purpose of the second clutch 120 is to provide a reverse gear. This system incorporates electric ratio control system 124 for supplying power to the clutch 110 to cause the progressive braking so that the shaft 30 is driven at the prescribed speed and an electronic reverse control 126 which provides power to the clutch 120 to provide the reverse gear function.

As explained-with reference to FIG. 2 this embodiment of the invention includes a single drive motor such as an IC motor 12.

Figure 5:
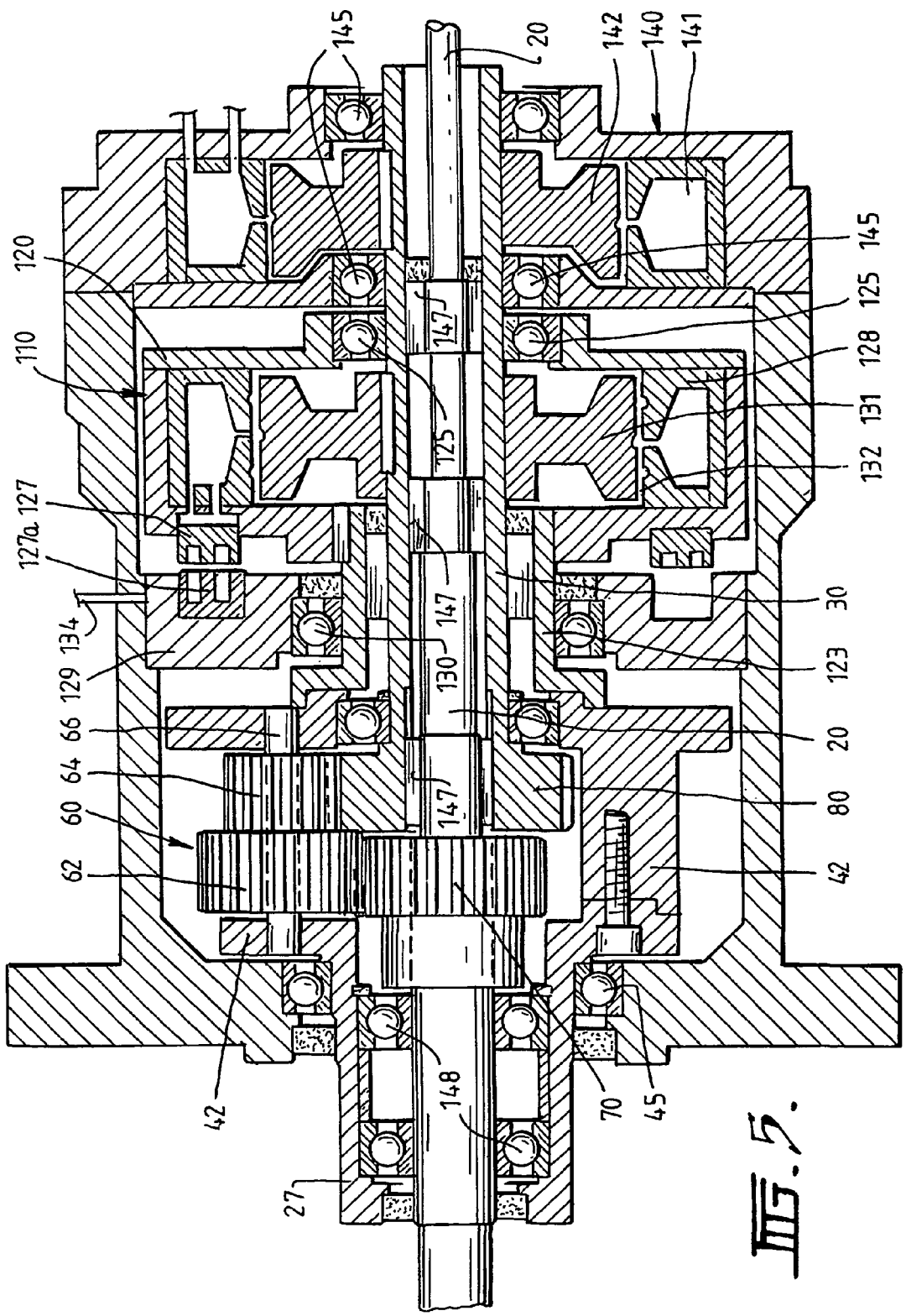
FIG. 5 is a cross-sectional view through part of the embodiment of FIG. 4.

FIG. 5 is a cross-sectional view through the transmission system of FIG. 4. Input supply is provided from the motor 12 to the input shaft 22 which is coupled to first planet cage 42. Planet cluster 60 is mounted in cage 42 and, as in the earlier embodiment, planet gear 62 meshes with the sunwheel 70 which is fixed onto the output shaft 20. Second sunwheel 80 is mounted on the control shaft 30 as in the earlier embodiment and, in this embodiment the output shaft 20 can extend through the control shaft 30 simply so that output power can be taken from either end of the transmission shown in FIG. 5.

As in the earlier embodiment planet cluster 60 is fixed to the cage 42 and the first planet gear 62 meshes with the sunwheel 70 and the second planet gear 64 meshes with the sunwheel 80. The first magnetic clutch 110 has a housing 120 which includes a sleeve section 123 which is fixed to cage 42. The housing 120 is mounted on bearings 126 for rotation relative to the control shaft 30. The housing 120 carries coil 128 which is connected to a slip ring 127. The slip ring 127 is provided adjacent ring 128 mounted in block 129 which is fixed to casing 150 in which the transmission is mounted. A bearing 130 is provided between the sleeve 123 and the casing 129 to provide for relative rotation of the sleeve 123 relative to the block 129. Electric current for controlling the coil 128 is supplied by wires 134 into ring 128 and then into slip ring 127 which rotates relative to ring 128 and slides on the ring 128 so power can be transmitted from the fixed ring 128 to the slip ring 127 and then into the coil 128. A brake element 130 is provided within the housing 120 and fixed to the control shaft 30. Cavity 132 between the brake element 130 and the coil 128 is filled with a non-permanently magnetisable material such as ferromagnetic material. When current is supplied to the coil 128 the ferromagnetic material progressively provides an impedance to the brake element 130 to thereby control the speed of rotation of the control shaft 30 relative to the input cage 42.

Thus, in this embodiment of the invention drive is transmitted from the input shaft 27 to the cage 42, the planet cluster 60 and then to the sunwheel 70. Because the housing 120 of the magnetic clutch 110 is fixed to the cage 42 the housing 120 is rotated with the cage 42. If no current is supplied to coil 128 the cage 120 is able rotate freely relative to the brake element 130 and therefore no control over the output 30 is supplied by the magnetic clutch 110. Thus, the output shaft 20 is driven with the input cage 42 via the input shaft 27 because of the transmission of drive from the cage 42 through the planet cluster 60 to the first sunwheel 70 which is fixed onto the output shaft 20.

If the magnetic clutch 110 is controlled so that the coil 128 is effectively locked onto the brake element 130 so that the brake element 130 rotates with the housing 120, the control shaft 30 is therefore rotated at the same speed as the input cage 42 and the drive ratio of the transmission is set at 1:1. Once again, if the control shaft rotates at a lower speed the drive ratio can change from 1:1 down to neutral depending on the relative speed differential. Neutral is achieved when the control shaft 30 is rotating quite slowly just before it stops. In order to stop the control shaft 30 so as to provide the reverse gear the second magnetic clutch 120 is energised to completely stop the control shaft 30 from rotating. In the embodiment of FIG. 5 the second magnetic clutch 130 is shown mounted directly on the control shaft 30 beside the first clutch 110 rather than being connected via the belt 124 shown in FIG. 4. Coil 141 of the second clutch 120 is mounted within the casing 150 and a brake element 142 of the second clutch 120 is fixed onto the control shaft 30 in the same manner as the brake element 130. Thus, when the coil 141 is fully energised to completely lock the brake element 142 to the coil 141 the shaft 30 is prevented from rotating because the coil 141 is fixed onto the casing 150. Once the shaft 30 is prevented from rotating the output shaft 20 is caused to rotate backwards by the drive transmitted from the cage 42 to the planet cluster 60 to the sunwheel 70 and therefore to the output shaft 20 thereby providing reverse gear. Thus, reverse gear is simply provided by controlling the second clutch 120 via the control 126 to cause the magnetic clutch 120 to provide full braking and therefore full coupling of the coil 141 to the brake element 142 so no rotation can occur between the element 142 and the coil 141 because the coil 141 is held fixed in the casing 150 the control shaft 30 is therefore completely stopped and held stationary. When it is no longer required to place the transmission into reverse the power to the coil 141 is stopped thereby releasing the braking effect of the second clutch 120 so that the control shaft 30 can then rotate under the influence of the control signals applied to the first magnetic clutch 110.

As in the earlier embodiment, if the control shaft 30 is controlled so that it rotates faster than the input cage the transmission goes into overdrive.

Although in the embodiment described above the second magnetic clutch 120 is used only for completely stopping the control shaft 30 to provide reverse gear, the second magnetic clutch 120 can also be used in combination with the first magnetic clutch 110 so as to provide precise control over the ratio set in the transmission. This can be achieved by controlling the magnetic clutches 110 and 120 to provide the braking previously described without fully locking the magnetic clutch 120 to stop the control shaft. The second magnetic clutch 120, apart from providing reverse gear, can also thereby provide some additional control over movement of the control shaft 30 that precise ratios can be set if desired.

The ability to use the second magnetic clutch 120 to assist in setting and controlling the drive ratio of the transmission in the embodiment described above is quite important because the effective "dynamic range" of the first magnetic clutch between fully locked on condition and fully released condition is relatively short. Therefore, it can be difficult to precisely set the drive ratio of the transmission or control the drive ratio of the transmission with only the first magnetic clutch operating. Using the second magnetic clutch provides a rapid means of correcting any error in the drive ratio which is set by the first magnetic clutch by quickly switching the second magnetic clutch on to provide an impedance or slight braking of the control shaft 30 in response to any over correction or adjustment of the control shaft, and therefore over correction or adjustment of the drive ratio of the transmission, which is set upon operation of the first magnetic clutch 110. Thus, by using the first and second magnetic clutches in combination the drive ratio of the transmission can be more quickly and accurately adjusted and set in accordance with the driving conditions which the transmission is experiencing and the drive ratio which is actually required or set by an operator.

The control of the magnetic clutches is substantially identical to the control of the control motor 28 in the earlier embodiment and generally the same control circuit to be described with reference to FIGS. 10 and 11 can be utilised. The magnetic clutches 110 and 120 are controlled by varying the duty cycle or pulse width of a signal supplied to the clutches so as to cause the gradual and progressive braking of the clutches to provide the required speed control over the shaft 30. For example, if no signal is applied to the coils of these clutches, in other words a signal having 0 duty cycle is applied, then the brake elements 130 and 142 are able to rotate freely. If a signal having a 100% duty cycle is supplied to the coils 128 and 141 the brake elements 130 and 142 are caused to lock fixed to the coils so that the brake elements cannot move relative to the coils and, in the case of the clutch 110 the brake element 130 and therefore the control shaft 30 will rotate with the coil 128 and therefore the cage 120 and input cage 42, and in the case of the clutch 120 the brake element 142 would remain stationary since the coil 141 is fixed stationary. If a signal having a duty cycle somewhere between 0 and 100% is supplied to the coils 128 and 141 then a partial braking effect is provided which, in the case of the clutch 120 will cause the brake element 130 to be dragged around with the coil 128 and housing 120 with a prescribed degree of slippage which is proportional to the duty cycle of the signals supplied. Thus, by varying the duty cycle the speed of rotation of the control shaft 30 relative to the input cage 42 can be set so as to set the speed of the control shaft 30 to set the drive ratio of the transmission.

As can be seen in FIG. 5 the second clutch 120 is mounted on bearings 145 to allow for rotation of the control shaft and the brake element 142 relative to the coil 141 and the casing 150 when no power is supplied to the coil 141.

As in the earlier embodiments the control shaft 30 is mounted onto the output shaft 20 by bearings 147. The input shaft 27 is also mounted on the output shaft 20 via bearings 148 to provide relative rotation between the output shaft 20 and the input 27.

In the embodiment of FIG. 5 the output shaft 20 is shown extending completely through the transmission. However, the output shaft need not extend any further than the first sunwheel 70 and the input 27 could be mounted on a lay shaft or otherwise journalled for rotation if desired. The arrangement shown in FIG. 5, as previously mentioned, simply provides configuration in which output power can be taken from either end of the transmission as is required.

Figure 6:
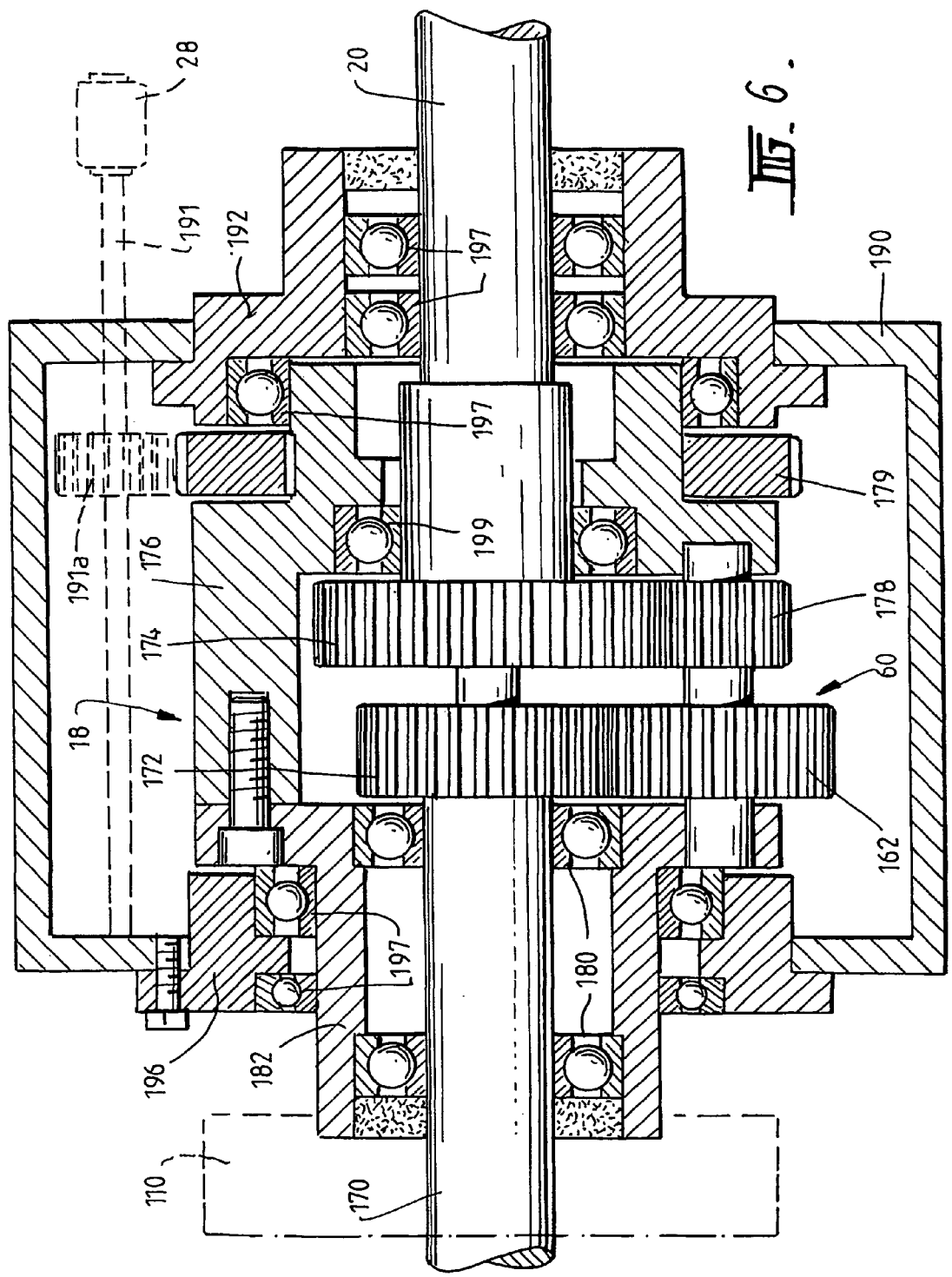
FIG. 6 is a cross-sectional view of a transmission system according to a still further embodiment of the invention.

FIG. 6 shows a still further embodiment of the invention. In this embodiment input rotary power is supplied by input shaft 170 to sunwheel 172 of the dual sunwheel system 18. Second sunwheel 174 is connected to output shaft 20. Cage 176 supports a plurality of planet systems 60 which, in this embodiment comprise a first planet gear 162 which is in mesh with the sunwheel 172 and a second planet gear 178 which is in mesh with the sunwheel 174. The gear 178 is formed separate from the gear 162 and meshes with the gear 162. The gears 162 and 178 are supported on separate shafts journalled in the planet cage 176.

Planet cage 176 carries a control gear 179 which is integral with the cage 176 or fixed onto the cage 176.

In this embodiment of the invention the input rotary power is supplied from a motor (not shown) to the input shaft 172 which rotates the sunwheel 172. Drive is transmitted to the planet gear 162 and then to the planet gear 178 which in turn, rotates the sunwheel 174. Rotation of the sunwheel 174 drives the output 20. In order to change the drive ratio of the transmission the cage 174 is caused to advance or regress relative to the sunwheel 172 by supplying drive to the gear 179. Advancing or regressing the cage 176 will cause the planet cluster 60 to advance or regress the sunwheel 174 thereby changing the drive ratio of the shaft 20 relative to the shaft 170.

The gear 179 is controlled to in turn control the rotation of the cage 176 by a control motor 28 which is the same as that previously described. The control system of this embodiment is shown in dotted lines and can include a lay shaft 191 connected to the motor 128. The lay shaft 191 carries a transfer gear 191a which is in mesh with the gear 179 so that by controlling the motor 28 the gear 191a is rotated to rotate the gear 179 and the cage 176.

In other arrangements the control may be preformed by a magnetic clutch 110 shown in dotted lines in FIG. 6 which is the same as that described with reference to FIG. 5. In this embodiment the magnetic clutch is connected to the input shaft 170 and also to the cage 176 via the stem portion 182 of the cage 176. As in the earlier embodiment, the coil can be mounted onto the shaft 170 and the brake element onto the stem 182 so that, depending on the signal supplied to the clutch 110 the stem 182 and the cage 176 is caused to rotate at a speed which is either identical to the input shaft speed or a described ratio with respect to the input shaft speed depending on the signal which is supplied to the clutch 110.

The embodiment of FIG. 6 has particular application to controlling the speed of machines which include one or more rollers and which are coupled to the output shaft 20 so as to enable at least one of those rollers to rotate at a precise drive ratio to other rollers. This, in turn, requires the machine to be able to control the drive ratio of the output shaft 20 very precisely so that the drive ratio between various rollers in the machine can be set. Thus, in this embodiment of the invention only forward rotation of the output shaft 20 is required and a reverse is never needed.

As shown in FIG. 6 the cage 176 is supported on bearings 180 by the stem portion 182. A casing 190 is arranged around the transmission and includes cover plates 192 and 196 which are either bolted to or fixed integral to the casing 190 and which mount on bearings 197. As also shown the cage 176 is mounted onto the output shaft 20 via bearing 199 to provide for relative rotation between the cage 176 and the output shaft 20.

Although in FIG. 6 the transmission has been described primarily with the shaft 170 acting as the input and which is driven by motor 110 and ratio control being achieved by controlling the cage 176, this transmission can be considered as a duel input system in which drive through both of the input shaft 170 and cage 176 power the transmission. In this case, the speed of the transmission is controlled by driving the cage 176, while the motor 110 which drives the shaft 170 is used as a tension sensing device and will modify the ratios produced by the control of the cage 176.

In this embodiment the motor 28 which controls the cage 176 can be a simple three phase motor and the nature of the control can be by way of the motor controller of the three phase motor.

The gear box of FIG. 6 is designed to perform very slow changes in ratio and to operate under constant load. The speed of the transmission is controlled by the motor 28 and the uncontrolled motor 110 simply senses the tension on the output shaft 20 through the process of what is known as slip in the motor 110.

Although the embodiment of FIG. 6 has been described in terms of the input power supply being introduced into the shaft 170, which in other embodiments is described as the control shaft, and control being performed by manipulation of the cage 176, the control is nevertheless performed by relative speed variation between the cage 176 and the shaft 170. Thus, for all intents and purposes, this embodiment could still be regarded as the same as the earlier embodiments in which input drive is provided into the cage 176 and control is provided by rotation of the shaft 170.

FIGS. 7 to 9 show first different embodiments of planet cluster system 60 which can be utilised in the preferred embodiments of the invention. FIG. 7 shows a configuration similar to that shown in FIG. 3 except in this embodiment the first sunwheel is larger than the second sunwheel 80 and the first planet gear 62 of the cluster 60 is smaller than the second planet gear 64. This form of planet cluster 60 and sunwheel configuration can be used in systems;

in which no reverse gear is required. In this system the output ratio is equal to $$\frac{1}{(1-(A/B \times C/D)}$$

with control shaft stationary;
the control gear ratio is $$\frac{1}{(1-(B/A \times D/C)}$$

with stationary (Neutral);
where A, B, C are the number of teeth on the sunwheel 80, second planet gear 64, first planet gear 62 and first planet gear 70 respectively.

FIG. 8 shows a system in which very high or very precise ratios are required. In this embodiment the first and second planet gear 62 and 64 are separated from one and other and mesh with an idler gear 200. The drive ratio can be determined in accordance with the equation referred to above and the idler gear 200 need not be considered.

FIG. 9 shows an arrangement in which the planet gear 64 carries a integral gear 201 which in turn meshes with the gear 62. The gear 201 is smaller than the gear 64. In this embodiment overdrive gear ratios can be provided and the control shaft 30 can turn in the same direction as the input.

The drive ratio is set by the following equation, in which A, B, C and D have the same meaning as described above.

$$R \text{ output} = \frac{1}{(1-(A/B \times C/D))}$$

$$R \text{ control} = \frac{1}{(1-(B/A \times D/C))}$$

when in neutral

Figure 10:
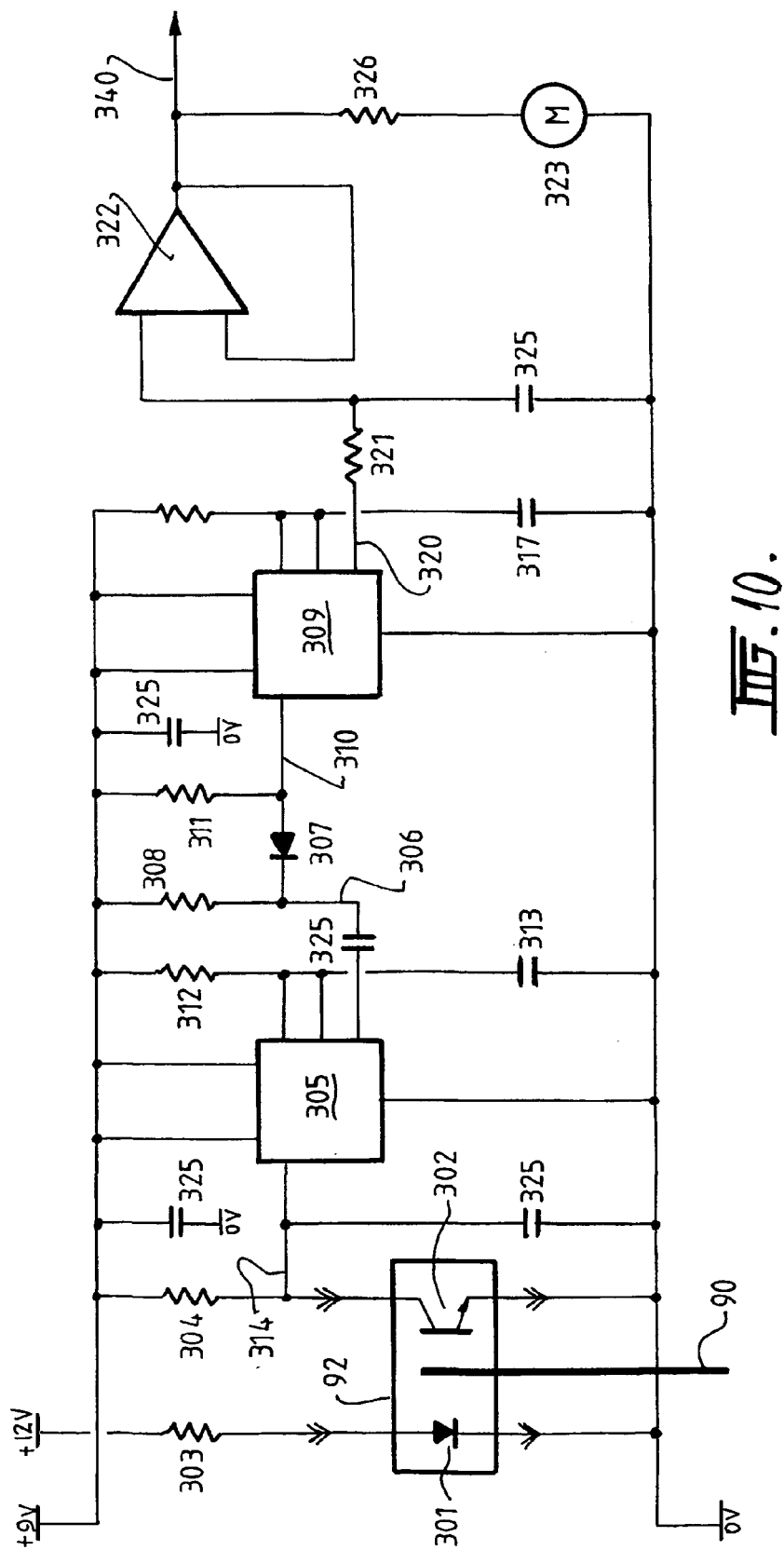
FIG. 10 is a circuit diagram forming part of a control system used in the preferred embodiments of the invention.
Figure 11A:
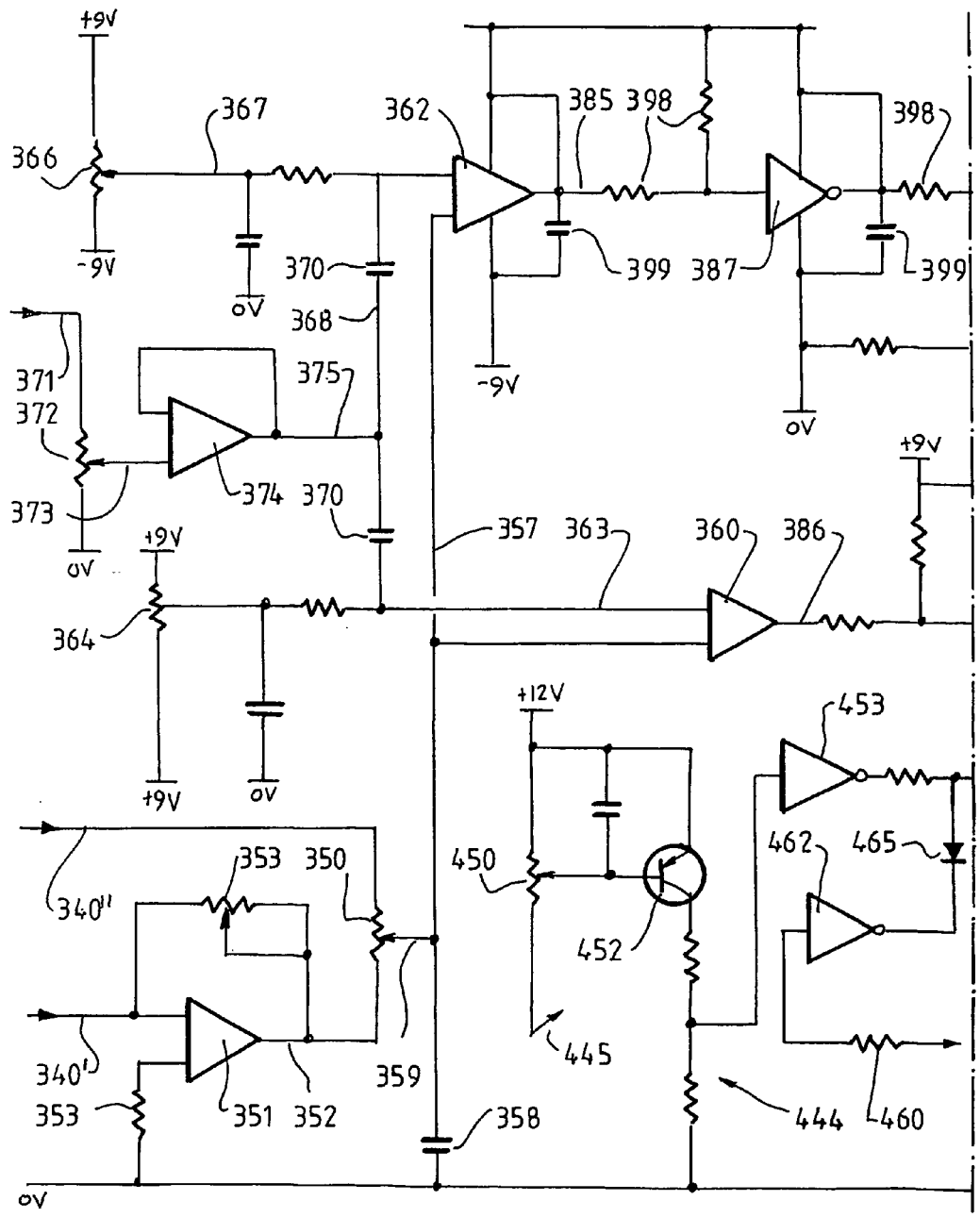
FIG. 11 is a further circuit diagram showing the remainder of the control system used in the preferred embodiment of the invention.
Figure 11B:
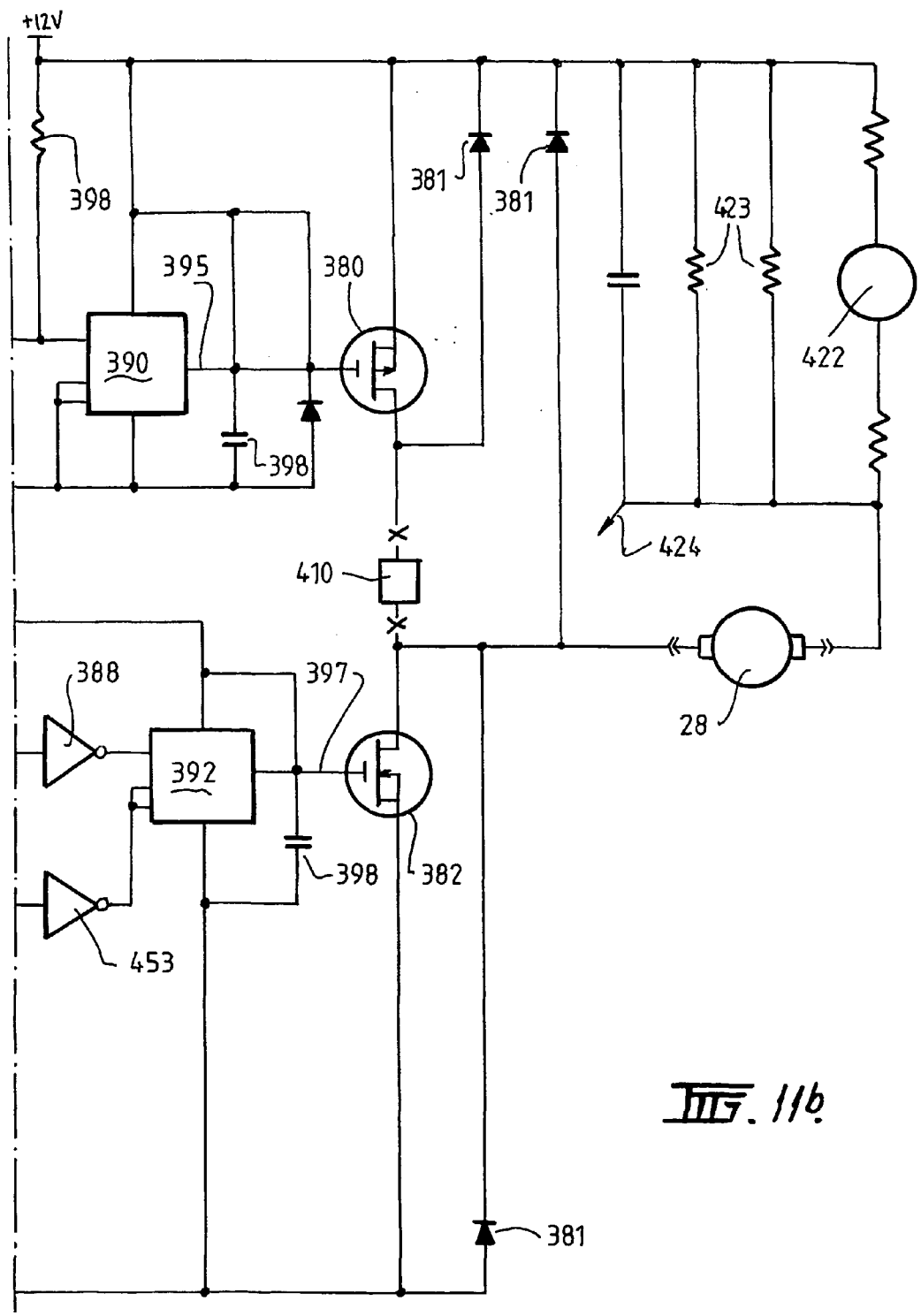

FIGS. 10 and 11 show control circuitry for monitoring the speed of the input cage 42, the output shaft 20, and the control shaft 30. As previously explained the control shaft 30 and the input cage 42 are provided with a chopper wheel 90 which has a plurality of slots and which with the respective cage 42 or control shaft 30.

In order to provide the control, any two of the speed of the input cage 42, the output shaft 20 or the control shaft 30 needs to be measured. If the speed of any two of the input cage 42, the output shaft 20 and the control shaft 30 is known, the speed of the remaining one of the input cage 42, the output shaft 20 and the control shaft 30 can be determined. This is because the speed of all of these components are interrelated by a function which is dependent on the number of teeth on the gears in the planetary system and on the sunwheels. Thus, for any particular speed of two of the input cage 42, the output shaft 20 and the control shaft 30, the speed of the remaining one of the input cage 42, the output shaft 20 and the control shaft 30 can be calculated. This relationship can be seen in FIG. 21, which will be described in more detail hereinafter by the trace T in that figure. As is apparent from the figure, the X axis is the speed of the control shaft 30 and the Y axis is the ratio of the input speed to the output speed. Thus, by measuring, for example, the speed of the control shaft, an indirect measure of the speed of the output shaft is also provided. Thus, the speed of the control shaft in fact provides an indication of the speed of the output shaft. In other words, by determining the ratio of the transmission (ie. the ratio of the input to the output, which is the Y axis in FIG. 21), and by determining where that ratio intersects the trace T, the control shaft speed can be determined from the X axis. In order to obtain a measure of the output speed from the control shaft speed, if the input shaft speed is known, the reverse can happen. This could be done mathematically if the mathematical function represented by the trace T is known, or a simple look-up table of input to output ratios with corresponding control shaft speeds could be provided in the processing circuitry so the processor can simply select the unknown speed from the table if the other two speeds are provided.

In the embodiment of FIG. 10, and also in the embodiment of FIGS. 24 and 25, the actual measured speed is the speed of the input 42 and the output 20 (and the corresponding input and output in the embodiment described with reference to FIGS. 24 and 25). However, the speed of the input cage 42 and the control shaft 30 could also be used with the control shaft speed being used as a proportional indication of the speed of the output shaft. Thus, only two of the three parameters referred to above need be measured, although, if desired, all three of the parameters could be measured and utilised.

FIG. 10 shows how the rotary speed of the input cage 42 or the output shaft 20 is measured. Each of the chopper wheels 90 is provided with a photo-interrupter 92 which includes a light emitting diode 301 and a light sensitive transistor 302. The chopper wheel 90 is disposed between the diode 301 and transistor 302 so each time a slot of the chopper wheel 90 interposes between the diode 301 and transistor 302 light is able to be transmitted from the diode to the transistor to cause the transistor 302 to conduct.

As is shown in FIG. 10 the diode 301 is connected to a 12 volt source of voltage via resistor 303 and the transistor 302 is connected to a 9 volt source of voltage via transistor 304. A buffer 305 is connected between the resistor 304 and the transistor 302 so that the buffer 305 receives a pulse each time one of the slots in the wheel 90 causes the transistor 302 to change state from a conducting condition to a non-conducting condition. The buffer 305 has an output line 306 which connects to a diode 307. The output line 306 is connected to 9 volt voltage source via resistor 308 and a second buffer 309 is connected to the diode 307 by line 310. Resistor 311 connects between the 9 volt voltage source and line 310 between the diode 307 and the buffer 309.

The buffer 305 is also connected via resistor 312 to the 9 volt voltage source and via compacitor 313 to ground to provide power and conventional control to the operation of the buffer 305. The buffer 305 acts to condition the pulse received on line 314 into a square wave pulse and diode 307 and resistor 311 convert the square wave output pulse received on line 306 from the buffer 305 to a series of spikes by removing the high or positive component of the square wave pulses to thereby leave the low or negative component to producing a series of spikes of a particular frequency on line 310 which are received by the second buffer 309. The buffer 309 is connected to resistor 316 and also compacitor 317 which set a time delay in the buffer 309 so each pulse output from the buffer 309 is time delayed by a particular amount set by the value of the resistor 316 and compacitor 317. The output from the buffer 309 is provided on line 320 via resistor 321 to operation amplifier 322. The operational amplifier 322 receives the pulses from the buffer 309 and produces an output voltage which is proportional to the frequency of the pulses of for example, between 0 and 8.5 volts. A meter 323 can be connected in parallel with the operational amplifier 322 simply for providing an indication of the nature of the signal output from the operational amplifier 322.

The circuit showing FIG. 10 is therefore a circuit which converts frequency to voltage to thereby obtain a voltage signal which is proportional to the rotary speed of the chopper wheel 90 and therefore the respective input cage 42 or output shaft 20.

The circuit showing FIG. 10 may include additional compacitors 325 and resistor 326 which act to provide required signal conditioning and filtering.

Thus, the circuit shown in FIG. 10 produces a DC voltage at output 340 between, for example, 0 volts and 8.5 volts, which is proportional to the speed of rotation of the output shaft 20 or the input cage 42 as the case may be.

With reference to FIG. 11, the output 340 which relates to the input cage 42 is supplied on line 340' in FIG. 11 and the output from the circuit which is associated with the output shaft 20 appears on line 340" in FIG. 11. Line 340" is connected directly to a pot 350. The line 340' is connected to an invertor 351 which inverts the voltage signal on line 340' so that, for example, if a 5 volt signal appears on line 340' the output 352 of the invertor 351 is −5 volts, The invertor 351 has a resistor 353 connector to one of its inputs merely to stop offset errors and assist proper operation of the invertor 351. The invertor 351 may also be provided with a trim-pot circuit 353 which can change the nature of the inversion of the invertor 351 should that be desired or necessary. For example, if something other than the inverted signal is required at output 352 then the trim-pot circuit 353 can be adjusted to, for example, in the case of a five volt signal on line 340' provided a 4 volt signal on line 352 should that be required or necessary. This type of alternation of the signal could be used if it is desired to, for example, sense the speed of the control shaft, rather than the output shaft and by appropriate setting of the pot, convert the voltage value to a voltage representative of the output shaft speed in accordance with the functional relationship described with reference to FIG. 21 or from an appropriate look-up table.

Alternatively, the trim-pot circuit 353 can be adjusted to ensure that the signal on line 352 is of the same magnitude but of opposite plurality to that on line 340' should that be necessary.

The trim-pot 350 has a wiper arm 355 which is connected to line 357. The line 357 connects to ground via a capacitor 358 which removes high speed erroneous signals which may be generated from the pot 350.

The pot 350 provides the ratio transmission control function and would act as an input in order to change the drive ratio of the transmission. For example, the pot 351 could be under the control of gear shift or other device in order to provide gear changes within a vehicle within which the transmission is installed.

As will be explained in more detail hereinafter by changing the wiper 355 the output from the wiper 355 on line 357 will change which will cause a change to the drive ratio of the transmission. If we assume, for example, that the input cage 42 and the output shaft 20 are rotating at the same speed then the same voltage signals are applied on lines 340" and 340'. If the wiper 355 is set at its mid point then the signals applied to the pot 350 cancel each other out because the signal on line 340' has been inverted by the invertor 351. Thus, if the wiper 355 is at its mid point 0 volts appear at line 357. By changing the position of the wiper the drive ratio can be set because of the different voltage ratio set by the pot 350. For example, the wiper 355 can be moved by the gear change (not shown) so that in order to produce the 0 volts at the wiper 355 the signal on line 340" must, for example, be higher than the signal on line 340', indicative of the fact that the output shaft is travelling at a different speed to the input thereby producing a particular ratio which is set by the driver by manipulation of the gear shift.

Line 357 is connected to the non inverting input of a first operational amplifier 360 and a second operational amplifier 362. The inverting input of the operational amplifier 360 is connected via line 363 to a motor pre-set pot 364. The inverting input of the amplifier 362 is connected to a generator pre-set pot 366 via line 367. The lines 363 and 367 are connected by line 368 which includes capacitors 370. A saw tooth signal input 371 is connected to a pot 372 which in turn has a wiper 373 connected to buffer 374 which has an output 375 which connects between the capacitors 370. A saw tooth signal is supplied to the line 371 from a saw tooth wave generator (not shown) and the pot 372 acts as a loop gain in order to set the frequency or size of the saw tooth wave which is supplied by the buffer 374 to the output 375. The capacitors 370 isolate the DC voltage received on lines 364 and 367 and allow the saw tooth signal to be supplied to the inverting inputs of the operational amplifiers 360 and 362.

The pots 364 and 366 are set to shift the voltage on the inverting inputs of the operational amplifiers 360 and 362 away from 0 volts by different amounts so that field effect transistors 380 and 382 will be switched on and off at different times and cannot be switched on together as will be explained in more detail hereinafter for the reasons which will also be explained in more detail hereinafter.

The offset set by the pot 366 is a slight positive voltage above 0 volts and the offset which is set by the pot 364 is a slight negative voltage of the same magnitude below 0 volts.

The operational amplifiers 360 and 362 therefore receive on their non inverting inputs the voltage signals supplied by the wiper 355. If we assume that the voltage signal is positive voltage indicating that the control shaft 30 is relating at a higher speed than is required, as set by the gear shift and the position of the wiper 355, a high output will appear on line 385 and 386 from the operational amplifiers 362 and 360. The signal on lines 385 and 386 is inverted by invertors 387 and 388 so that a low signal is supplied to buffers 390 and 392. The invertors 387 and 388 are provided to clean up the edge of the signals received from the amplifiers 362 and 360 and the invertors also act to assist in conditioning of the signal because they basically ignore small voltage changes and only switch large voltage changes. The signal which is supplied to the buffer 390 or 392 from the invertors 387 or 388 appears on output lines 395 from the buffers and is used to control the transistors 380 and 382 to either place the motor 28 into a driving condition where it can drive the control shaft 30 (to speed it up) or in a generator condition in which the motor actually generates power to supply to a load 410 and impedes the control shaft 30. The actual inversion of the signal from the operational amplifiers 362 and 360 is not required and if the signal is not inverted (and otherwise conditioned for supply to the buffers 390 and 392) the high signal from amplifiers 360 and 362 could simply be input to the inverting inputs of the buffers 390 and 392 so that output from the buffers on line 395 and 396 is low.

Resistors 398 and capacitors 399 provide signal conditioning and stop stray signals from the power supply from upsetting operation of the operational amplifiers 360 an 362.

The field effect transistor 380 is a P channel transistor and the field effect transistor 382 is an N channel transistor. Transistor 380 has its gate connected to the 12 volt voltage supply whereas the transistor 382 has its gate connected to ground.

A load 410 is connected between the transistors 380 and 382. Control motor 28 for controlling the speed of the control shaft 30 is connected between the 12 volt supply and a point between the load 410 and the transistor 382.

The transistor 382 forms a motor control transistor for driving the motor and the transistor 380 forms a generating control transistor for allowing the motor 28 to provide generated electric power to the load 410.

A meter 422 may be connected in series with the motor for measuring the current through the motor and shunt resistors 423 are connected across the motor 422 to enable the voltage signal to be read from the meter 422.

The voltage across the motor 422 is also supplied at point 424 to a current shut off circuit 444 at point 445.

When the output from the operational amplifiers 385 is high indicating that the output shaft 20 is rotating at higher speed than required and therefore that the transmission is in a higher gear than required the transistor 380 is turned on by the low signal on line 395 and the transistor 382 is turned off by the low signal on line 397. Thus, power is not supplied to the motor 28 and the spinning of the motor 28 because it is connected to the control shaft 30 causes the motor 28 to actually generate electricity which is supplied to the load 410. Since the motor is no longer powered it impedes the control shaft 30 to reduce the speed of the control shaft 30 until the output shaft 20 is at the required speed to produce the 0 volts at the wiper 355.

If the motor 28 is running faster than is required because of the speed of the control shaft 30, which may be the case during regenerative braking situations or if the vehicle is suddenly under less load, for example, if it begins to travel downhill, the motor 28 can therefore generate power and supply the power to load 410 for either recharging batteries or for any other use of electrical power which may be required by the vehicle or system in which the transmission is installed.

If the input speed into the transmission is too high so that the signal on line 340' is of higher magnitude than the signal on line 340" then a negative voltage will appear at wiper 355 which is supplied to the amplifiers 360 and 362. This will produce a high signal at the transistors 380 and 382 which will cause the transistor 380 to switch off and the transistor 382 to switch on. When the transistor 382 is switched on power is able to flow from the supply voltage source through the motor 28 and the transistor 382 to thereby drive the motor 28. By driving the motor 28 the motor will speed up the control shaft 30 so as to adjust the drive ratio of the transmission. This form of adjustment continues to happen depending on the position of the wiper 355 and therefore the gear in which the transmission is set so as to produce a 0 voltage at the wiper 355. When 0 volts appears at the wiper 355 the transistors 380 and 382 are effectively switched off so that the motor 28 is not driven, nor does it generate because the rotation speed of the control shaft 30 is correct and the transmission is therefore in the correct drive ratio. Thus, the circuit shown in FIG. 11 continually attempts to bring the voltage at the wiper 355 to 0 and the rotational speed at the control shaft 30 is therefore set depending on the position of the wiper 355 to set the drive ratio of the transmission.

The manner in which the motor is switched on and switched off will be described in more detail hereinafter.

The diodes 381 prevent any transient during switching on and off of the motor 28 from being supplied to the transistors 380 and 382 and will result in any such transient voltage merely being conducted to the power supply to prevent damage to the transistors 380 and 382.

When the voltage of the wiper 355 is 0 or very close to 0 volts then the transistors 380 and 382 will toggle on and off causing the motor 28 to continuously switch between a powered condition when the transistor 382 is on and power is supplied through the motor 28, to a generating condition when the transistor 380 is on and power is effectively switch off to the motor 28.

At extreme positive or negative voltages at the wiper 355 the motor 28 can either be switched on to drive all the time or switched off completely so it is fully generative. When the motor is switched on all the time the control signal has a duty cycle of 100% and when the motor is switched off all the time the control signal has a duty cycle of 0%.

At voltages in between the extreme voltage and 0 voltage, some degree of switching on and off of the motor 28 takes place in accordance with the duty cycle or pulse width of the signals which apply to the transistors 380 and 382 as will be explained in more detail hereinafter.

As previously explained, the generator preset pot 366 and the motor preset pot 364 are set so that the inverting inputs of the operational amplifiers 362 and 360 are set differently. The result of this is that the two transistors 380 and 382 can never be switched on at the same time and that there is a delay between the time that one of the transistors is switched off and the other is switched on so they do not conduct at the same time. If the transistors 380 and 382 conduct at the same time then supply of power completely bypasses the motor 28 and may damage the transistors 380 and 382 or simply heat up the load 410 and possibly damage it. The overlap or underlap of the on and off signals supplied to the transistors 380 and 382 from the buffers 390 and 392 is therefore set by adjusting the pots 366 and 372 to ensure that the voltage shift on the inverting inputs of the preamplifiers 360 and 362, from 0 volts, is different.

As previously mentioned, over current sensing circuit 444 connects to point 424 which provides a signal indicative of the current through the motor 28. If the current is too large, which value is set by pot 450, a signal is supplied to transistor 452 which causes the transistor to switch on thereby supplying a voltage signal to invertor 453. This signal is supplied to invertor 453 and then to buffer 392 to switch the buffer off so that transistor 382 cannot be switched on thereby preventing the flow of current through the motor 28 and preventing damage to the motor 28 in the case of an over supply The buffer 392 is also switched off to prevent the motor 28 from being driven when it is desired to place the vehicle in reverse gear. When the vehicle is placed in reverse gear (which is done by causing the output shaft 20 to become stationary thereby requiring-the motor 28 to not drive the control shaft 30), a signal from a reverse switch associated with the gear shift is supplied via resistor 460 to invertor 462. The invertor 462 is connected to invertor 453 via diode 465 so that the invertor 453 supplies the signal to the buffer 392 to switch off the transistor 382 and maintain the transistor in the switched off condition until the signal supplied through resistor 460 is removed (indicative of the vehicle being taken out of reverse gear).

As previously described, the signal supplied to the inverting input of the amplifiers 360 and 362 is a saw tooth signal which is superimposed on the DC signal supplied from the pots 364 and 366.

Figure 12:
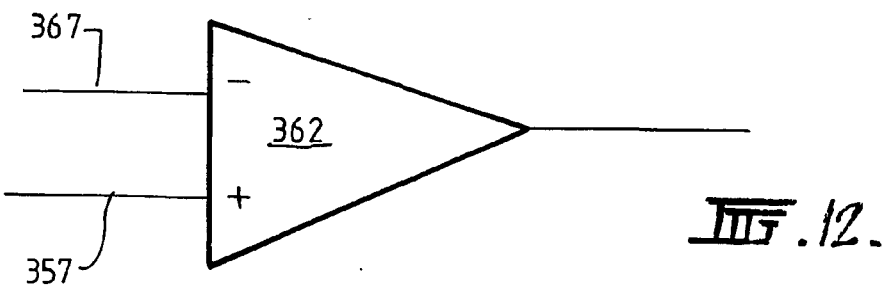
FIG. 12 is a diagram showing an operational amplifier used in the circuit of FIG. 11 and used to illustrate operation of that circuit.
Figure 13:
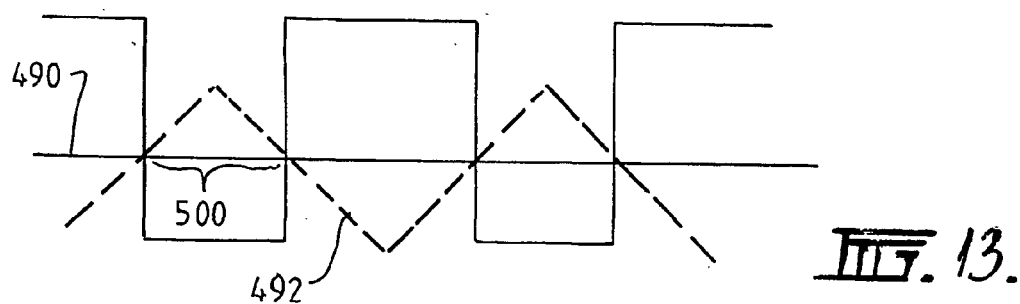
FIG. 13 shows how pulse width control is performed by the circuit of FIG. 11 in order to control the drive ratio of the transmissions according to the preferred embodiments of the invention.

As is shown in FIGS. 12 and 13 the triangular wave is supplied to the operational amplifier 362 at the inverting input on line 367 and the DC voltage from the pot 350 is supplied to the non inverting input on line 357. The output from the operational amplifier 362 is therefore in the form of a pulse width signal which is defined by the intersection of the DC signal 490 shown in FIG. 13 and which is supplied on line 357 and the triangular wave 492 which is supplied on line 367. As the signal 490 increases or decreases then the effective pulse width defined by the portion of the signal 390 which intersects the triangular wave and labelled 500 in FIG. 13 will increase or decrease in length thereby changing the effective pulse width of the signal output from the operational amplifier 362. Thus, the transistors 380 and 382 are controlled variable pulse width signals which are set by the triangular wave 492 and the level of the DC voltage on line 357 to provide pulse width control of the motor 28 so that the motor 28 is switch on and off in accordance with the pulse width of the signals supplied to the transistors on lines 395. Therefore, the motor 28 is controlled in accordance with a variable pulse width signal which is proportional to the voltage at the wiper 355 of the pot 350.

Because the pots 364 and 366 are set differently, as has been previously explained, the operational amplifiers 362 effectively switch at different points on the triangular wave because of the different 0 voltage offset, set by those pots 364 and 366. If an extreme error occurs between the required speed of the output shaft 20 and the required speed of the input cage 42 a larger extreme voltage error signal at wiper 355 will be produced. In these situations only the motor operational amplifier 360 will change at this extreme level thereby switching motor 28 on to control the speed of the control shaft 30 to adjust the drive ratio of the transmission to that which is required. If the error voltage signal at the wiper 355 is very small indicative of very small changes then the transistors 380 and 382 will effectively switch on and off relatively quickly causing the motor to switch on and off rapidly to maintain the speed of the control shaft 30 so that drive ratio of the transmission is held at the required ratio.

Thus, when the vehicle including the transmission according to the present invention is initially started the motor 28 rotates the control shaft 30 slowly so as to maintain the vehicle in neutral. This can be don by ensuring that the vehicle can only be started with a gear stick in neutral as in the case of a convention automatic transmission so that as soon as the transmission system is powered the control circuitry of FIG. 11 appropriately sets the speed of the control shaft 30 to provide neutral gear. However, in general, because the vehicle is stationary and there is no load on the control shaft 30 the dual sunwheel system 18 will tend to merely go into neutral gear by rotating the sunwheel 80 and therefore the control shaft 30 because the output shaft 20 is stationary. In order to increase the speed of the vehicle the gear shift is manipulated to cause the wiper 355 to move to change the voltage division ratio set in the pot 350. The nature of the change of the wiper 355 is to make the voltage signal on the wiper 355 negative. This negative voltage is applied to the operational amplifiers 360 and 362, the invertors 388 and 387 and the buffers 392 and 390 which, in this case, results in a low signal being applied to the transistors 380 and 382. This switches the transistor 382 on to cause the motor 28 to be driven so that motor rotates the control shaft 30 to increase the speed of the control shaft 30. As the speed of the control shaft 30 increases the transmission is driven down in ratio (or up in gear to a higher gear) towards 1:1 ratio so that the speed of the vehicle increases. This will continue to happen until the voltage signal on the lines 340" and 340' cause a 0 voltage output at the wiper 355. If the gear shift continues to move into a higher gear then the same process occurs to further reduce the gear ratio of the transmission or place the transmission to a higher gear thereby making the vehicle travel faster. Similarly, if it is desired to increase the drive ratio or place a transmission into a lower gear then the wiper 355 is adjusted by manipulation of the gear stick or automatic transmission so that the divided voltage at the pot 350 is positive at the wiper 355. This causes the transistor 380 to be turned on as previously explained and the transistor 382 to be turned off so that the motor no longer drives the control shaft 30 so that the control shaft 30 will slow thereby placing the transmission into a lower gear. This will continue to happen again until the voltage of the wiper 355 is 0.

FIGS. 14 to 19 show how the pulse width control of the motor 28 takes place and also how the transistors 380 and 382 are prevented from turning on at the same time.

Figure 14:
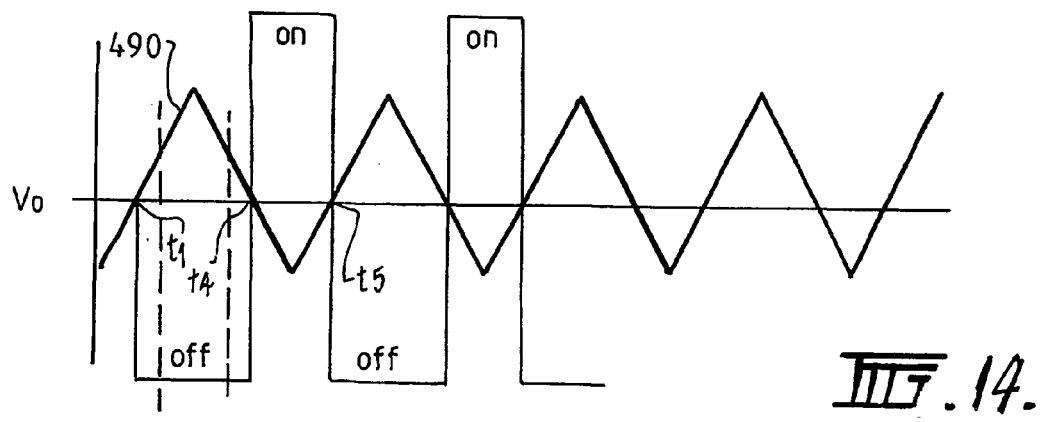
FIGS. 14, 15, 16, 17, 18 and 19 are diagrams showing signals created and used in the circuit of FIG. 11 to facilitate explanation of the manner in which the circuit operates.

FIGS. 14 an 15 are pulsed diagrams showing the signals supplied to the transistors 380 and 382 respectively.

Figure 15:
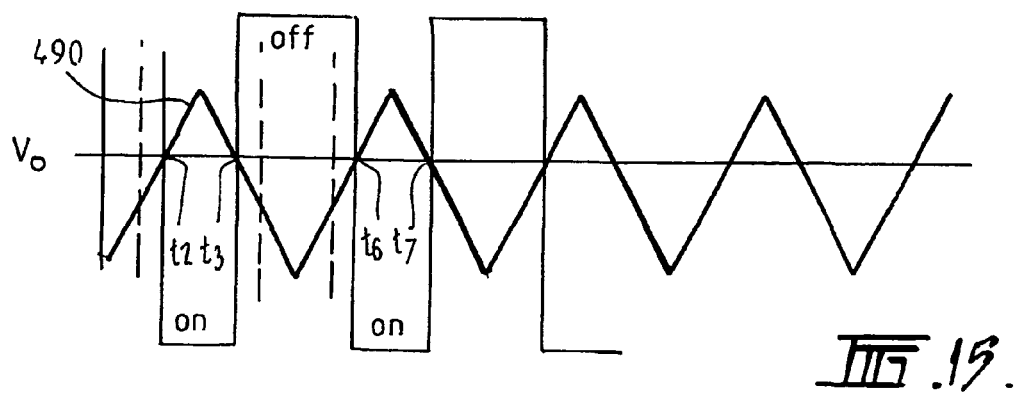

As can be seen the saw tooth signal 490 has been lifted up above 0 volts by the offset voltage supplied by the voltage supplied by the pot 366 and the saw tooth wave 490 in FIG. 15 has been moved downwardly by the negative offset voltage set by pot 364. In FIGS. 14 and 15 VO is the voltage supplied at the wiper 355 and for the sake of comparison in FIGS. 14 and 15 we will assume that voltage is 0 volts. The saw tooth signal 490 shown in FIGS. 14 and 15 has the frequency of say 3.6 KHz suitable frequency other than that could be used if desired. Since 0 volts are produced at the wiper 355 the transmission system is in the right drive ratio and the control shaft 30 is rotating at the right speed to maintain that drive ratio. As can be seen from FIGS. 14 and 15, prior to time t1 transistor 380 is on because a low signal is supplied to that transistor and transistor 382 is off because a low signal is applied to that transistor. Thus, no power is supplied to the motor 28 and it is not driven. Rotation of the motor 28 by virtue of its connection with the control shaft 30 causes the motor 28 to generate and supply electricity to the load 410 via the transistor 380. At time t1 the voltage of the saw tooth wave crosses 0 volts and becomes positive and therefore the high voltage is supplied to the transistor 380 which causes the transistor 380 to switch off. At time t1 the transistor 382 is also off because the voltage applied to that transistor is still low. At time t2 the saw tooth voltage applied to the comparative 360 switches from negative to positive and shown in FIG. 15 and transistor 382 receives a high signal thereby switching the transistor on. It will be apparent from the graphs in FIGS. 14 and 15 that between times t1 and t2 both transistors 380 and 382 are switched off and therefore the transistor 382 cannot be switched on before the transistor 380 is off. The time t2–t1 is the delay between switching off the transistor 380 and switching on the transistor 382. The transistor 382 remains switched on until time t3 while the saw tooth wave voltage is positive and shown in FIG. 15. At time t3 the saw tooth wave voltage 490 in FIG. 15 again goes negative thereby switching off the transistor 382. It should be noted that at this time the saw tooth wave voltage 490 in FIG. 14 and which is applied to the transistor 380 is still positive thereby maintaining the transistor 380 off. At time t4 the voltage of the saw tooth wave in FIG. 490 goes negative thereby switching the transistor 380 on. It should be noted that between the times t3 and t4 both transistors are switched off again preventing one transistor from being switched on while the other is already on. The transistor 380 remains for the time period between times t4 and t5. The transistor 382 is switched off for that entire time period. At time t5 the transistor 380 is switched off as the saw tooth wave 490 goes positive in FIG. 14. At this time the transistor 382 is still switched off because of the voltage of the saw tooth wave at that time is still negative. At time t6 the transistor 382 is switched on. Thus, it would be appreciated that between times t5 and t6 both transistors are switched off. The transistor 382 is switched on from period t6 to t7 while the transistor 380 is maintained off for that entire period. Thus, the delay between switching one transistor on after the other transistor goes off is set by the different offset voltages which are supplied to the amplifiers 360 and 362 and which is defined by the time differences t2–t1, t4–t3, t6–t5 etc shown in FIGS. 14 and 15. Thus, one transistor is always required to switch off before the other can be switched on.

The graphs is FIGS. 14 and 15 show that when the voltage at the wiper 355 is 0 volts or very close to 0 volts the transistors 380 and 382 toggle on and off with a duty cycle which is set by the time (t3−t2)÷(t6−t3) in the case of the transistor 382 and time (t4−t1)÷(t5−t4) in the case of the transistor 380. The toggling on and off of the transistors causes the motor 28 to be driven in short bursts by pules of power supplied while the transistor 382 is switched on with those pules of power being determined by the duty cycle referred to above. Thus, the motor is driven slightly to drive the control shaft 30 then switch off so that the control shaft is impeded and so on with a frequency of 3.6 KHz and a duty cycle of the on time to the off time which is determined as mentioned above and which is dependant on the voltage VO at the wiper 355. Thus, during this toggling on an toggling off the control shaft is driven slightly then slowed whilst the motor generates through the load 410, then driven to maintain the 0 volts at the wiper 355 and maintain the control shaft travelling at the required speed to set the drive ratio regardless of the momentum changes within the transmission.

Figure 16:
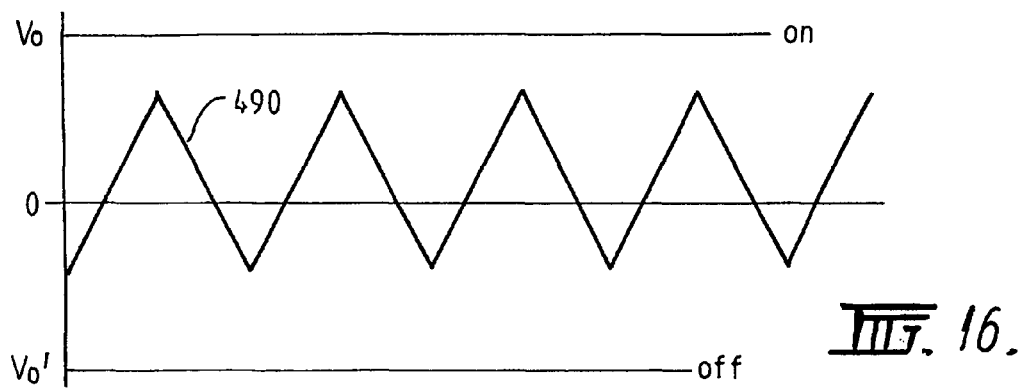
Figure 17:
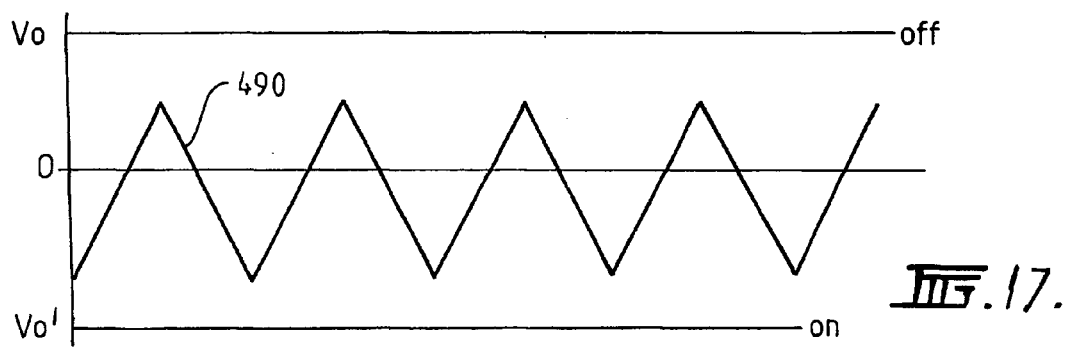

FIGS. 16 and 17 show an extreme condition of the voltage at the wiper 355. If we assume that the speed of control shaft 30 is extremely high and producing a high positive voltage at the wiper 355 of VO shown in FIGS. 16 and 17 which is greater than the amplitude of the saw tooth voltage 490 then a continuous high voltage is output from the amplifiers 360 and 362 which results in a low signal being applied to the transistors 380 and 382. This switches the transistor 380 permanently on and the transistor 382 permanently off so that the motor is not driven and is in the generative state where it supplies electricity through the load 410 and transistor 380. This impedes the control shaft 30 to slow the control shaft the control shaft will be continuously impeded until the voltage VO at the wiper 355 reduces so that it again overlaps the saw wave signal 490 at which stage the toggling effect described above will again begin to commence with a duty cycle dependant on the position of where the voltage VO overlaps the saw tooth wave 490.

At the opposite extreme where the signal on line 340' is much higher than a signal on the line 340" indicating that input is travelling much faster than the control shaft (for the required gear ratio) a negative voltage is produced at the wiper 355 of amplitude greater than the saw tooth wave amplitude as shown by voltage VO' in FIGS. 16 and 17. The opposite effect takes place because the low voltage VO will produce a high at the transistor 380 therefore turning the transistor 380 off and a low voltage at the transistor 382 thereby turning the transistor 382 on. Thus, the motor is powered by electric current supplied from the power supply through the motor, through the transistor 382 and to the other terminal of the power supply so the motor 28 is driven to speed up the control shaft 30 to change the drive ratio of the transmission. As the voltage VO' rises from its extreme negative value towards 0 volts and overlaps the saw tooth signal 490 the toggling effect again beings to commence with transistors 380 and 382 being switched on and off with a duty cycle which is set by the position at which the voltage VO' overlaps the saw tooth wave signal 490.

Figure 18:
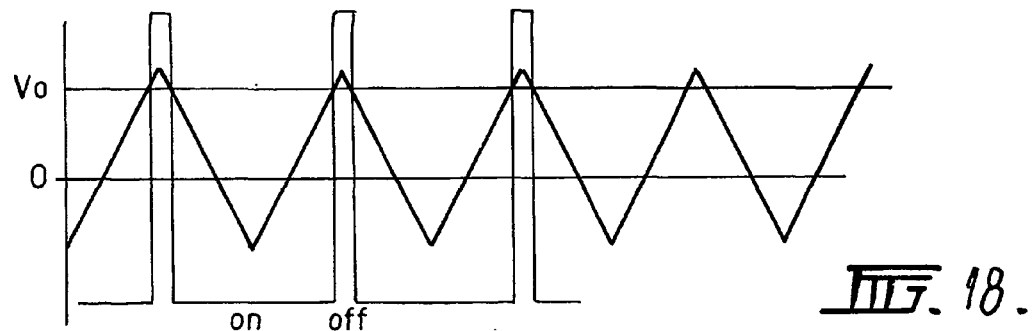
Figure 19:
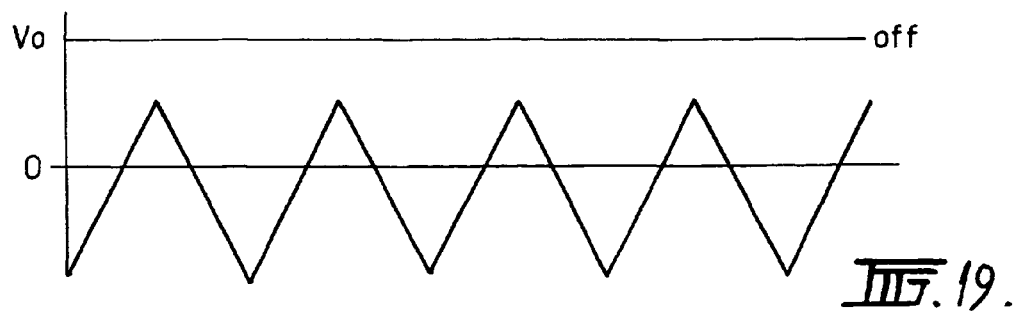

FIGS. 18 and 19 show situations where the voltage VO is somewhere between 0 volts and the extreme conditions shown in FIGS. 16 and 17 and positive in magnitude. The transistor 382 is continuously off and the transistor 380 is switched on but with a duty cycle which is very high in terms of percentage of the on time to the off time, for example, 90% or thereabouts as shown in FIG. 18. At the other extreme when the voltage VO is negative of the same magnitude the opposite will occur and the transistor 380 will be switched off for most of the time if not all of the time and the motor 28 will be powered periodically with a duty cycle dependant on the time the transistor 382 is switched on compared to the time when it is switched off. In this case the duty cycle might also be 90%.

Thus, it will be apparent that when the voltage is around about 0 at the wiper 355 the transistors 380 and 382 toggle on and off continuously. If the voltages are at an extreme the motor 28 is either held on or completely off so as the control shaft 30 is adjusted to the required speed by either being driven by the motor 28 or by being impeded by the motor 28. The most usual situations where the voltage is not extreme but just above or below 0 volts there will be a switching on and off of the motor 28 with a duty cycle depending on the value of the voltage at the wiper 355 to cause the motor 28 to be switched on and speed up the control shaft or switched off and slow down the control shaft in proportion to the duty cycle of the switching on and switching off of the motor 28. The larger the duty cycle of the signal which switches on the transistor 382 the faster the motor 28 will rotate to bring the speed of control shaft 30 up to the required operating speed to place the transmission in the required drive ratio. Conversely, the greater the duty cycle of the transistor 380 the more impeding of the control shaft to slow the control shaft and the more electricity is generated by the motor 28 to supply to the load 410.

It will be apparent from the graphs of FIGS. 14 to 19 that whenever the voltage at the wiper 355 changes state from a negative to a positive voltage then this change is applied to the transistors 380 and 382. However, the transistor which is switched on will be switched off always before the other transistor is switched on thereby ensuring that the transistors 380 and 382 are not switched on at the same time. Normally when the transmission is holding the ratio set by the wiper 355 there will be slight fluctuations and the voltage at the wiper 355 will probably go up and down from the 0 voltage state slightly thereby causing the transistors 380 and 382 to be continually switching on and off to cause the motor 28 to be driven or stopped to ensure that the control shaft catches up or reduces speed to produce the 0 volt output at the wiper 355.

As previously mentioned, the drive ratio can be set manually be adjusting the wiper 355 of the pot 350 by effectively coupling the wiper 355 through a gear shift stick. In other embodiments the adjustment could be automatic and the wiper 355 can be adjusted in position dependant on various parameters which are sensed by computer control of a vehicle or engine. Such parameters may include the conventionally sensed parameters including vehicle speed, inlet manifold pressure, load, engine speed etc. Information relating to all of the parameters can be input to a processor which, from a look-up table, can select an appropriate drive ratio for the operating conditions of the engine and in accordance with the selected ratio can adjust the position of the wiper 355 so as to cause the motor 28 to control the shaft 30 to bring the transmission to that drive ratio.

Figure 20B:
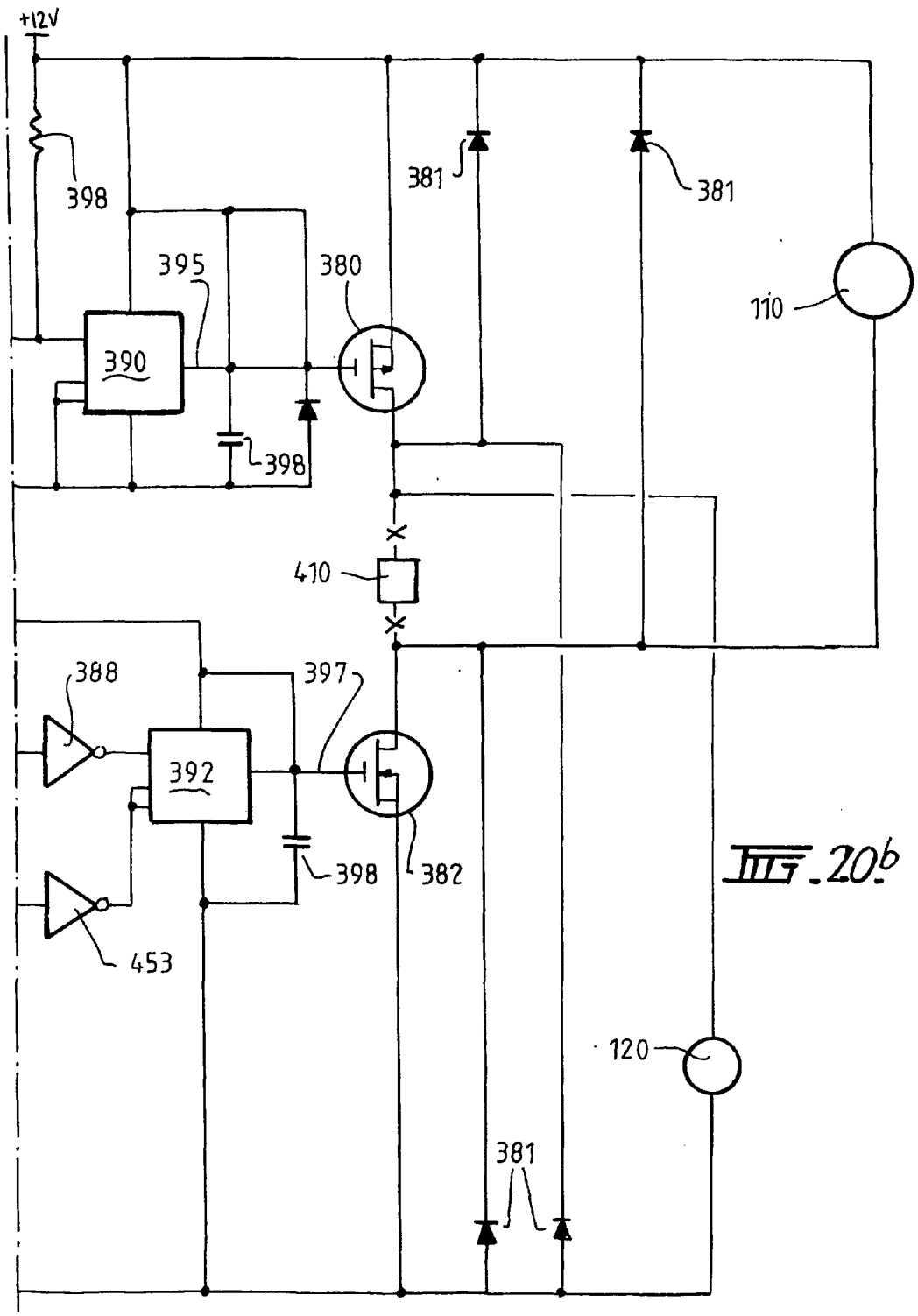
FIG. 20 is a circuit diagram similar to FIG. 19, showing a further embodiment of the invention.

As previously described, the magnetic powder clutches 110 and 120 can be controlled by the same circuit as described with reference to FIGS. 11 and 14 to 19. FIG. 20 shows an embodiment of the circuit modified to control the clutches 110 and 120. In this embodiment, the clutch 110 is coupled between the 12 volt power supply and the other side of the load 410 that is in parallel with the transistor 380 and the load 410 and the second magnetic clutch 120 is connected in parallel with the transistor 382 in the load 410 as shown. When the transistor 382 is on the clutch 110 is operated in accordance with the duty cycle of the switching on of the transistor 382 in the same manner as previously described so that the clutch 110 causes drive to be transmitted to the shaft 30 to speed up the shaft 30. When the transistor 380 is switched on power is suppled to the clutch 120 to cause the clutch 120 to stop the control shaft 30 if the clutch 120 is fully locked up. If the control shaft 30 is being adjusted also by the clutch 120 then the clutch 120 can be switched on and off dependant on the duty cycle of switching on and off the transistor 380 so that the clutch 120 perform correction control of the speed of the control shaft 30 to set the desired drive ratio.

Other embodiments of the control circuitry may also be used and these embodiments include merely coupling the transistors 380 and 382 respectively and independently t the magnetic clutches 110 and 120. In this embodiment the transistors 380 can be of the same type at the inputs to the operational amplifier 362 are simply reversed.

Furthermore, in the magnetic clutch embodiments the circuitry for detecting the speed of the output shaft and input and supplying the signal on lines 340' and 340" may use a magnetic sensor rather than a photo-interrupter in order to provide the signal data. The magnetic sensor may include a Hall effect type device or other magnetic sensor which provides an output pulse every time a magnetic on the rotating component passes the sensor.

In still further embodiments in which precise control of ratio is not required an AC motor can be used as the motor 28 and the AC motor controlled by the conventional AC motor controller. This embodiment has particular applications to situations where a drive ratio needs to be set and then not further adjusted such as is the case with some industrial machinery. By simply controlling the electronic controller to drive the AC motor the speed of the control shaft 30 can be set to the required speed either by visual inspection or speed measurement.

Figure 21:
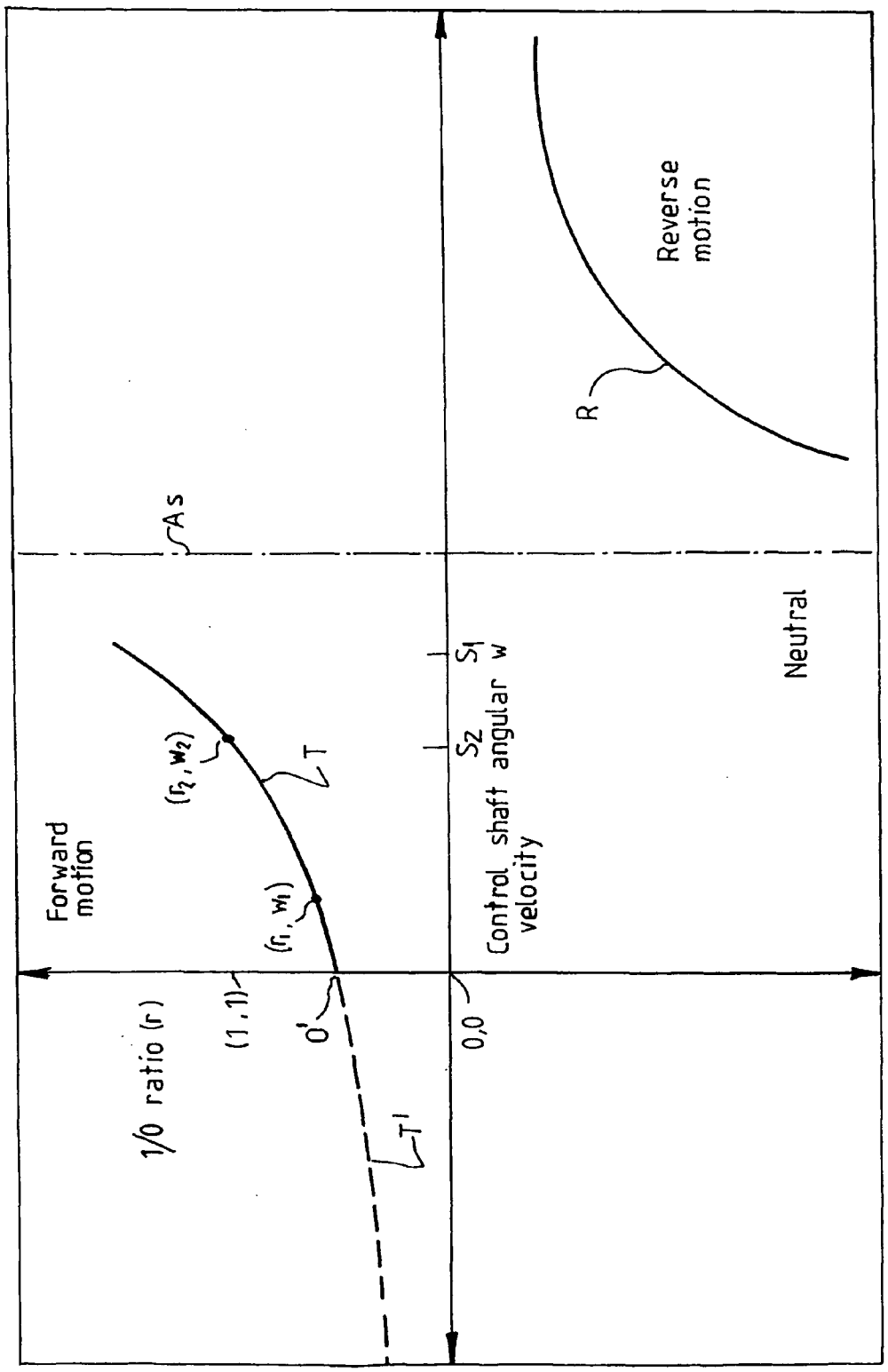
FIG. 21 is a graph which explains the control of the control shaft and the manner in which momentum is switched to displace momentum from one part of the transmission to another part of the transmission.
Figure 22:
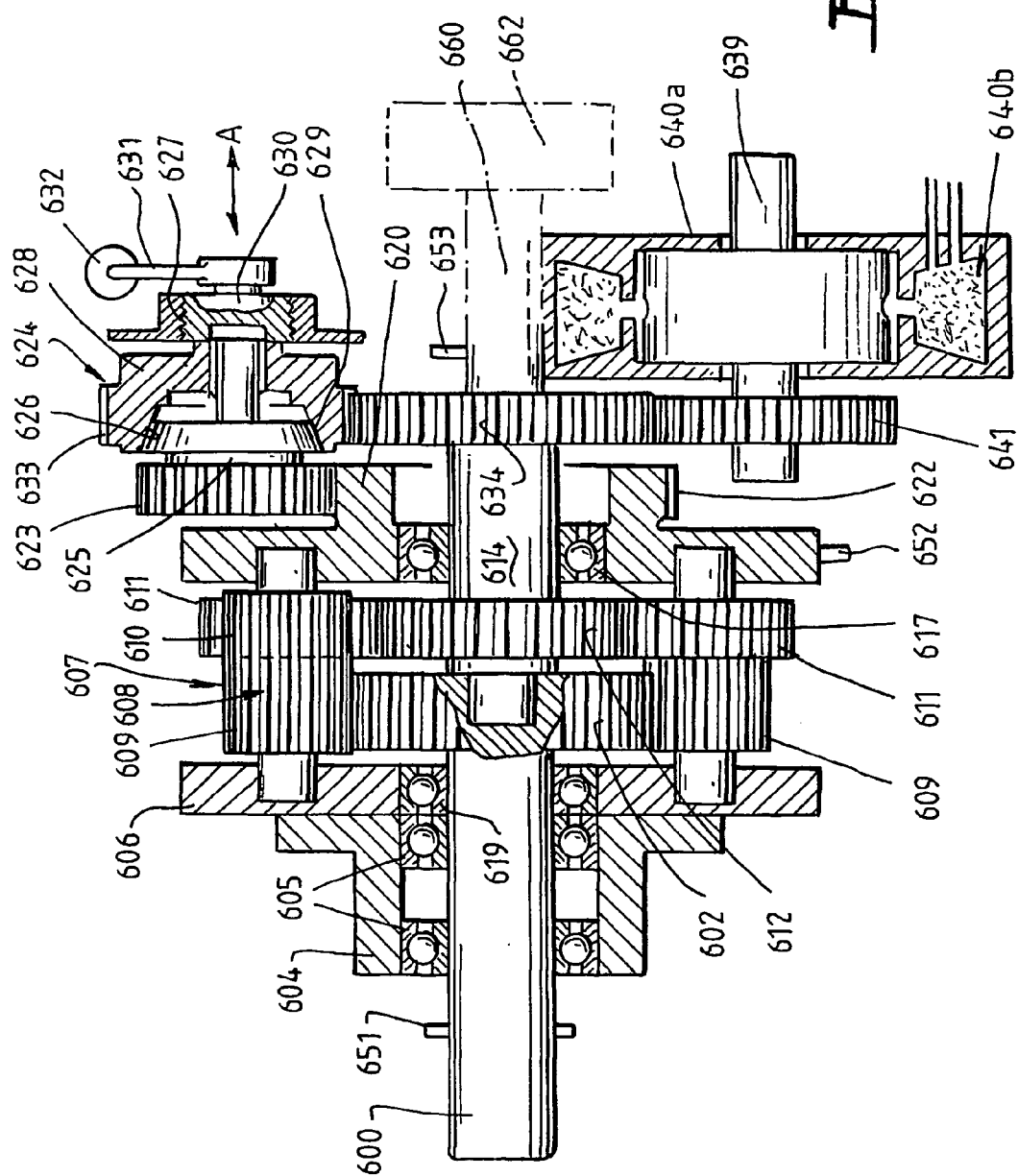
FIG. 22 is a cross-sectional view of a still further embodiment of the invention which operates in accordance with the principles described with reference to FIG. 21.
Figure 23:
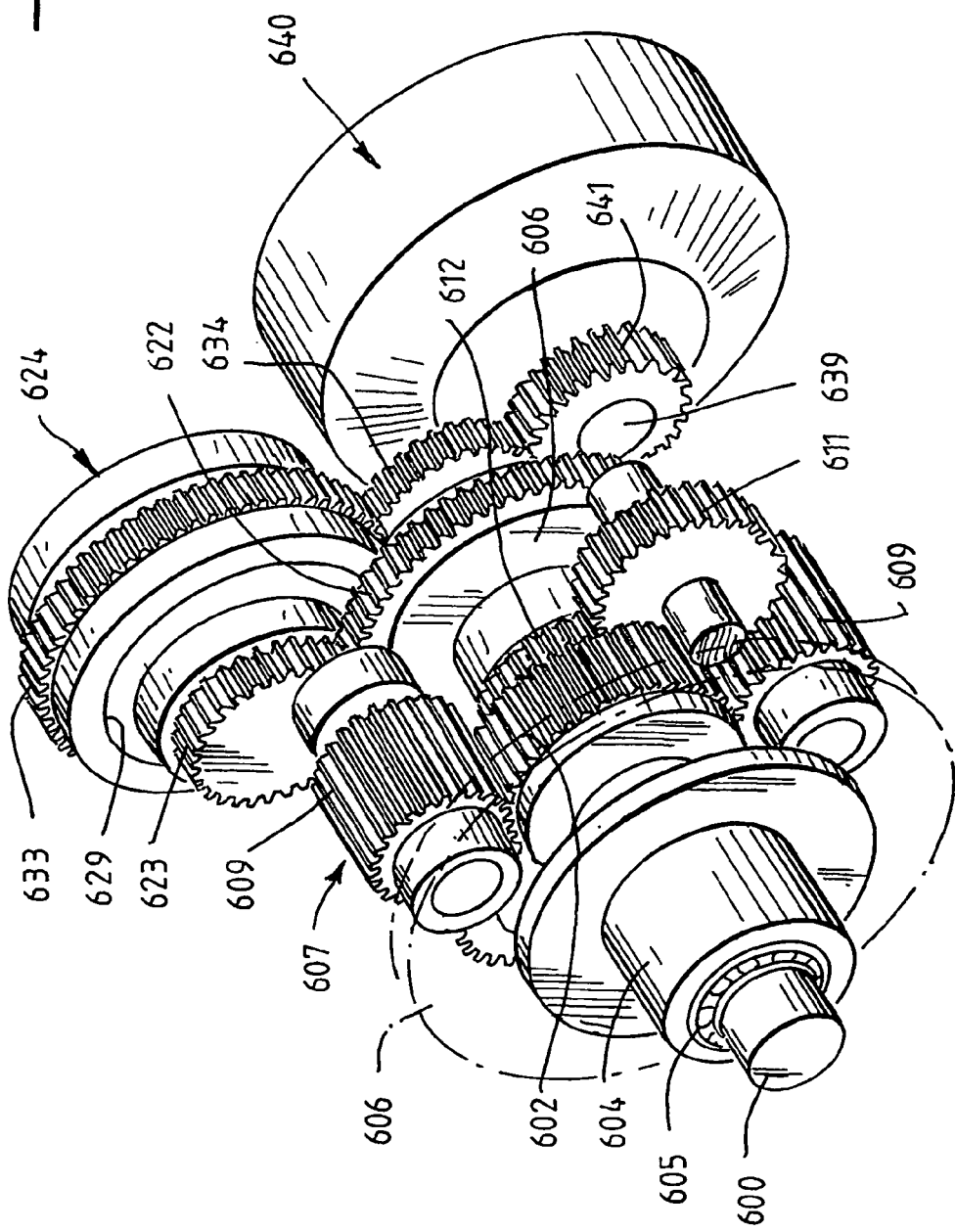
FIG. 23 is a perspective view of the embodiment of FIG. 22 with some of the parts removed for ease of illustration.

The specific process used in the transmissions previously described, and which will be described with reference to FIGS. 22 and 23, is to rapidly displace the momentum of the system back and forth, from the output means, ie sunwheel 70, to the control shaft (ie. sunwheel 80) so as to maintain a predetermined ratio. Change in ratio is achieved by biasing a momentum gate openings to create a new momentum distribution, and then to stabilise it by precisely sensing angular velocity of the input, the output and the control shaft and opening and closing the gate in response to a feedback system. For precise operation it is important to open and close the gate rapidly, 3 kHz is an appropriate speed. It is the nature of these double sunwheel machines, that they will try to respond to external load and speed conditions and alter the transmission ratio. The control process must in general oppose this except where the ratio achieved fits in with the designed ratio control program. This is shown in FIG. 21.

The momentum gate and the manner in which it is biased is achieved, in the preferred embodiments, by controlling the electric motors and magnetic clutches as previously described in order for them to control rotation of the control shaft and therefore the control sunwheel (such as the sunwheel 80) to enable momentum to be displaced back and forth from the output to the sunwheel 80 and the control shaft 20 so the momentum is displaced from the output to the control shaft 20 and stored in the clutches or motor, which can be returned to the output via the control shaft 20, the planet system 60 and the output sunwheel 70.

If an uncontrolled transmission of this kind is operating unloaded at position $(r_1, \omega_1)$, as shown in FIG. 21, experiences a load opposing the rotation of the output shaft, momentum will be displaced onto the control shaft by causing it to rotate faster. This will result in the ratio changing and the transmission operation moving to the right along the curve towards the neutral position, shown in FIG. 21, to be located at the asymptote of the hyperbola, which function describes the relationship between the transmission ratio and the angular velocity of the control shaft. This situation will continue until a new momentum situation on the control shaft (due to its mass and new angular velocity), is able to stabilise at some new position $(r_2, \omega_2)$ in FIG. 21. Further, loading will of course cause still further movement to the right, until neutral is reached at the asymptote.

If a momentum gate is fitted to the control shaft, the above process can only occur while the gate is open. If the gate is closed, momentum is prevented from being displaced onto the control shaft to speed it up and the ratio will remain at the position $(r_1, \omega_1)$ if the gate is opened and closed to a program that will maintain such a state as the output load varies.

The above describes a very simple gate system operating on the positive part or forward part of the ratio function. Such a gate may be referred to as a positive gate created by a mechanical impedance. A gate can also be made operable on the negative or reverse part of the ratio function. This is referred to as a negative gate.

A simple positive gate operating on its own is only able to open and close the gate in one direction, that is to either displace momentum from the control shaft onto the output means, or to prevent any displacement. A more sophisticated gate combines a positive and negative gate and is able to close the gate completely, or to open it in either direction.

There are at least three mechanism means of achieving the above.

1. To alter the angular velocity of the control shaft by slowing it down by a mechanism impedance or some kind of a brake, or speeding it up, so that $$\phi\omega_1 \lessgtr \phi\omega_2$$

2. To alter the moment of inertia of the control shaft so that $$\phi_1\omega \lessgtr \phi_2\omega$$

3. To alter both the moment of inertia and the angular rotation of the control shaft so that $$\phi_1\omega_1 \lessgtr \phi_2\omega_2$$

It should be noted that in situation 2 above, to oppose momentum displacement onto the control shaft (close the gate) without altering the rotation of the control shaft, the device used to alter the moment of inertia must be controlled by some other method.

In order for a gate to open in both directions, it must be able to apply torque directly to the control shaft, or alternatively use some other method of directly transferring momentum to the shaft or else altering the moment of inertia to increase the angular velocity of the shaft. One way of doing this is to use an electric motor which can be switched rapidly to either drive the control shaft motion or to impede it by acting as a generator.

A second method of creating a gate which will open in both directions can include a second switchable brake or clutch operating upon the negative side of the function. Energy must be taken from the input to speed up the control shaft across the asymptote and cause reverse operation. A ratio control program will then rapidly switch both the positive and the negative gate on and off to achieve the same thing as an electric motor described previously.

FIGS. 22 and 23 show a still further embodiment of the invention which operates in accordance with the above description and the principles described with reference to FIG. 21.

The transmission shown in FIGS. 22 and 23 has an output shaft 600 which carries an output sunwheel 602. An input flange 604 is mounted about the shaft 600 on bearings 605 and is coupled to planet cage 606. Input rotary power may be supplied from a motor or other suitable source (not shown) to the flange 604 to rotate the flange 604 and therefore the cage 606.

The cage 606 supports a planet system 607 which comprises a transfer gear 608 which has a first gear portion 609 which meshes with sunwheel 602 and a second portion 610 which meshes with planet gear 611. The planet gear 611 mesh with control sunwheel 612 which is provided on control shaft 614.

In the embodiment described, the transfer gear 608 is elongated so that the portions 609 and 610 are merely an extension of one another. However, in other embodiments the portion 610 could be provided on a reduced diameter portion so as to provide a different ratio to the portion 609.

As previously described, the planet system 607 can take many different forms, including all of the forms described with reference to FIGS. 7 to 9.

The control shaft 614 is mounted in bearings 617 which, together with bearing 619, support the cage 606 for rotation. Thus, rotation of the cage 606 will carry the planet system 607 so that rotation is imparted to the output sunwheel 602 and therefore to the output shaft 600.

The cage 606 has a reduced diameter portion 620 which carries a gear 622. The gear 622 meshes with a gear 623 provided on a cone clutch 624. Cone clutches are well known and therefore need not be described in detail herein. Suffice it to say that the cone clutch 624 has a first portion 625 which has a conical surface 626. The portion 625 carries the gear 623 which meshes with the gear 622 as shown in FIG. 22. The clutch has a second portion 628 which has a matching conical surface 629 which can move in the direction of double-headed arrow A in FIG. 22 so as to cause the clutch to engage or disengage. A screw thread mechanism 630 controls the movement of the portion 628 in the direction of double-headed arrow A to cause the clutch to engage or disengage and the screw mechanism 628 is operated by a lever 631 which is pushed into and out of the plane of the paper in FIG. 22 by a solenoid 632. The solenoid 632 is controlled by a control section which will be described hereinafter.

The portion 628 also carries a gear 633 which meshes with gear 634 fixed onto the control shaft 614.

A magnetic powder clutch 640 (which is the same as the powder clutched as previously described) is connected to a gear 641 which also meshes with the gear 634. In this embodiment of the invention, the control shaft which controls the rotation of the control sunwheel 612 is provided in two parts rather than as a single shaft. The two parts comprise the shaft 614 and shaft 639 which is in effect a lay shaft provided through the magnetic powder clutch and which has its rotation controlled by the powder clutch 640. Thus, rotation of the lay shaft 639, or in other words, the second part of the control shaft, rotates the first part of the control shaft 614 on which the control sunwheel 612 is mounted by virtue of the engagement of the shafts 614 and 639 by the gears 634 and 641.

Thus, in order to change the ratio of the transmission, current is supplied to the powder clutch 640 in the manner previously described. This causes the powder clutch to progressively engage in the manner previously described so that the meshing of the gear 641 with the gear 634 progressively slows down the speed of the control shaft 614. Referring to FIG. 21 for example, assuming that the speed of the control shaft was initial S1 and the transmission is in a relatively low gear or high ratio, slowing down of the control shaft will cause the gear ratio to move down the trace T in FIG. 21 to decrease the ratio or place the transmission into a higher gear. When the control shaft 614 is completely stopped by complete locking of the powder clutch 640, the gear ratio will be in an overdrive ratio on the graph shown in FIG. 21 at ratio 0' which is the lowest ratio the transmission is designed to provide. It should be noted that because the powder clutch 640 will simply stop the shaft 614, but will not rotate it backwards, the transmission will not go into a gear ratio lower than 0' and represented by the dotted trace T' in FIG. 21 because this requires a reverse rotation of the transmission to move the speed to the left of the origin (or zero speed) of the axis shown in FIG. 21 and marked 0,0. It should be further noted that if it is desired to rotate the shaft 614 backwards a motor, as described in earlier embodiments, could be used to further increase the overdrive ratio of the transmission.

Thus, by appropriate control of the current supplied to the clutch 614, as is described previously, the drive ratio can be adjusted along the trace T between a very high gear ratio approaching the asymptote As down to the maximum overdrive ratio 0' which is established when the control shaft 614 is completely stopped.

In order to place the transmission into reverse gear, the cone clutch 624 is utilised. As is apparent from FIG. 21, when the transmission is in neutral the trace T is approaching the asymptote As or, in other words, the transmission is in extremely high ratio in which the input is obviously rotating but the output shaft 600 is stationary. In order to provide reverse gear which is shown by the trace R in FIG. 21, it is necessary to increase the speed of the control shaft 614 to a speed greater than the speed at where the asymptote As crosses the X axis of the graph in FIG. 21. This is achieved by supplying power to the solenoid 632 which activates the lever 631 to thereby rotate the screw mechanism 630 so that the cone clutch 624 engages by forcing the portion 628 to the left in FIG. 22, so the surfaces 626 and 629 fully engage to lock the clutch. Since the clutch is coupled to the input via the cage 606 (and in particular by the meshing of the gear 622 with the gear 623) the clutch is rotated so that the gear 633 rotates the gear 634 to increase the speed of the gear 634 and therefore the shaft 614. This drives the speed to the right in FIG. 21 so that the speed crosses the asymptote As and places the transmission into reverse gear as shown by trace R. As also shown by trace R, as the speed is forced across the asymptote As, the transmission will initially go into a very high ratio where the trace R approaches the asymptote but will then smoothly move to a gear ratio on the trace R which is set by the gear ratio provided between the gears 622, 623 and 633 and 634. This effectively locks the control shaft 614 to the input 619 and the gear ratio can be provided to be a relatively low reverse gear ratio so the vehicle will move in reverse at a speed which is dependent on the input speed provided by the input cage 606 and the gear ratio between the above-mentioned gears.

As in the earlier embodiments, in order to control the cone clutch 624 and the powder clutch 640, the speed of rotation of the output, the input and the control shaft are sensed. This may be provided by speed sensors 651 on output shaft 600, sensor: 652 on cage 606 and sensor 652 on the control shaft 614. By detecting these speeds and processing the speeds, an appropriate output signal can be supplied to the magnetic powder clutch 640 to progressively lock the clutch 640 to provide the desired forward gear ratio, or to release the clutch 614 completely and lock the clutch 624 to provide reverse gear.

It should be noted that in other embodiments, different forms of cone clutch 624 can be provided. The above embodiment utilises a cone clutch which is mechanically controlled by a screw mechanism 626. However, the clutch could be controlled by hydraulic control systems or magnetic control systems as is well known.

The manner in which momentum is displaced back and forth from the control shaft and the output shaft will be explained. In general, input rotary power is supplied through the flange 604 to the planet cage 606 and via the planet gear system 607 to the output sunwheel 602. If a load is supplied to the output shaft 600, the planet system 607 will immediately attempt to transfer the momentum into the control sunwheel 612. This will try to turn the gear 634 and the therefore the gear 641 and the lay shaft 639 on which the gear 641 is mounted, which is within the powder clutch 640. Thus, the momentum will now attempt to reside in the control shaft 614 and the rotary part (ie. the lay shaft 639) of the powder clutch 640. If the powder clutch 640 is switched completely off, the momentum will therefore be displaced from the output shaft 600 to the control shaft 614 and the lay shaft 639. However, if the magnetic powder clutch 640 is activated by supply of current, then the shaft 639 is stopped from freely rotating and momentum is forced back via the meshing gears 641 and 634, the control shaft 614 and the control gear 614 through the planet system 607, and back to the sunwheel 602 and output shaft 600. How much the momentum is transferred back will determine the drive ratio of the transmission. Thus, by controlling the clutch 640 and the amount of progressive braking provided by the clutch 640, the drive ratio of the transmission can be controlled by providing control over the speed of the control shaft 614 and therefore the control sunwheel 612. This process is a rapid performance of a displacement of momentum back and forth between the output shaft 600 and the control shaft 614 and powder clutch 640 and the stability of the ratio will depend on accurately switching on and off the clutch 640, which effectively opens and closes the momentum gate to control the displacement of momentum from the output shaft 600 to the control shaft 614 and lay shaft 639.

In a sophisticated application of the transmission of FIGS. 21 and 22, the cone clutch 624 can also be switched on and off so as to displace momentum from the output shaft 600 to the control shaft 614. This is advantageous because, in some instances when the transmission is in overrun (for example when a drive takes his or her foot off the accelerator), momentum will not want to be displaced from the output shaft 600 to the powder clutch 640. By switching the cone clutch 624 on, the momentum is forced to be displaced from the output shaft 600 to the control shaft 614. The second advantage is that this process would make the displacement of the momentum occur much faster and stabilise the ratios much more quickly.

In still further applications, the control shaft 614 may include a section 660 shown in dotted lines, which carries a variable centroid system 662, for example the moving mass system, similar to that disclosed in our co-pending International Application No. PCT/AU00/00603, the contents of which are incorporated into this specification by this reference. The system 662 will assist the clutch 640 to manage the momentum displacement process without large use of energy by the magnetic clutch 640.

FIGS. 24 to 32 show a further embodiment of a controller which can be used in the preferred embodiments of the invention. The controller of these Figures has particular application to the embodiment of FIGS. 22 and 23. However, this controller could also be used with the earlier embodiments and the controller described with reference to FIGS. 10 to 20 could also be used with the embodiment of FIGS. 22 and 23.

Figure 24:
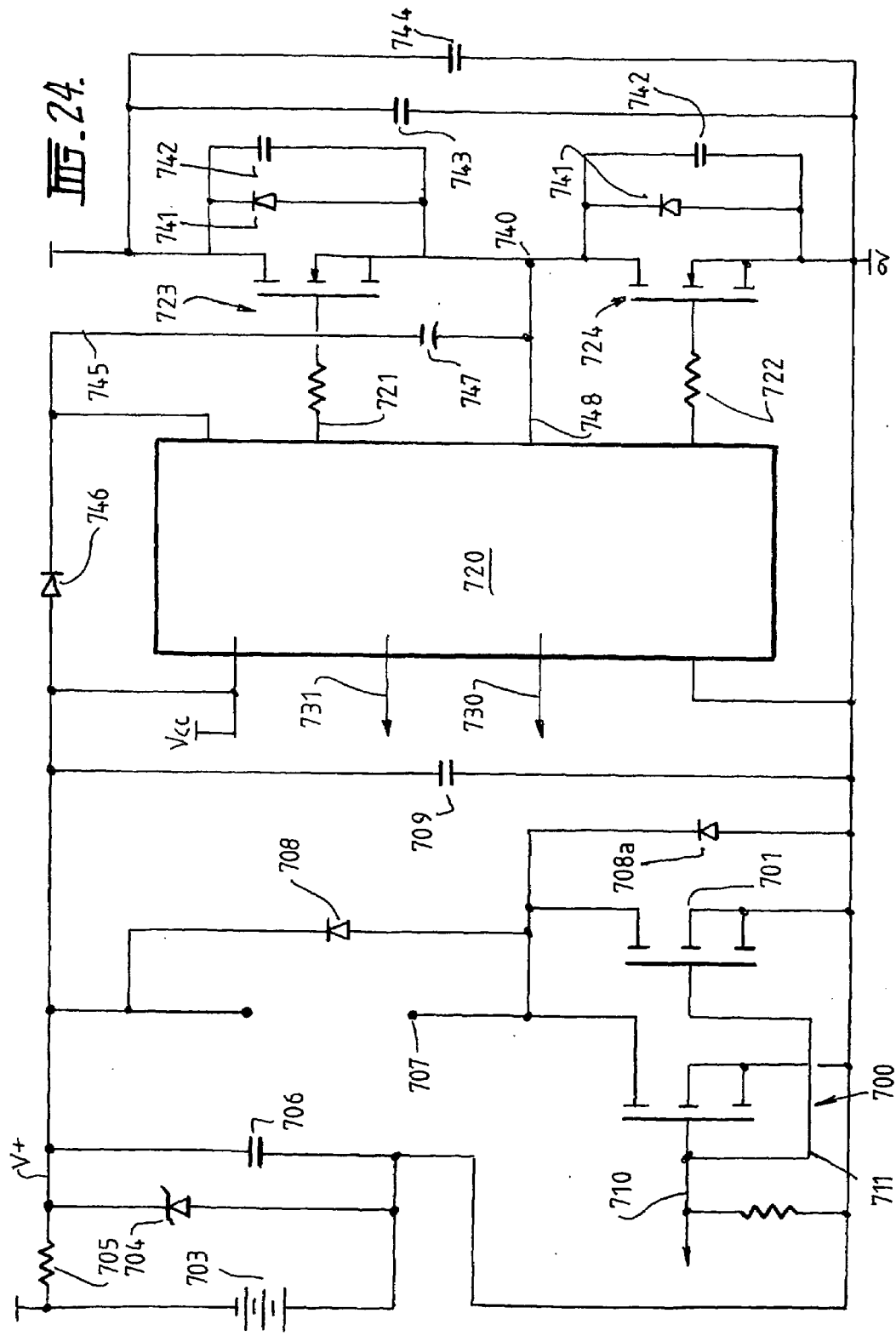
FIG. 24 is a block circuit diagram of a second controller according to another embodiment of the invention which has particular application to the embodiment of FIGS. 22 and 23.

With reference to FIG. 24, the controller has a pair of field effect transistors 700 and 701 which are connected in parallel with one another. Power is supplied to the field effect transistors from a battery 703. A diode 704 is provided to protect the circuitry should a battery of a higher voltage than required be used or the battery connected in reverse polarity. A fuse 705 is connected between the diode 704 and the battery so that should the voltage supplied by the battery be too high or the battery connected in reverse polarity, the fuse 705 will burn out to thereby shut off power supplied to the circuitry shown in FIG. 24.

Capacitor 706 smooths the voltage supply to the transistors 700 and 701. The transistors 700 and 701 have an output 707 which provides a locking signal to solenoid 632 described with reference to FIG. 22 and which controls the cone clutch 624. The transistors 700 and 701 are also connected to a diode 708 and a capacitor 709 is connected in parallel with the transistors 700 and 701. The diode 708 and the diode 708a ensure that the voltage at the output 707 cannot go significantly higher than the voltage V+ supplied by the battery 703 or below the voltage V−. Typically, the battery 703 is a 12V battery and the voltage V+ is 12V and V− is 0 volts.

The transistors 700 and 701 receive an input on line 710 from a port 751 of a microprocessor 750 shown in FIG. 25 and which will be described in more detail hereinafter. Thus, in other words, the port 751 of the processor 750 is connected to line 710 shown in FIG. 24. As also shown in FIG. 24, the line 710 connects via line 711 to the transistor 701 so that both of the transistors 700 and 701 are switched on by the signal on line 710.

When the signal is received from the microprocessor 750 on line 751, the transistors 700 and 701 are therefore switched on to supply a voltage at output 707 which activates the solenoid 632 (FIG. 22) so as to lock the cone clutch 624 so that a control shaft 614 is connected to input cage 606 to thereby place the transmission of FIG. 22 into reverse gear in the manner previously described.

The circuit in FIG. 24 also includes a pair of high side driver circuits 720 (only one shown). The pair of high side driver-circuits 720 are identical and therefore only one is shown in FIG. 24. The other driver operates in the same manner, as will be apparent from the following description. The voltage applied to circuit 720 is stabilised by capacitor 709.

The driver 720 receives control signals from the microprocessor 750 so that outputs are supplied on lines 721 and 722 to control field effect transistors 723 and 724. The other driver (not shown) provides output signals in the same fashion to control another pair of field effect transistors which are identical to those shown in FIG. 24 (and indicated by reference numeral 723' and 724' in FIG. 31).

Figure 25:
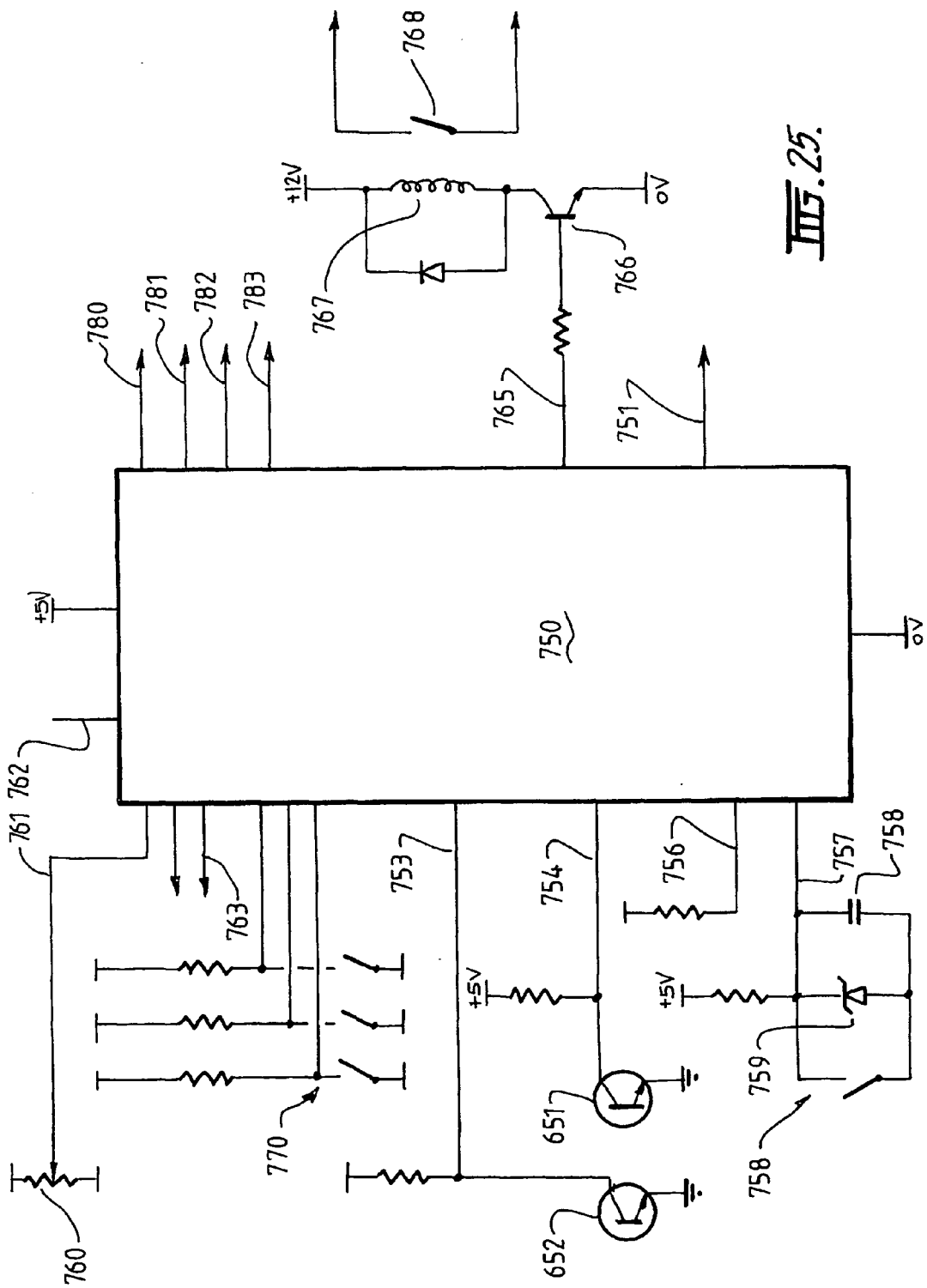
FIG. 25 is a diagram of a further section of the controller according to the second embodiment.

Turning now to FIG. 25, processor 750 receives signals on line 753 from sensor 652 shown in FIG. 22, indicative of the speed of rotation of the input. The line 754 receives signals from the sensor 651 indicative of the speed of the output shaft 600. A third input on line 756 may also be provided which provides a signal indicative of the speed of the control shaft 614 if desired, and which would come from the sensor 652 shown in FIG. 22.

The processor 750 also receives a signal on line 757 from a reverse switch circuit 758 which is closed when a driver wishes to place the transmission into reverse. This happens automatically by actuation of a vehicle reverse gear switch indicative of the fact that reverse gear is required. The reverse switch circuit 758 includes a diode 759 and the capacitor 758 which stop interference from spurious signals so that a false signal will not be provided on line 757. Thus, when the driver places the vehicle into reverse, the reverse switch circuit 758 is closed and a reverse signal provided on line 757 to the processor 750. The processor then determines from other inputs which are received into the processor 750, whether it is appropriate to place the vehicle into reverse gear. These other signals will include speed of the vehicle at the output shaft, etc. so that if the processor 750 determines that the vehicle should not be placed into reverse gear, such as if the vehicle is travelling at high speed in forward direction, then the processor will not output the locking signal on line 751. However, if the processor 750 determines that reverse gear is appropriate, then a switching signal is applied on line 751 to the line 710 to switch on the transistors 700 and 701 as previously describes, so that the locking signal is provided from output 707 to the solenoid 632 to place the transmission into reverse gear.

If reverse gear has been selected either erroneously or inappropriately and the processor 750 decides that a signal will not be output on line 751, the processor 750 can output a signal on line 765 to transistor 766 to switch the transistor on so that current flows through coil 767 to activate a light or alarm shown by reference 768 to indicate erroneous selection of reverse gear. The alarm 768 can also be used to indicate other alarm conditions if required.

The processor 750 also receives an input from pot 760 via line 761 which is indicative of throttle position of the vehicle. The processor 750 may also receive an input indicative of front wheel speed on line 762 and vacuum condition of the engine on line 763.

The processor 750 may also receive signals from an input circuit 770 which can be used to change parameters within the processor 750 to effectively reprogram the processor 750 to operate in accordance with modified protocols or algorithms as is required. This circuitry can be used in initial set-up or alternatively for servicing or other requirements by authorised personnel. This circuitry has no bearing on the actual function of the device and therefore will not be described in any further detail.

The processor 750 outputs signals on lines 780, 781, 782 and 783. The line 780 connects with line 730 of driver 720 and the line 781 connects with line 731 of the driver 720.

The lines 782 and 783 connect to the other driver which is not shown on lines corresponding to lines 731 and 730.

The output lines 721 and 722 of the driver 720 are connected to the field effect transistors 723 and 724 as previously described so as to switch on and off the transistors 723 and 724 dependent on whether the signal on lines 721 or 722 is high or low. When the transistor 723 is switched on, the transistor can conduct to provide a voltage at output 740. When transistor 724 is switched on, the voltage at line 754 is effectively connected to ground and is therefore zero volts.

Diodes 741 and capacitors 742 protect the transistors 723 and 724 and prevent the voltage across the transistors from increasing above or below a predetermined voltage to prevent damage to the transistors 723 and 724.

Capacitors 743 and 744 stabilise the voltage supplied to the transistors 723 and 724.

Voltage V+ is also connected to line 745 via diode 746. The line 745 includes capacitor 747 and is connected to output 740 via line 748 which connects to the driver 720. The reason for this is to ensure that the voltage available on line 721 will be above the voltage at output 740 to ensure that the transistor 723 is maintained switched on because in order to hold the transistor 723 on, the voltage on line 721 must be above the voltage at output 740. Thus, as soon as the transistor switches on, the capacitor 747 is able to charge up and its discharge will enable voltage to be supplied to the driver 720 together with the voltage V+ from the battery for output on line 721 to maintain the transistor 723 switched on by supplying a voltage on line 721 which is above the voltage at output 740.

Figure 31:
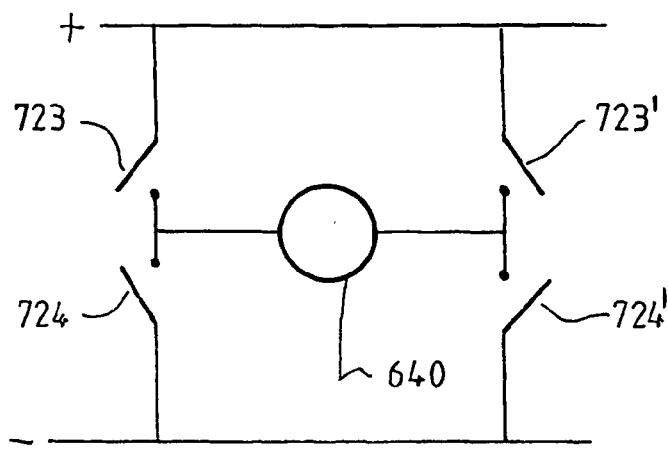
FIG. 31 is a simplified circuit diagram of part of the circuit of FIG. 25 used to facilitate explanation of the wave form diagrams of FIGS. 26 to 30.
Figure 32:
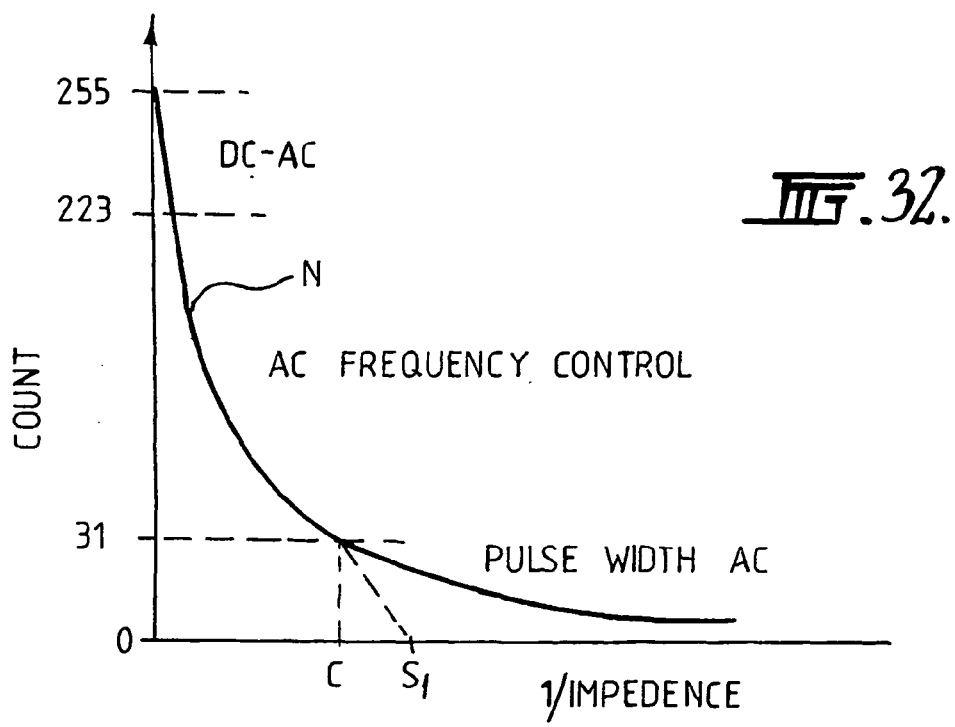
FIG. 32 is a graph illustrating the transmitted torque v 1/impedance of a powder clutch used in the embodiment of FIGS. 22 and 23, also used to explain the operation of FIGS. 26 to 31.

The output 740 and the corresponding output from the other driver 720 which is not shown are connected across the powder clutch 640 shown in FIG. 22. FIG. 31 is a simplified diagram illustrating this connection.

The switches shown in this diagram represent the transistors 723 and 724. The switches 723' and 724' are the field effect transistors associated with the driver which is not shown in FIG. 24.

Thus, it can be seen that by closing the switch 723 and the switch 724', current is supplied through the powder clutch 640. Similarly, by closing the switches 723' and 724, reverse polarity power can also be supplied through the powder clutch 640.

FIGS. 26 to 31 show wave forms which are output on the lines 721 and 722 to control the transistors 723 and 724 (and also the transistors 723' and 724'). These wave forms are selected by the processor 750 based on the inputs receives on the lines 753 and 754 which are indicative of the speed of the input and output (or control shaft) in the transmission, the throttle position 760 and other engine operating data to thereby set the drive ratio of the transmission. The processor, from those inputs, produces outputs on lines 780 to 783 which are provided to the driver 720 (and the driver which is not shown) to cause those drivers to output signal on their respective lines 721 and 722 to switch on the transistors 723 and 724 for the required time period to produce the required pulses.

Figure 26:
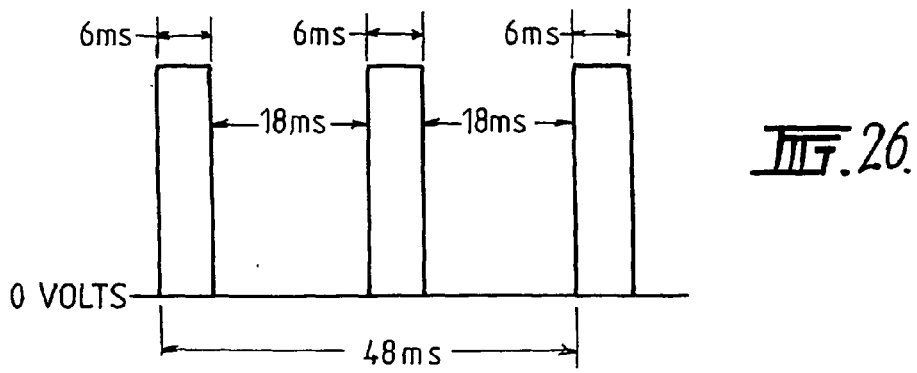
FIGS. 26, 27, 28, 29 and 30 are wave form diagrams which will be used to explain the embodiment of FIGS. 24 and 25.

FIG. 26 shows a wave form which will cause the powder clutch 640 to lock so that the lay shaft 639 is held stationary and fixed to the casing 640a to thereby stop the control shaft 614 and place the control shaft 614 into a stationary condition. This occurs by outputting DC pulses of a particular duty cycle (which may, for example, be 25% on) to switch transistors 723 and 724' on to activate the clutch 640 into the locked position.

In order to control the clutch 640 so that some movement of the lay shaft 639 is allowed to thereby control the rotation of the shaft 640, the transistors 723, 724, 723' and 724' are controlled by an AC frequency control rather than simply by changing the duty cycle of the pulses as in the control system of the earlier embodiment. In order to produce the frequency control, the switching of the transistors first goes through a DC to AC transition which is best illustrated in FIGS. 27 to 30.

Figure 27:
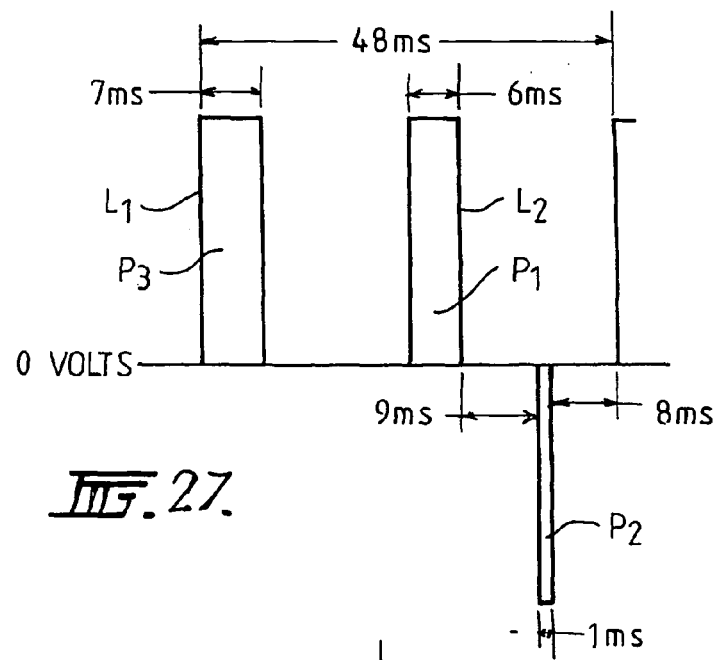

This occurs by controlling the transistors so that pulse P1 is effectively shortened in time duration and a negative pulse P2 of a very short duration is produced (FIG. 27). It should be noted that the pulses are separated in time, in other words, there is a time delay between the pulse P1 and P2. This is achieved by switching on the transistors 723 and 724' to produce the pulse P3 and then switching off those transistors. After a time delay, the same transistors are switched on for a shorter duration to produce the shorter time duration pulse P1. Those transistors are then switched off and, after a delay, the transistors 723' and 724 are switched on for a short time period to create the negative pulse P2.

Figure 28:
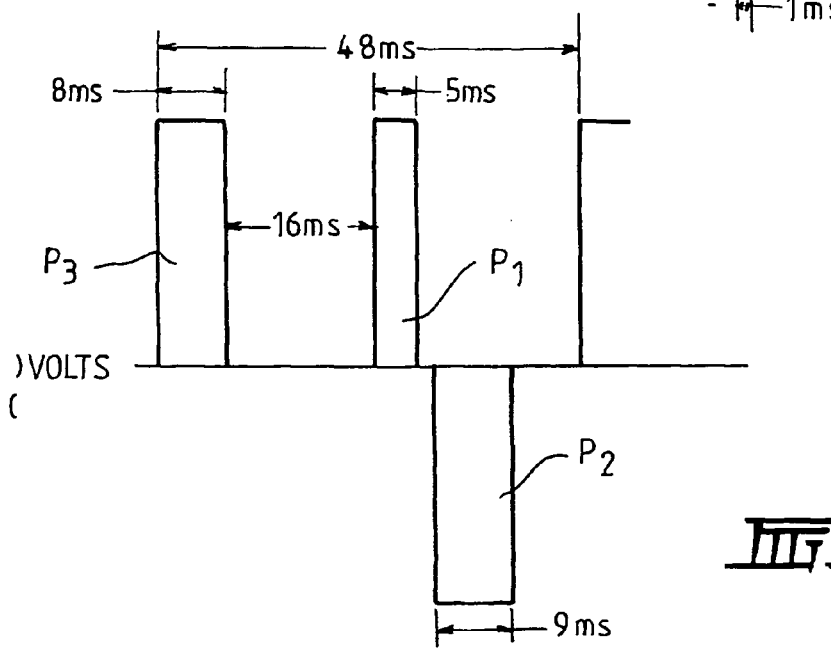

As shown in FIG. 28, the time of switching on the transistor 723 and 724' increases so that the pulse P2 increases in duration. It should be noted that the pulse width of the pulses P1 and P3 also change.

Figure 29:
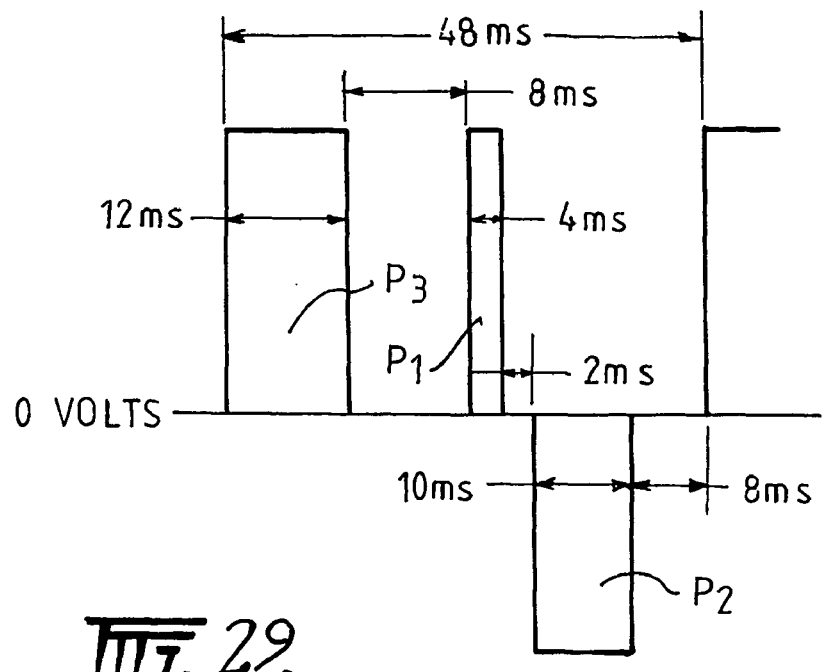
Figure 30:
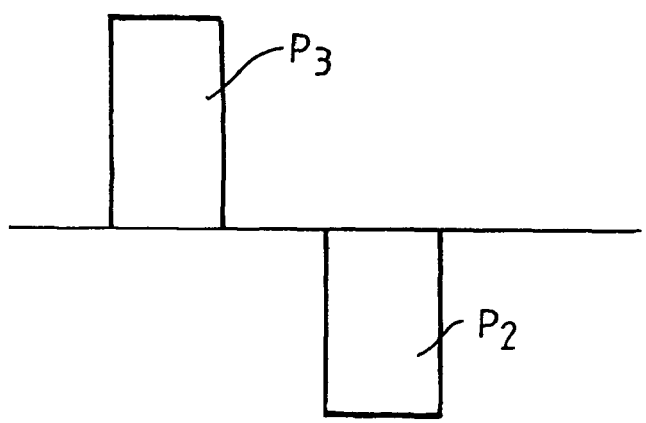

As shown by FIG. 29, the pulse width of the pulse P3 and P1 further change as the pulse width of the pulse P2 increases and this continues to occur until the pulse P1 is effectively zero, thereby just leaving the pulses P3 and P2 as is shown in FIG. 30. This effectively provides an AC signal with the pulses P2 and P3 being the same duration.

Although the conversion from AC to DC has been shown in only four steps in FIGS. 27 to 30, obviously additional steps will be used. As is apparent from the drawings, as the pulse P1 decreases in duration, the pulse P3 increases in duration as does the pulse P2 until the situation in FIG. 30 is produced where the signals are of the same duration.

Once the DC to AC conversion has taken place, the control over the clutch 640 now occurs by frequency control by varying the time between time T1 and time T2 in FIG. 30, whilst maintaining the pulse width of the pulses P2 and P3 and the delay times $\Delta T_1$ and $\Delta T_2$ in the same ratio as shown in FIG. 30. Thus, each of these durations, including the durations of the pulses P2 and P3, will decrease so the time from T1 to T3, which is the time of the leading edge of the next pulse P3 in the cycle, decreases. In FIG. 30 the effective wavelength is 48 milliseconds. As that time period decreases, the frequency increases to thereby control the powder clutch 640 to alter the amount of rotation of the lay shaft 639, which the powder clutch 640 allows, to in turn control the speed of the control shaft 614. This form of frequency control can be used to allow the powder clutch 640 to control the speed of the control shaft 614 up to a certain speed.

In order to further speed up the control shaft, the duty cycle of the pulses P3 and P2 is altered so as to change the on time and off time of those pulses whilst maintaining the frequency constant to provide AC pulse to control the clutch 640 to provide complete opening of the clutch 640 and therefore freeing the control shaft 614 completely for rotation without any impedance up to speed S1 in FIG. 23.

For convenient data processing within the processor 250, the nature of the signals which are output to the driver 720 on the lines 780 to 783 to in turn set the time period for which the transistors 723 and 724, etc. are switched on, is divided into intervals of 0 to 255, which conveniently corresponds to 8 bits of data. By considering the information which is received from the speed sensors 651 and 652, the pot 760, vacuum signal on line 763 and possible front wheel speed 762, the processor 750 can determine from those numbers the appropriate output to supply to the drivers on the lines 780 to 783 to control the transistors 723, 724, 723' and 724' to in turn control the clutch 640 in the appropriate manner. For example, and with reference to FIG. 32, number 255 produces the DC pulses which completely lock the clutch 640 and stop the control shaft 614. Numbers 254 down to 223 can produce the DC to AC conversion in 32 steps by gradually decreases the pulse width P1, increasing the pulse width P3 and producing the increasing pulse width P2 so as to eventually produce the AC signal shown in FIG. 30. Numbers 223 down to number 31 can produce the frequency control by changing the time period T3–T1 to thereby produce the changing frequency so as to perform the control over the clutch 640 which will change the degree of allowed rotation of the shaft 614 up to the certain speed of the control shaft 614. As is shown by the torque curve N in FIG. 32, the change in pulse width of the signal with constant frequency can occur from numbers 31 down to 0 to bring the speed of the control shaft to a speed S1. The pulse width AC control is desired because to bring the speed to the speed S1, the powder clutch can no longer follow the torque curve which would produce simply by frequency control.

Figure 33:
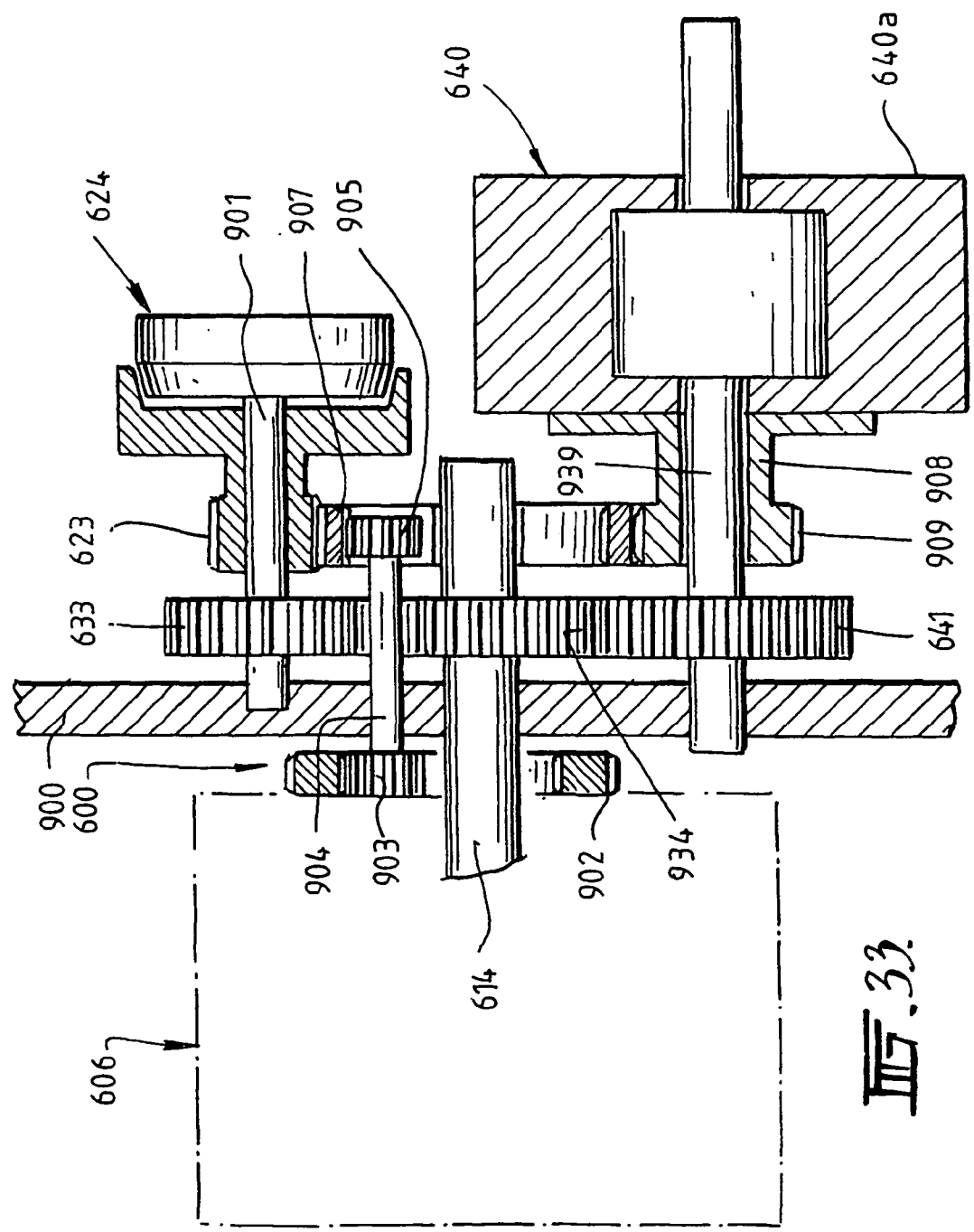
FIG. 33 shows a further embodiment which is a modification to the embodiment described with reference to FIG. 22.

FIG. 33 shows a modification to the embodiment of FIGS. 22 and 23. In FIG. 22 the outer housing 640a of the powder clutch 640 is fixed to the casing of the transmission and held stationary. In the modified embodiment of FIG. 33, the casing 640a is coupled to the input, as will be explained below, so that the casing 640a can rotate. This assists the powder clutch 640, maintaining the required control over the control shaft 614 so that it is not necessary for the powder clutch 640 to work as hard as in the embodiment of FIG. 22. This embodiment of the invention allows the powder clutch to operate in the region of the graph in FIG. 21 between the speeds S1 shown in FIG. 21 and S2 which is the speed of the control shaft which will produce the 1 to 1 ratio. Since the powder clutch is operating only in this part of the curve of FIG. 21, it is more easy to control the powder clutch so that the powder clutch operates satisfactorily to maintain the control of the speed of the control shaft 614 to produce the drive ratios between the speeds S1 and S2 in FIG. 21. Again, in this embodiment, when it is desired to place the transmission into reverse gear, the cone clutch previously described locks the input to the control shaft to increase the speed of the control shaft above the speed S1 in FIG. 21 to place the transmission into reverse gear.

It should be noted that only the modified part of FIG. 22 is shown in FIG. 33 and like reference numerals indicate like parts to those previously described.

In FIG. 33 the lay shaft 639, control shaft 614 and a shaft 901 connected to the cone clutch 624 are journaled in casing 900 of the transmission. The planet cage 600 is shown schematically and carries ring gear 902 which has internal teeth which mesh with pinion 903 supported on shaft 904. The other end of the shaft 904 carries a pinion 905 which meshes with internal teeth on a ring gear 907 which is journaled on the end of the control shaft 614.

The control shaft 614 carries gear 634 which meshes with gear 633 connected to the cone clutch 624 and the gear 641 on the lay shaft 639 as previously described.

The ring gear 907 also has external teeth which mesh with the gear 623 of the cone clutch 624 and a gear 907 provided on sleeve 908 which connects to outer casing 640a of the powder clutch 640.

Thus, when the input cage 606 rotates, the pinion 903 is rotated to, in turn, rotate pinion 905 which rotates gear 907. Rotation of gear 907 is imparted to gear 909 which rotates the outer casing 640a of the powder clutch. In other words, the outer casing 640a of the powder clutch is coupled to the cage 606.

Depending on the control signals which are applied to the powder clutch 640, this attempts to slow down the speed of the control shaft 614 towards the speed of the planet cage 606. Thus, when the powder clutch is fully locked so that the shaft 639 is effectively fixed to the outer casing 640a, the cage 606 is coupled to the control shaft 614 and the control shaft 614 will rotate at a speed relative to the input cage 606 dependent on the gear ratio between the gears 902, 903, 905, 907, 907, 909 and 641 and 634. These gear ratios can be chosen to set the lowest gear ratio or highest speed of the transmission and may for example be 1 to 1 as described above, or could move the transmission into overdrive if the gear ratio between these gears is such that it results in the control shaft 614 rotating at a speed below the speed S2 shown in FIG. 21.

When it is desired to place the vehicle into reverse gear, the powder clutch 640 is completely released which allows the control shaft 614 to speed up as shown by trace T towards neutral. In other words, the gear ratio increases and the transmission goes into low gear approaching neutral. In order to place the transmission into reverse gear, the control shaft 614 needs to be increased in speed beyond the speed S1 as previously disclosed, and this is done in the same way as previously described by activating the cone clutch 624 so that the gear 623 is locked onto the shaft 901 by the cone clutch 624 so that drive is transmitted from the cage 606 via the gear 907 to the gear 623, to the shaft 901 and then to the gear 633 and the gear 634. The drive ratio between these gears is such that the speed of the control shaft 614 will increase in speed, thereby moving the velocity of the control shaft to the right in FIG. 21 and thereby placing the transmission into reverse gear in the same manner as previously described.

It will be noted that since the outer casing 640a of the powder clutch 640 is able to rotate in this embodiment, powder is supplied to the clutch 640 via a slip ring which is the same as the slip ring 127, 128 described with reference to FIG. 5.

Figure 34:
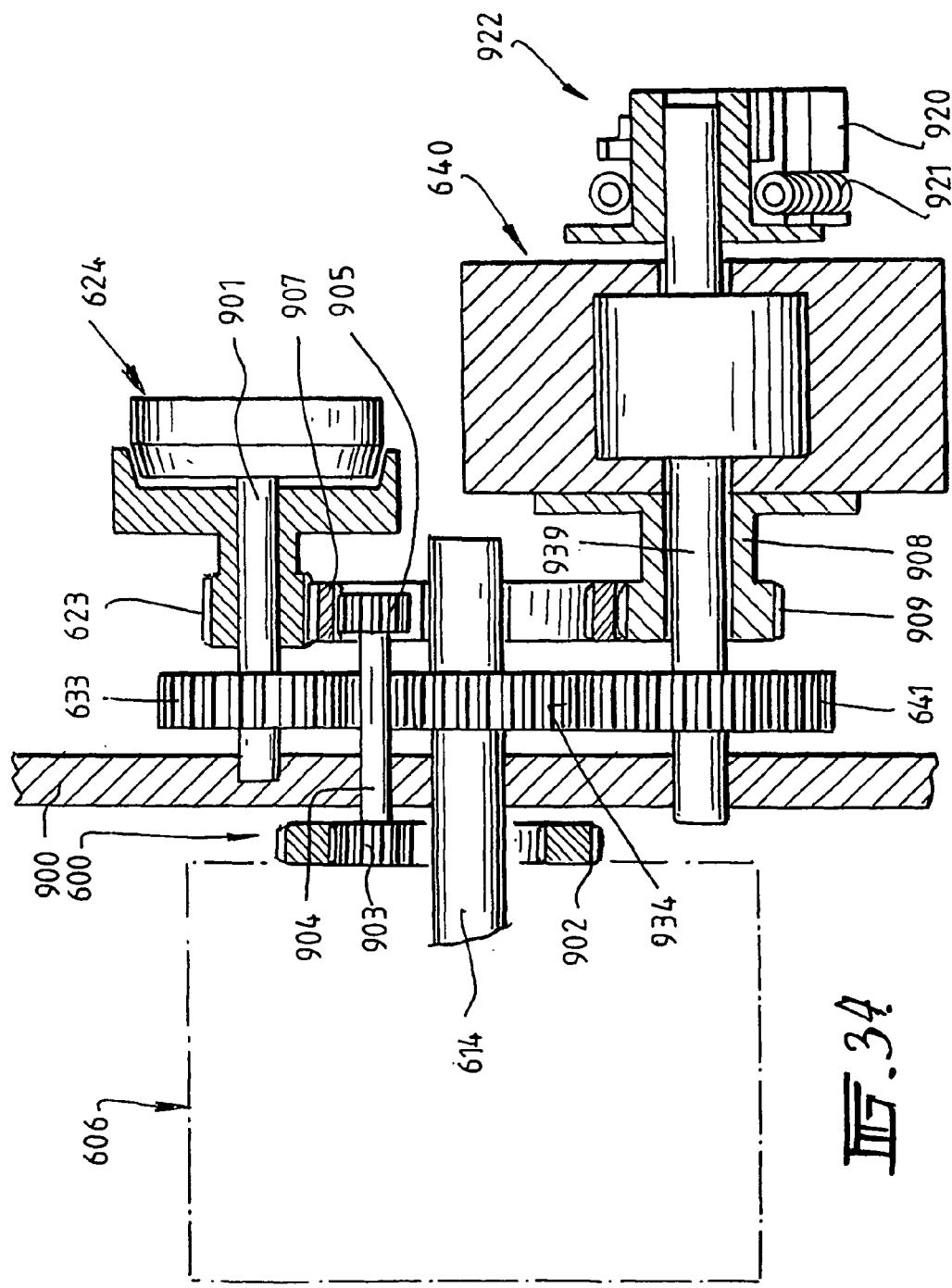
FIG. 34 shows a still further modification to the embodiment of FIG. 33.

FIG. 34 shows a still further modification in which the variable centroid system 662 described with reference to FIG. 23 is provided on the lay shaft 639. This system operates as disclosed in the aforementioned International application and functions to take further load from the powder clutch 640 to further facilitate the control the powder clutch 640 has over the control shaft 614. As the lay shaft increases in speed, the moveable masses 920 (only one shown) move radially outwardly against the bias of springs 921 so as to slow down the rotation of the shaft 639 to maintain the control over the control shaft 614. Thus, the combined operation of the powder clutch 640 and the system 622 has the effect of slowing down the control shaft 614 to change the drive ratio from neutral towards 1 to 1 and overdrive ratio as previously described. In this embodiment, not all of the work to control the control shaft 614 to change the drive ratio from neutral towards 1 to 1 and overdrive therefore needs to be performed by the powder clutch 640 and the system 622 supplements the operation of the powder clutch 640.

Figure 35:
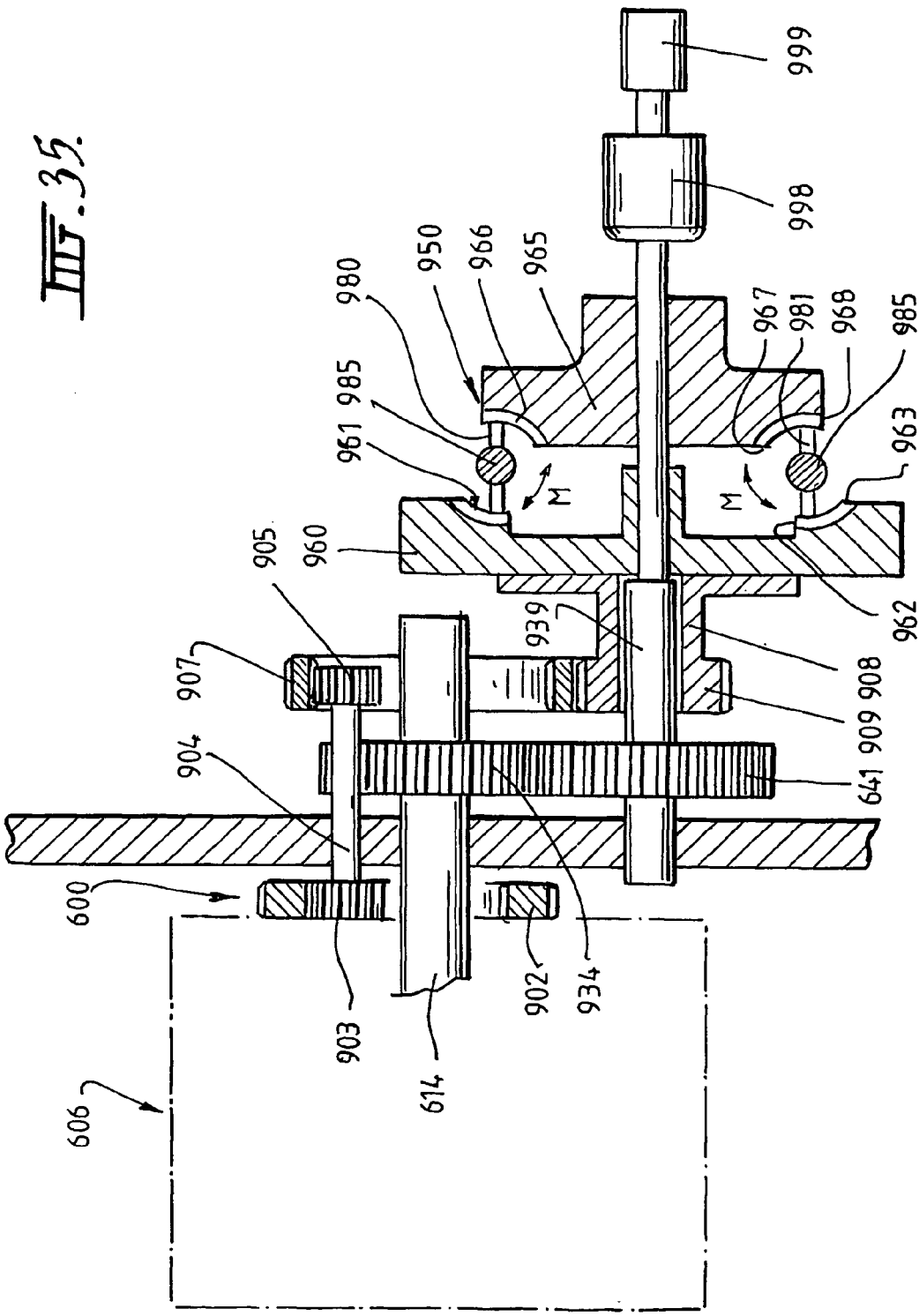
FIG. 35 is still a further embodiment of the invention which shows a different modification to the embodiment of FIG. 22.
Figure 36:
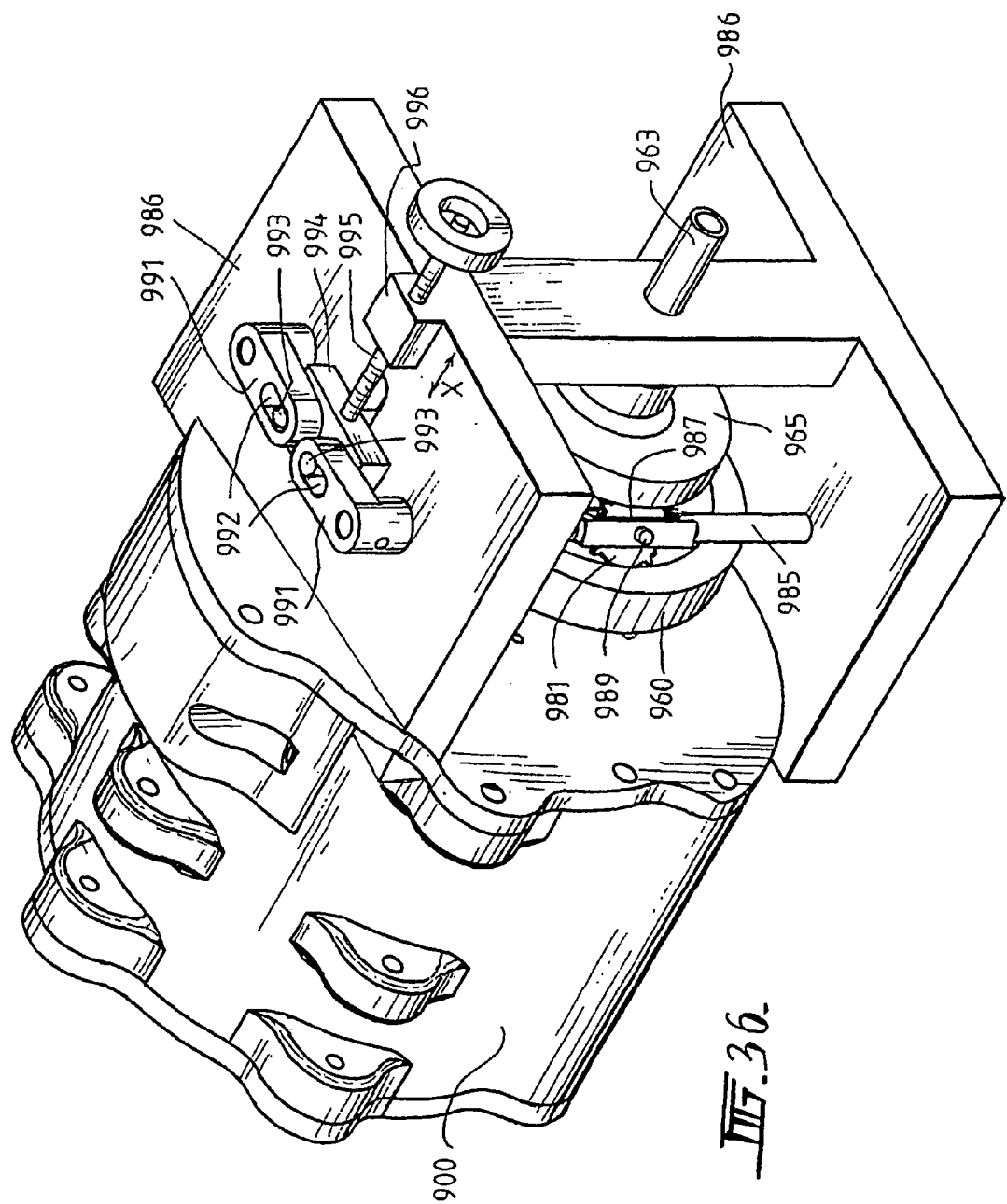
FIG. 36 is a perspective view of the embodiment of FIG. 35 from the exterior of the transmission casing.

FIGS. 35 and 36 show a still further embodiment in which the control over the control shaft 614 is performed by a toroidal pitch transfer gear system 950. This gear system is described more fully in our co-pending Australian Provisional Patent Application No. PR3303 the contents of which are incorporated into this specification by this reference. Thus, in this embodiment, the cone clutch and powder clutch are completely removed and the pitch system 950 is controlled by one or more servo-motors 998 which, in turn, are controlled by control signals received by a controller 999 indicative of the speed of any two of the input, the output or the control shaft in the same manner as previously described.

In this embodiment, the sleeve 908 connects to a first toroidal track variator 960. The variator 960 rotates with the gear 909 and sleeve 908 and carries a toroidal track 961 having gear teeth which change in pitch from an inner diameter portion 962 to an outer diameter portion 963. A second pitch variator 965 is fixed onto the lay shaft 639 and also includes a toroidal track 966 which forms a track pair with the track 961. The track 966 also has toroidal teeth which change in pitch from inner diameter 967 to outer diameter 968 as is described in more detail in the aforesaid provisional application.

A pair of pitch transfer wheels 980 and 981 are mounted between the tracks 961 and 966 and are arranged on rotatable shafts 985. Each of the pitch transfer wheels 980 and 981 comprises two pitch gears having a different number of teeth so that the teeth are slightly out of phase with one another. The two gears are able to move relative to one another so as to transfer drive from the variator 960 to the variator 965, as is clearly described in the aforesaid Australian provisional patent application. As clearly shown in FIG. 36, the pitch transfer wheels 980 and 981 are arranged in cut-outs or slots 987 in the shafts 985 and are journaled on pivot pins 989 so that the pitch transfer wheels 981 can rotate on the pins 989 to transmit drive from the variator 960 to the variator 965.

As is best shown in FIG. 36, the shafts 985 (only one shown) are supported between plates 986 which are shown in FIG. 36. At one end the shafts have lugs 991 which are provided with elongated slots 992. The slots 992 each receive a pin 993 located on block 994 which is connected to a screw threaded shaft 995. The screw threaded shaft passes through a screw threaded nut 996 and is rotated by the servo-motor(s) 998 so that the shaft 994 is driven back and forward in the direction of arrow X rotate the shafts 985, which in turn rotates the pitch transfer gear 981 in the directions of double-headed arrow M in FIG. 35. This changes the drive ratio between the variator 960 and the variator 965 depending on the rotated position of the shafts 985 and therefore the location of the pitch transfer gears 981 with respect to the toroidal tracks 961 and 966. Thus, the drive transmitted from the. cage 606 via the gear 902, pinion 905, gear 907, gear 909, sleeve 908 and then from the variator 960 to the variator 985 is altered dependent on the orientation of the pitch transfer gears 981. Thus, the drive transmitted to the shaft 614 is altered in accordance with the orientation of those pitch transfer gears to thereby control the rotary speed of the shaft 614 to in turn control the drive ratio of the transmission.

If the drive ratio between the variators 960 and 965 is high, the shaft 614 is therefore slowed down by the drive ratio to thereby place the transmission into a higher gear, or in other words speed up the transmission. If the drive ratio between the variator 960 and 965 is decreased, the control shaft 614 is able to increase in speed thereby bringing the transmission down towards neutral. If it is desired to place the transmission into reverse gear, the drive ratio between the variator 960 and 965 can be designed so that the speed of the shaft 614 can be further increased, thereby placing the drive ratio into reverse as previously described.

Since modifications within the spirit and scope of the invention may readily be effected by persons skilled within the art, it is to be understood that this invention is not limited to the particular embodiment described by way of example hereinabove.

The invention claimed is:

1. A transmission system including:
a dual sunwheel system having a first sunwheel and a second sunwheel, the first sunwheel providing output rotary power when the transmission system is operating;
a planet system including a first planet gear and a second planet gear coupled to the first planet gear, the first planet gear meshing with the first sun gear and the second planet gear meshing with the second sun gear;
a cage for carrying the planet system;
input means for receiving input power from an input power source and supplying the input power to the dual sunwheel system to cause the dual sunwheel system to supply rotary power at the first sunwheel;
control means for controlling the dual sunwheel system so as to set the drive ratio of the transmission by causing the first sunwheel to advance or regress relative to the input means by displacing momentum back and forth between the first sunwheel which provides the output rotary power and the control means;
wherein the input means comprises the planet cage of the dual sunwheel system and the control means includes a control shaft coupled to the second sunwheel for rotating the second sunwheel to cause the first sunwheel to advance or regress relative to the cage to provide for substantially continuous drive ratio change of the output relative to the cage between minimum and maximum drive ratios;
wherein the cage of the sunwheel system is coupled to an epicyclic planet system, the epicyclic planet system having a first input for input of power and a second input for input of power, the epicyclic planet system being connected to the cage of the dual sunwheel system to thereby rotate the cage to provide the input rotatory power into the dual sunwheel system; and
wherein the epicyclic planet system includes an epicyclic sunwheel, an orbit gear and at least one said epicyclic planet gear, the said epicyclic planet gear being carried by the cage of the dual sunwheel system, a first input shaft connected to the epicyclic sunwheel and a second input shaft connected to the orbit gear so that when either or both of the first or second input shafts is rotated the epicyclic planet gear orbits about the epicyclic sunwheel to thereby rotate the cage of the dual sunwheel system and provide input rotary power into the dual sunwheel system.

2. A transmission system including:
an epicyclic planet system having an orbit gear, a sunwheel and at least one planet gear between the sunwheel and the orbit gear, the orbit gear receiving input rotary power from a first power source and the sunwheel receiving input rotary power from a second power source;
a dual sunwheel system having a first sunwheel and a second sunwheel, the first sunwheel being coupled to an output shaft;
the dual sunwheel system further having a planet system including a first planet gear in mesh with the first sunwheel and the second planet gear in mesh with the second sunwheel, the first and second planet gears being coupled together, the planet system being supported in a cage, the cage also carrying the at least one planet gear of the epicyclic planet system so that when input rotary power is input from the first or second source to the orbit gear or the sunwheel of the epicyclic planet system the planet gear of the epicyclic system orbits about the sunwheel of the epicyclic planet system to rotate the cage and thereby supply rotary power to the planet system and to the first sunwheel to drive the output; and
a control means coupled to the second sunwheel for controlling the rotary speed of the second sunwheel which in turn rotates the planet system via the second planet gear to cause the first sunwheel to advance or regress relative to the cage to thereby change the drive ratio of the transmission.

3. The transmission system of claim 2 wherein the control means includes:
a control circuit having at least a first sensor and a second sensor for providing respective signals indicative of the rotary speed of any two of the cage, the second sunwheel and the output, and processing circuitry for receiving the signals and for producing a control signal; and
a control mechanism for driving or impeding rotary motion of the second sunwheel dependant on the control signal.

4. The transmission system of claim 3 wherein the first and second sensors sense the speed of the cage and the output respectively.

5. The transmission system of claim 4 wherein the sensors detect the speed of the cage and the second sunwheel, and the speed of the second sunwheel is used as an indicative speed of the output.

6. The transmission system of claim 2 wherein the control mechanism comprises one or more of an electric motor, a magnetic powder brake or clutch, and a mechanical or hydraulic variable drive.

7. The transmission system of claim 3 wherein the processing circuitry includes:
means for setting a predetermined ratio between the first and second signals and for producing an initial control signal indicative of a variation from the set ratio;
means for producing the control signal in the form of a variable pulse signal having a duty cycle indicative of the magnitude of the initial control signal; and
switch means for receiving the variable pulse signal, the switch means being coupled in a power supply to the control mechanism so that the control mechanism is powered by switching the switching means on by the variable pulse signal so that the control means is powered on in pulse fashion with a duty cycle dependant on the duty cycle of the control signal so the control shaft is driven to increase rotary speed when the control mechanism is powered and impedes rotation on the control shaft when the control mechanism is not powered is set in accordance with the duty cycle of the control signal.

8. The transmission system of claim 7 wherein the switching means comprises at least one transistor which is provided in series with the control mechanism so that when the transistor is switched on power is able to flow through the control mechanism to activate the control mechanism to increase the rotational speed of the second sunwheel.

9. The transmission system of claim 8 wherein the control mechanism is a motor, and a second transistor is arranged in parallel with the motor so that when the first transistor is switched off, the second transistor is switched on and current is able to flow through the second transistor and to a load so that in environments in which the motor is running at a speed higher than the input power to the motor the motor can generate electricity and supply that electricity to the load and impede the rotation of the control shaft.

10. The transmission system of claim 9 wherein the load comprises a battery for supplying power to an electric propulsion motor in a hybrid power supply system so that the motor can recharge the batteries depending upon the operating conditions of the motor.

11. The transmission system of claim 8 wherein the control circuity includes current sensing means for sensing current supply to the motor and, in the event of over supply of current, switching off the switching means so that current cannot flow through the motor and the motor is de-energised.

12. The transmission system of claim 3 wherein the control circuitry also includes a reverse gear signal indicating means for providing a reverse signal when the transmission system is placed in reverse for preventing the switching means from switching on so as to maintain the motor in a switched off condition when the vehicle is in reverse gear.

* * * * *